(12) United States Patent
Sasaki et al.

(10) Patent No.: US 8,154,966 B2
(45) Date of Patent: *Apr. 10, 2012

(54) APPARATUS, METHOD AND PROGRAM FOR WAVEFORM EQUALIZATION ON A READ SIGNAL OBTAINED BY READING THE RECORD DATA RECORDED ON A RECORDING MEDIUM

(75) Inventors: Yoshio Sasaki, Tokorozawa (JP); Shogo Miyanabe, Higashiyamato (JP); Hiroyuki Uchino, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 12/517,253

(22) PCT Filed: Dec. 5, 2006

(86) PCT No.: PCT/JP2006/324288
§ 371 (c)(1),
(2), (4) Date: Jul. 23, 2009

(87) PCT Pub. No.: WO2008/068856
PCT Pub. Date: Jun. 12, 2008

(65) Prior Publication Data
US 2010/0074091 A1 Mar. 25, 2010

(51) Int. Cl.
*G11B 11/00* (2006.01)
(52) U.S. Cl. ............... 369/53.31; 369/53.35; 369/53.44

(58) Field of Classification Search .................... None
See application file for complete search history.

(56) References Cited

U.S. PATENT DOCUMENTS

| 5,719,843 | A | 2/1998 | Nakajima et al. | |
|---|---|---|---|---|
| 2004/0257953 | A1 | 12/2004 | Kuribayashi | |
| 2005/0063276 | A1* | 3/2005 | Ogura | 369/59.22 |
| 2005/0180287 | A1* | 8/2005 | Lee et al. | 369/59.15 |
| 2005/0219985 | A1 | 10/2005 | Nakahira | |

FOREIGN PATENT DOCUMENTS

| JP | 9-330564 | 12/1997 |
|---|---|---|
| JP | 3459563 | 8/2003 |
| JP | 2003-303474 | 10/2003 |
| WO | WO2005024822 | 3/2005 |

OTHER PUBLICATIONS

International Search Report PCT/JP2006/324288, Mar. 13, 2007.

* cited by examiner

*Primary Examiner* — Paul Huber
(74) *Attorney, Agent, or Firm* — Young & Thompson

(57) ABSTRACT

An information reproducing apparatus (1) is provided with: an offset adding device (19-1, 19-2) for adding an offset value (OFS) which can be set to be variable, to a read signal ($R_{RF}$) read from a recording medium (100); a correcting device (18) for correcting waveform distortion occurring in a read signal corresponding to a long mark, of the read signal to which the offset value is added; and a waveform equalizing device (18) for performing a waveform equalization process on the read signal in which the waveform distortion is corrected.

13 Claims, 40 Drawing Sheets

[FIG. 1]
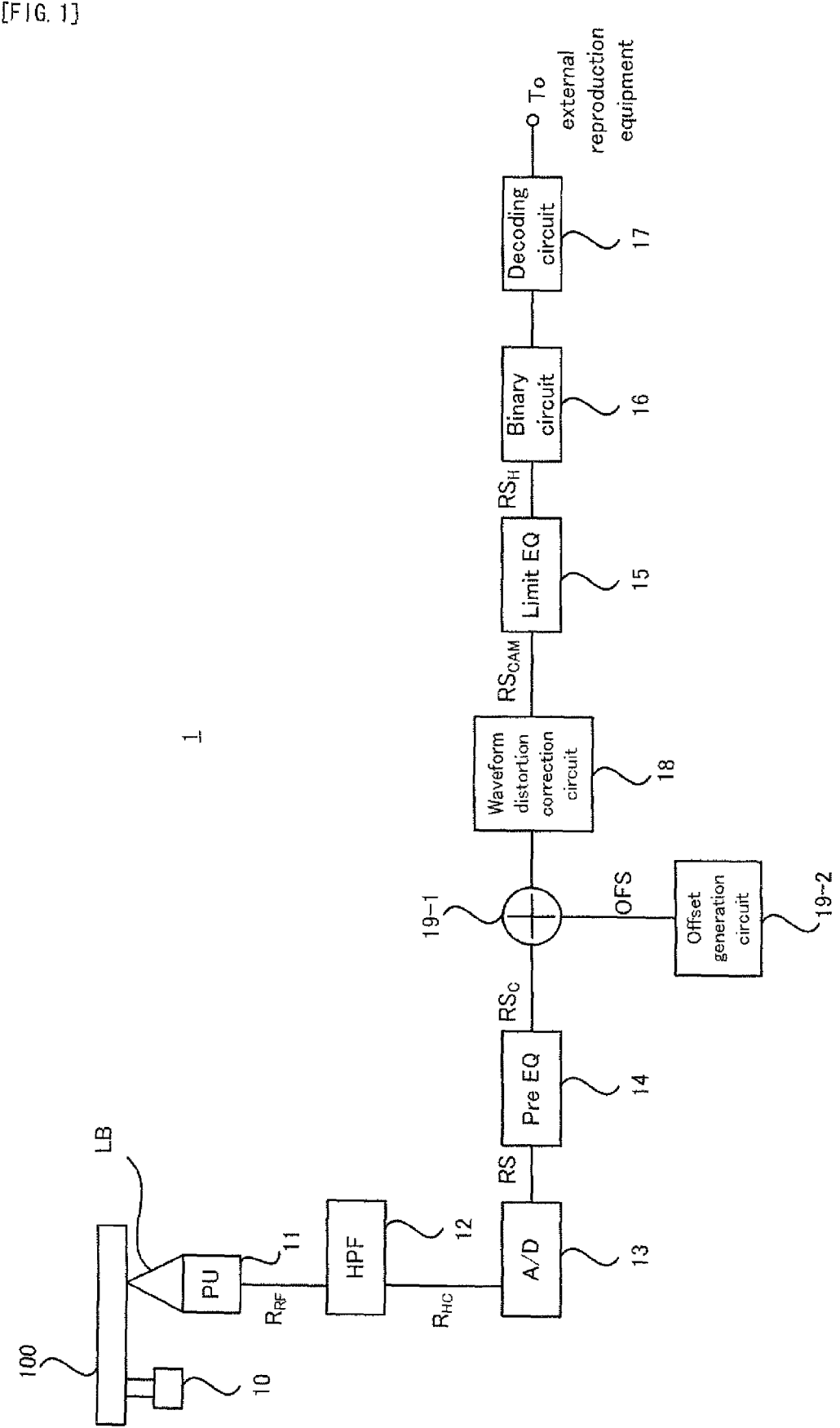

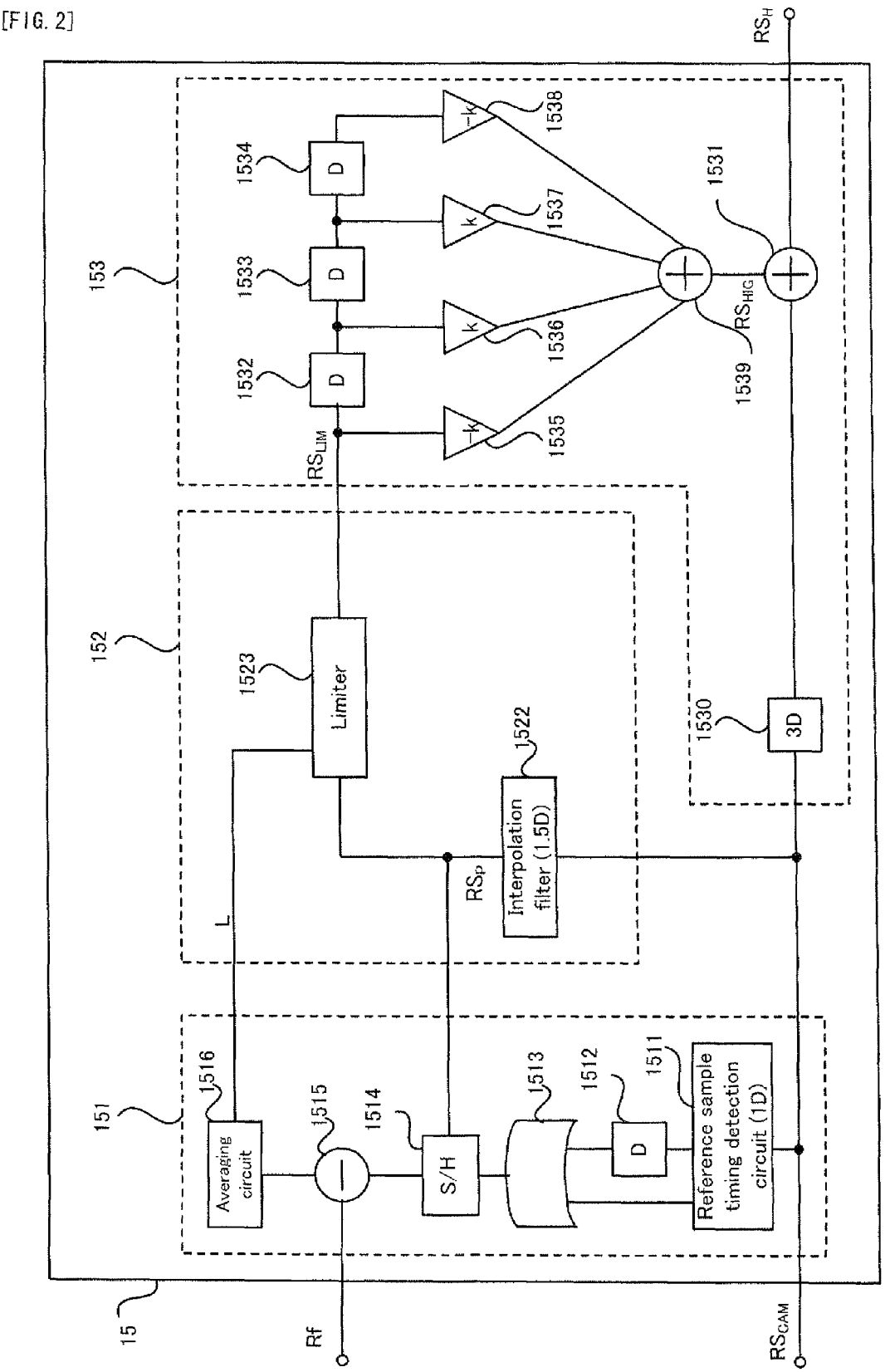
[FIG. 2]

[FIG. 3]
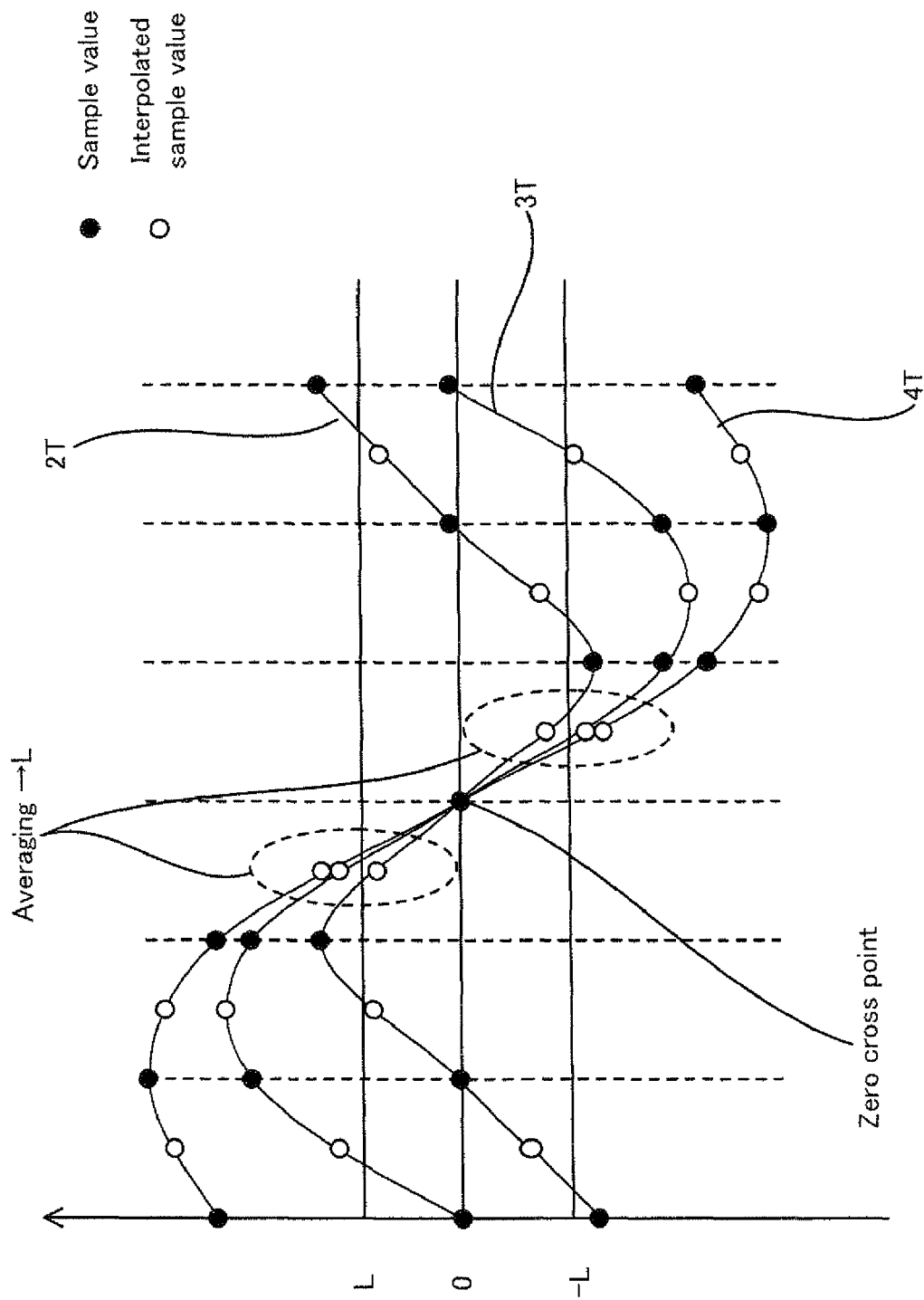

[FIG. 4]
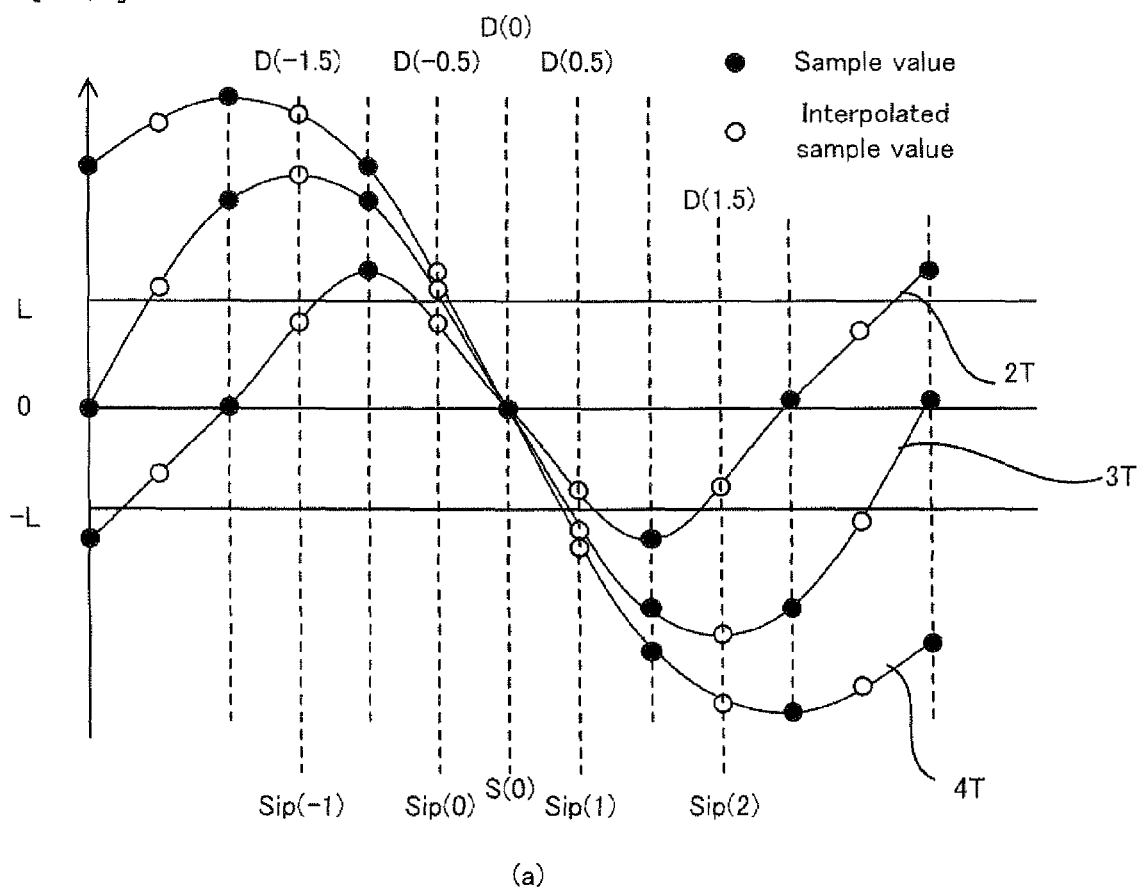
(a)
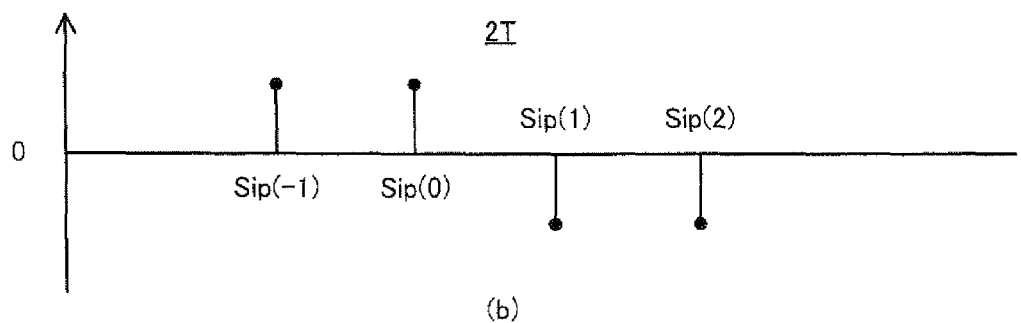
(b)
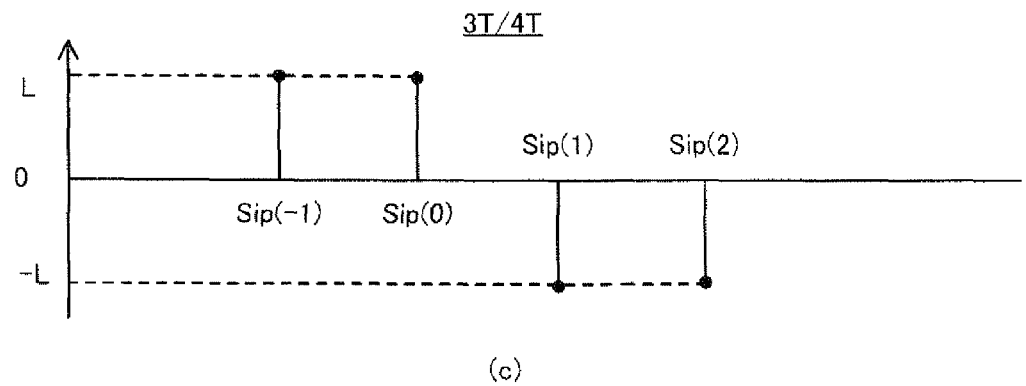
(c)

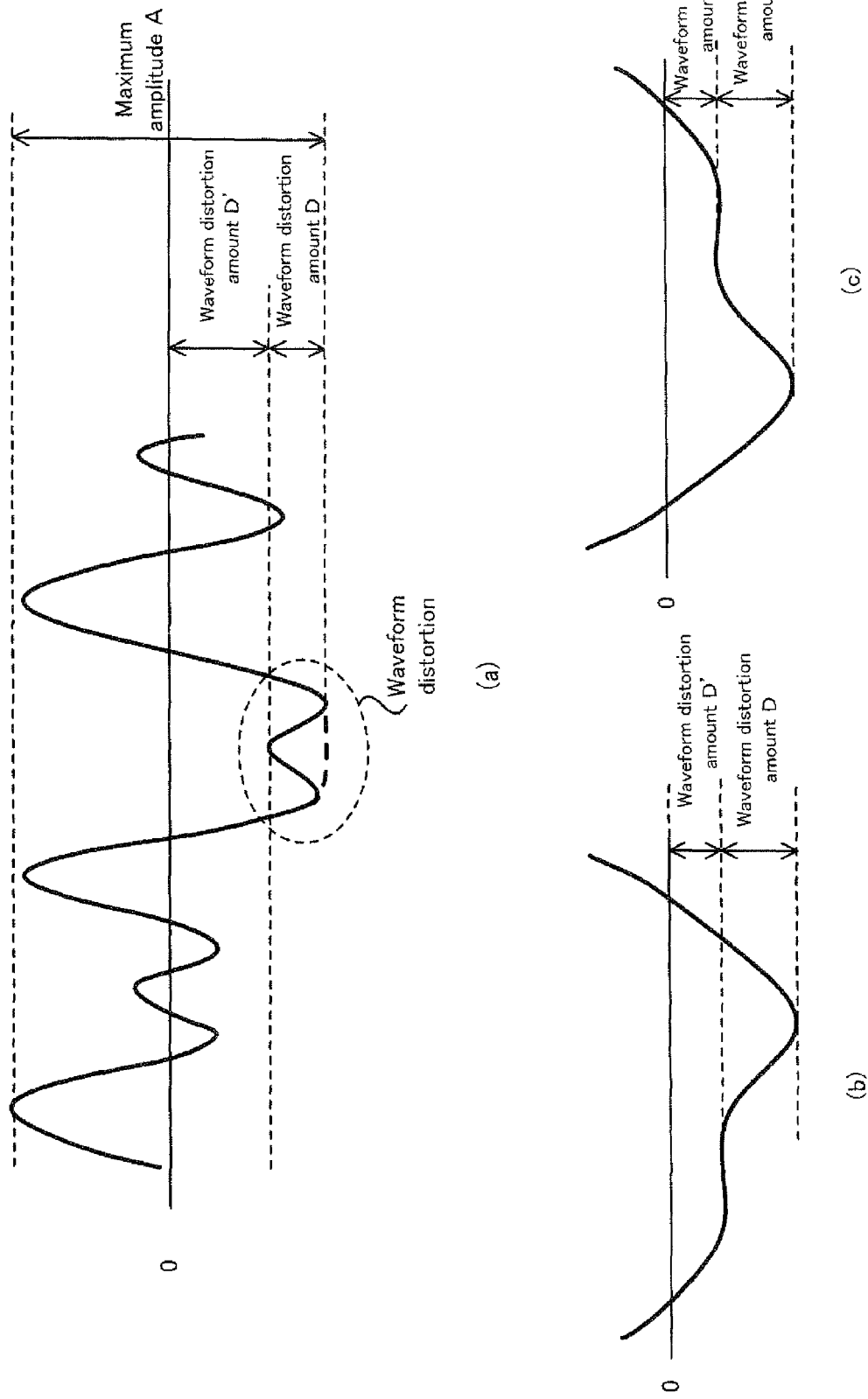
[FIG. 5]

[FIG. 6]
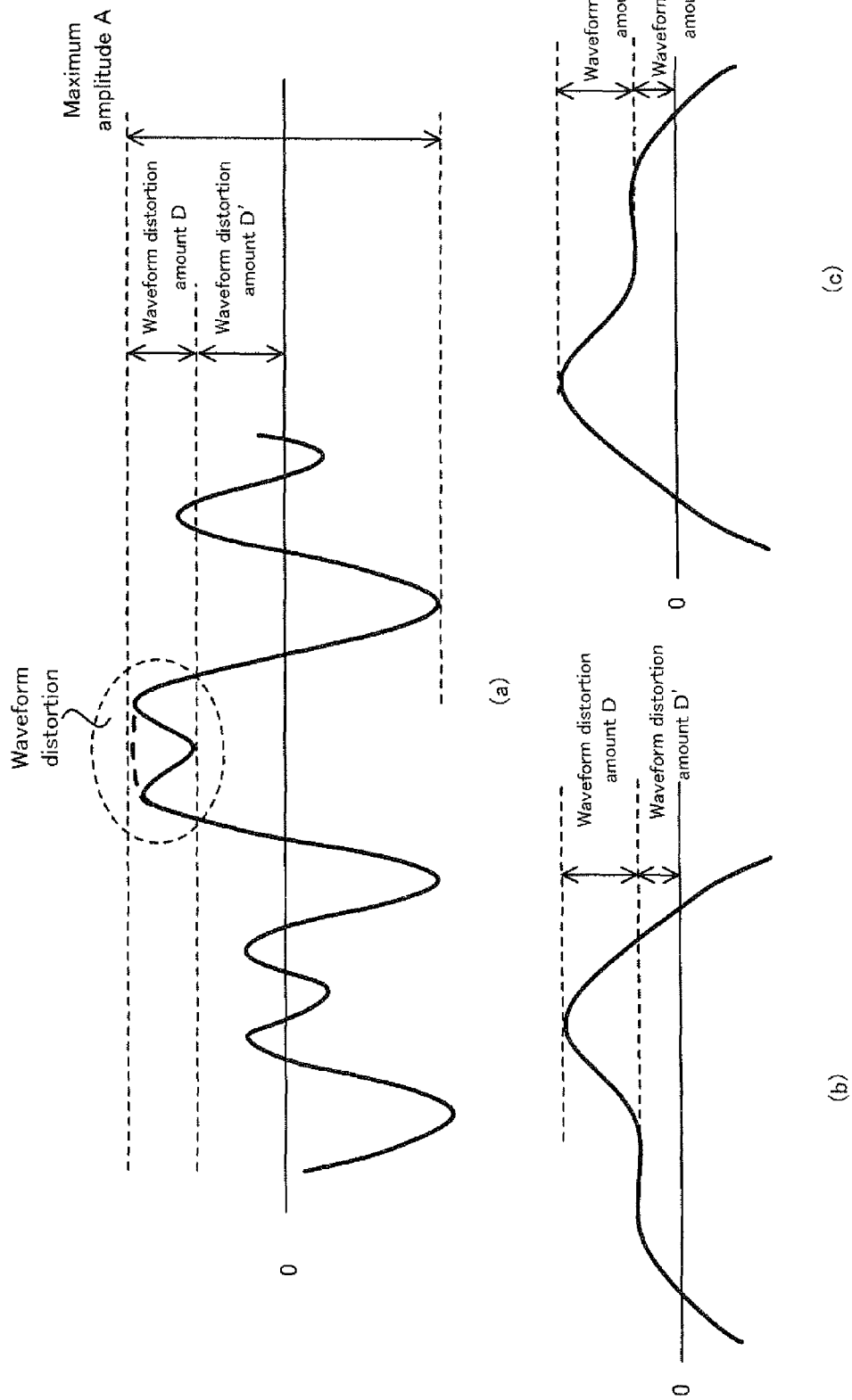

[FIG. 7]
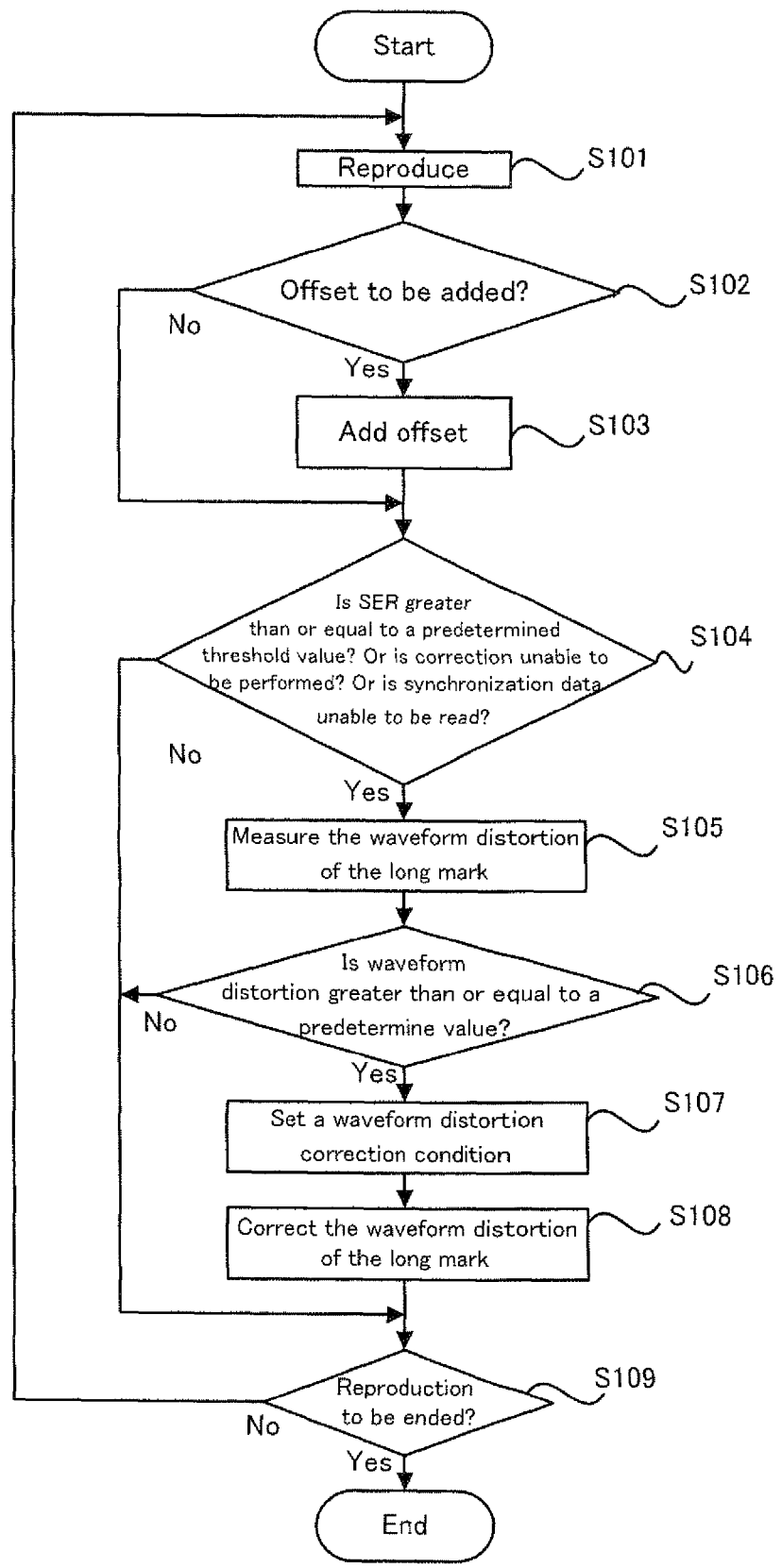

[FIG. 8]
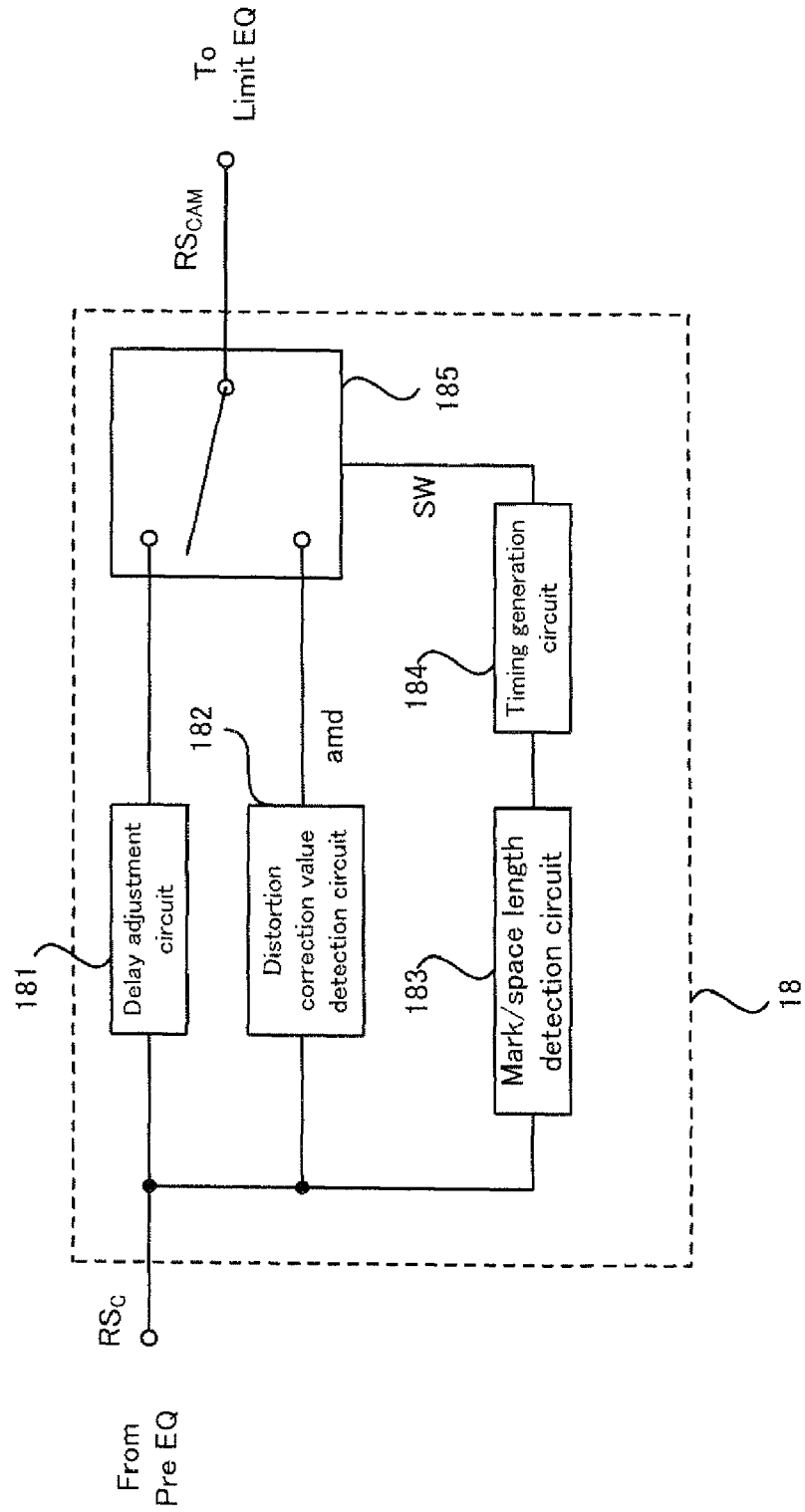

[FIG. 9]
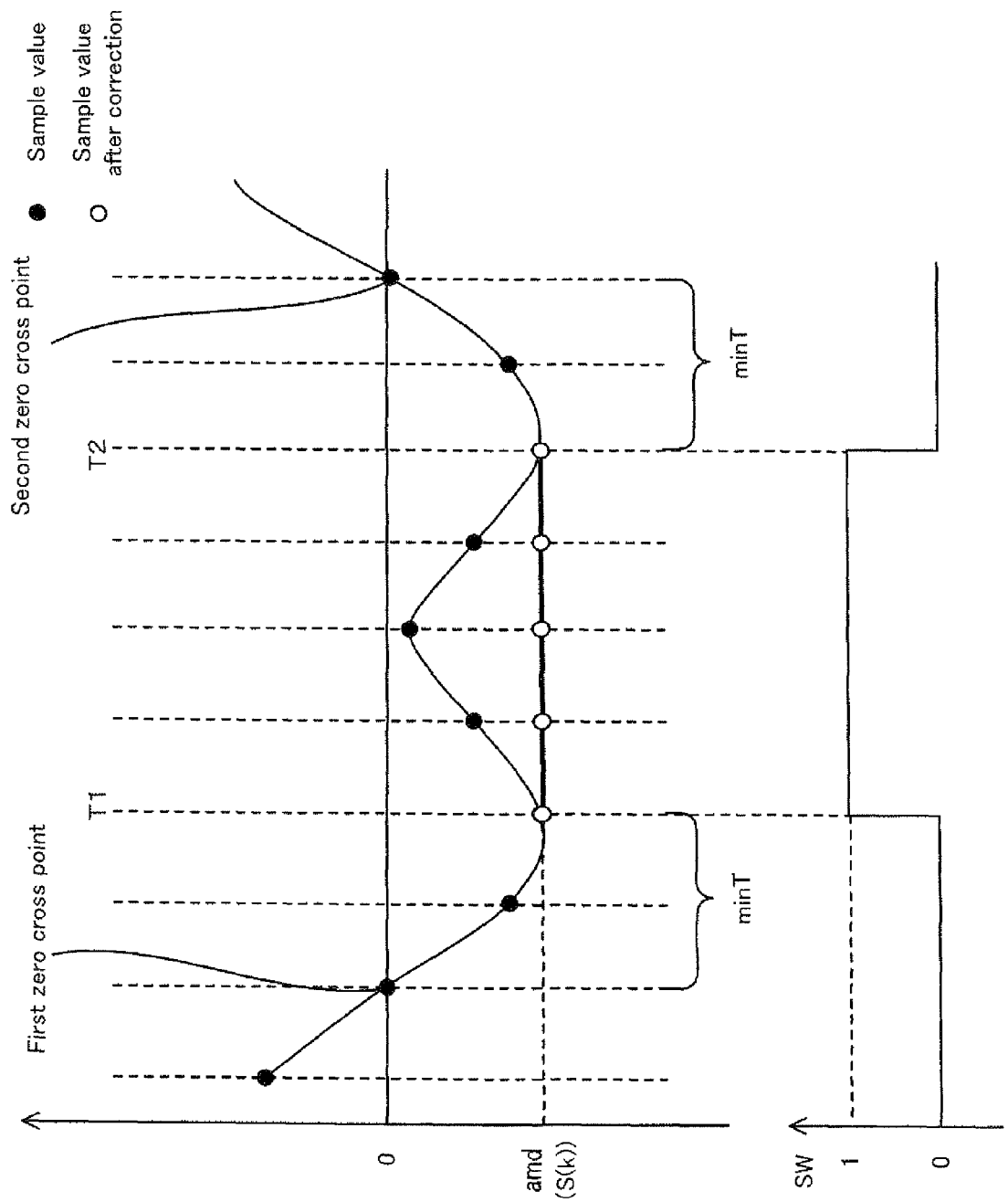

[FIG. 10]
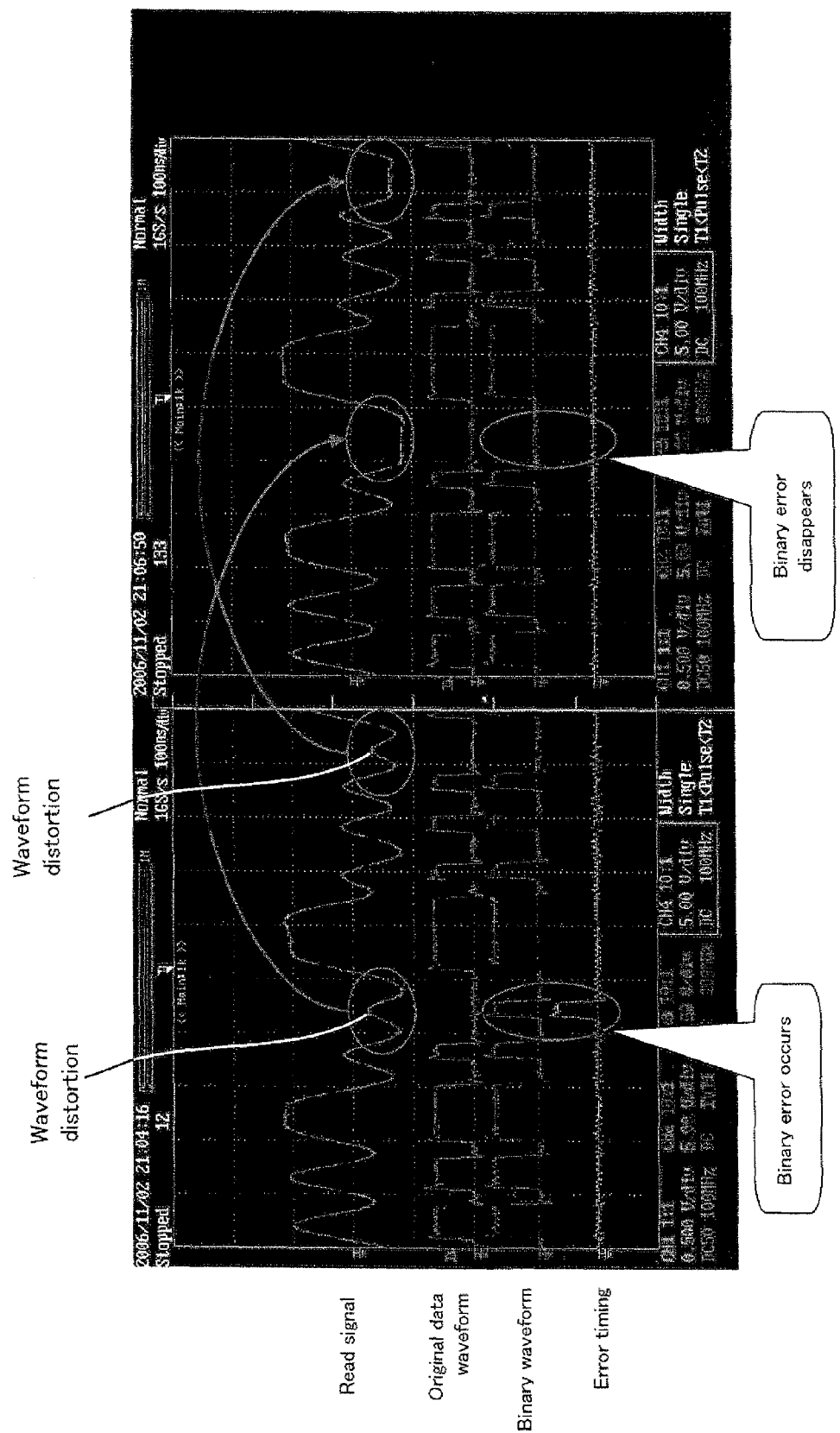

[FIG. 11]
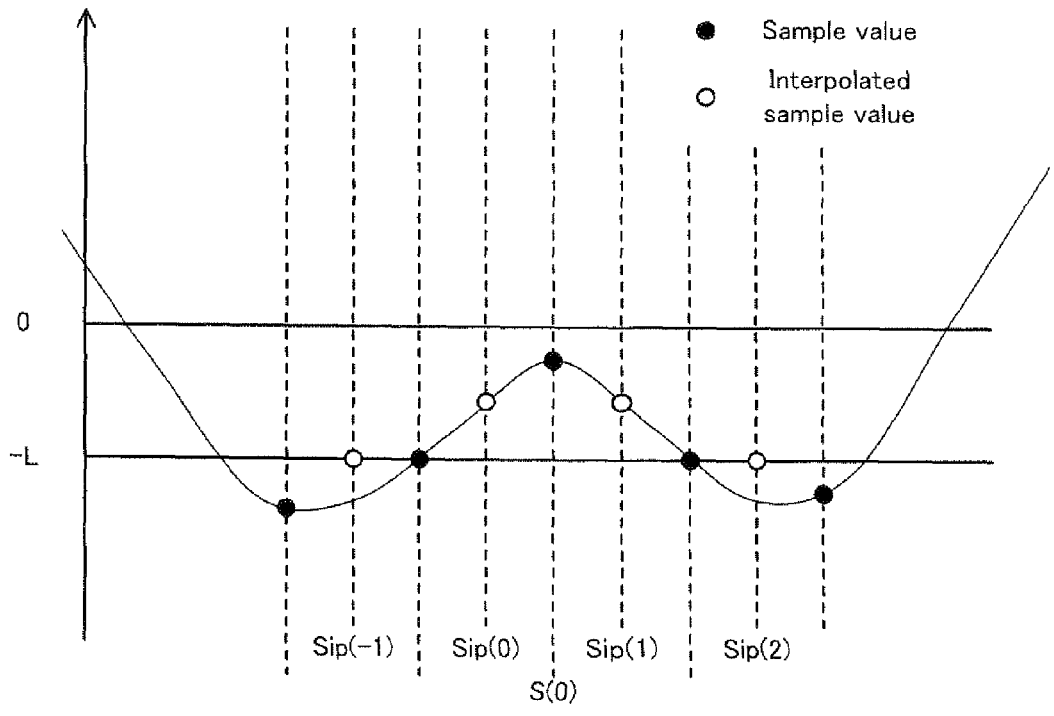
(a)
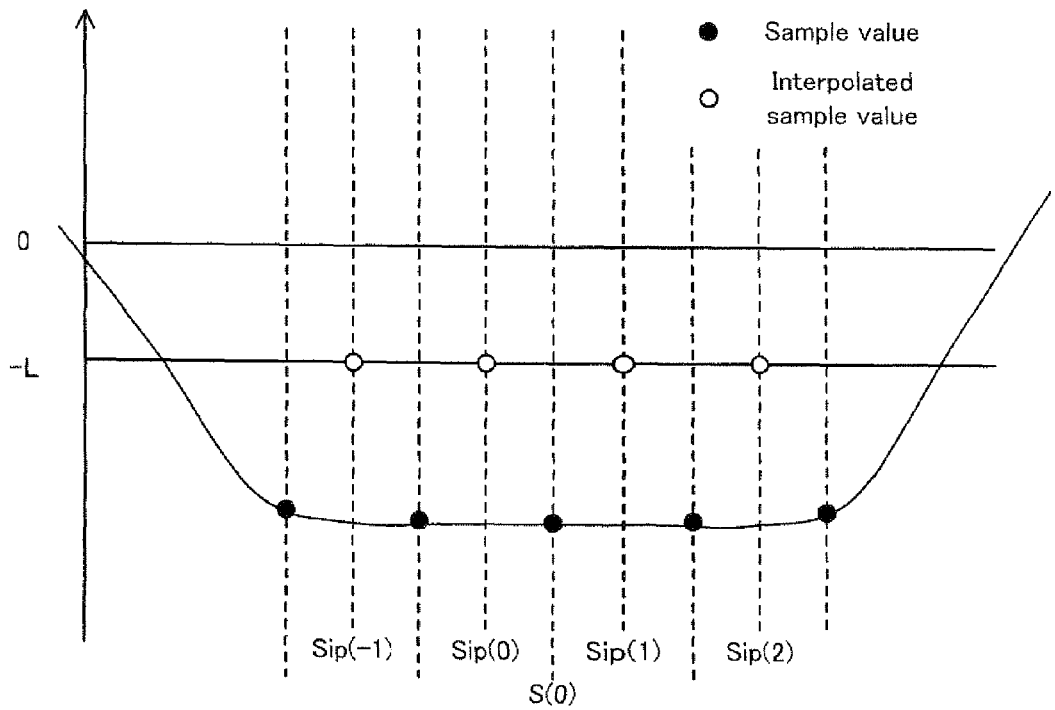
(b)

[FIG. 12]
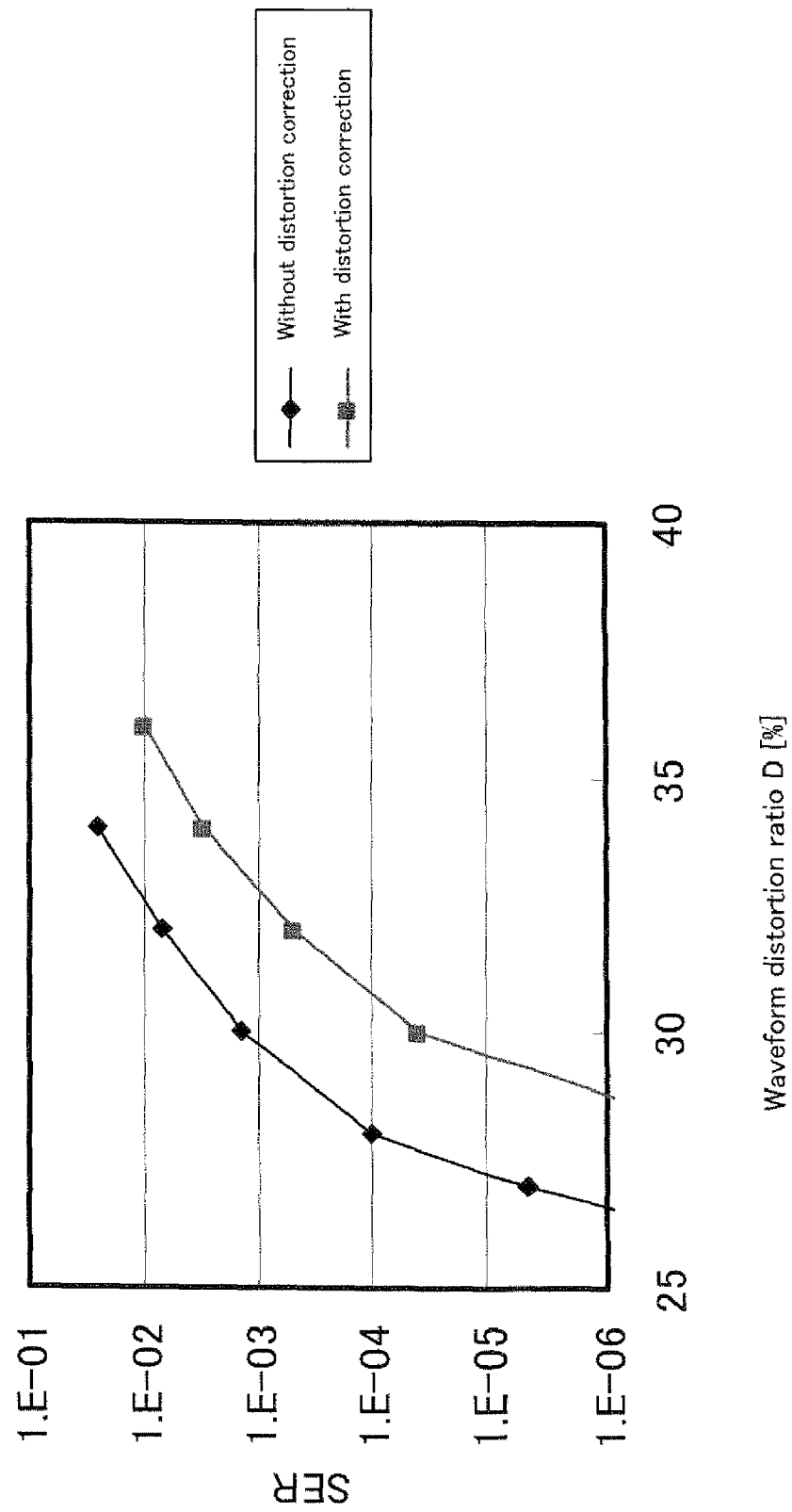

[FIG. 13]
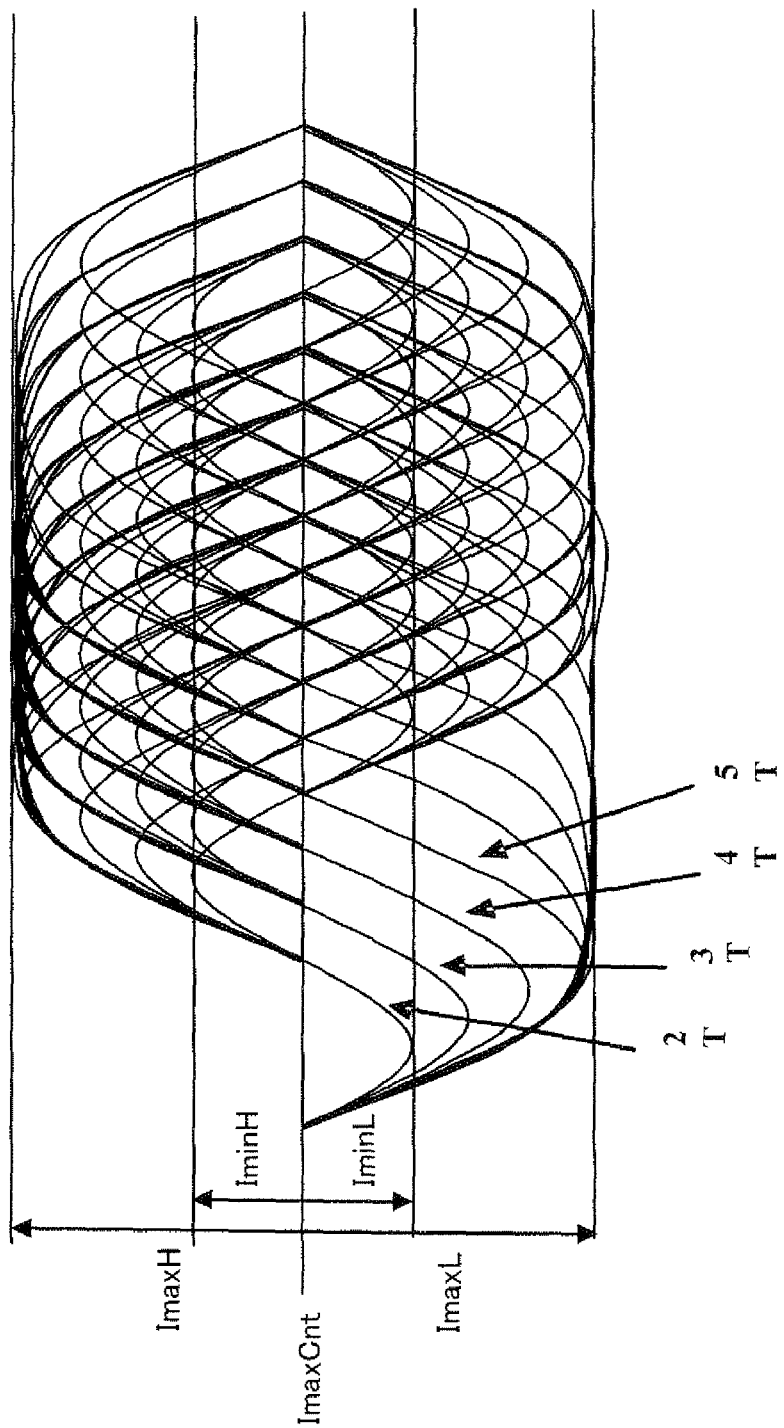

[FIG. 14]
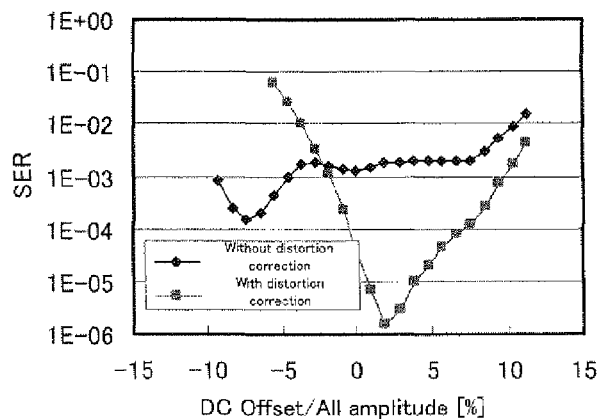
(a)
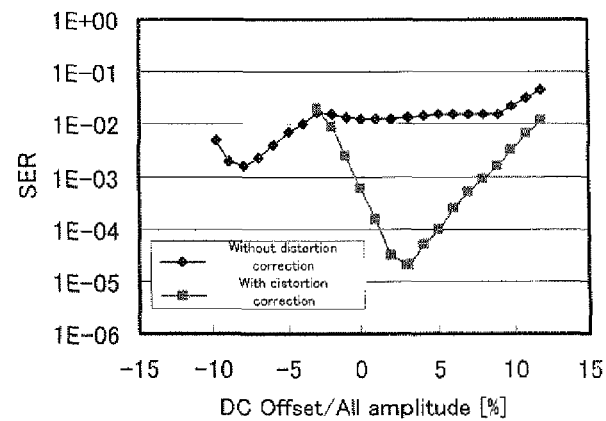
(b)
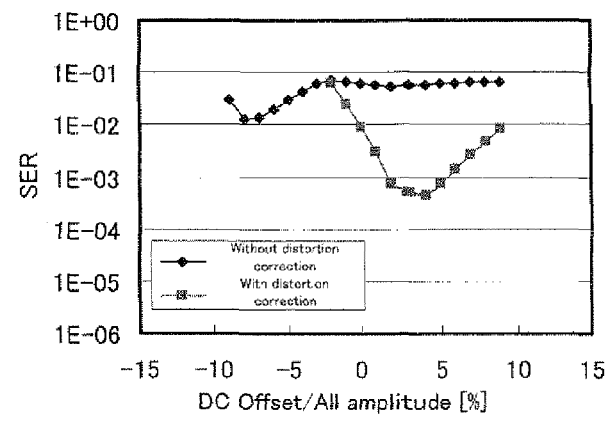
(c)

[FIG. 15]
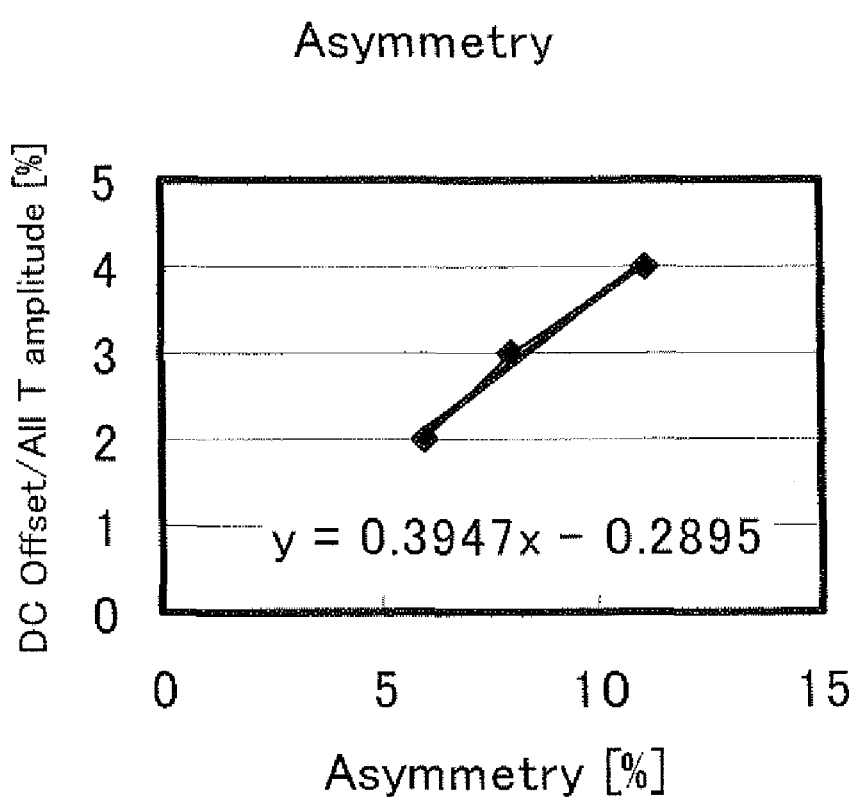

[FIG. 16]

| Run length | T appearance probability | Sample appearance probability |
|---|---|---|
| 2T | 0.3809 | 0.2255 |
| 3T | 0.2486 | 0.2208 |
| 4T | 0.1631 | 0.1931 |
| 5T | 0.0996 | 0.1474 |
| 6T | 0.0587 | 0.1042 |
| 7T | 0.0294 | 0.0609 |
| 8T | 0.0163 | 0.0387 |
| 9T | 0.0035 | 0.0093 |

(a)

| Run length | T appearance probability | Sample appearance probability |
|---|---|---|
| 3T | 0.3184 | 0.2026 |
| 4T | 0.2408 | 0.2043 |
| 5T | 0.1687 | 0.1789 |
| 6T | 0.1147 | 0.1460 |
| 7T | 0.0715 | 0.1062 |
| 8T | 0.0428 | 0.0727 |
| 9T | 0.0236 | 0.0451 |
| 10T | 0.0138 | 0.0293 |
| 11T | 0.0024 | 0.0056 |
| 14T | 0.0032 | 0.0094 |

(b)

[FIG. 17]
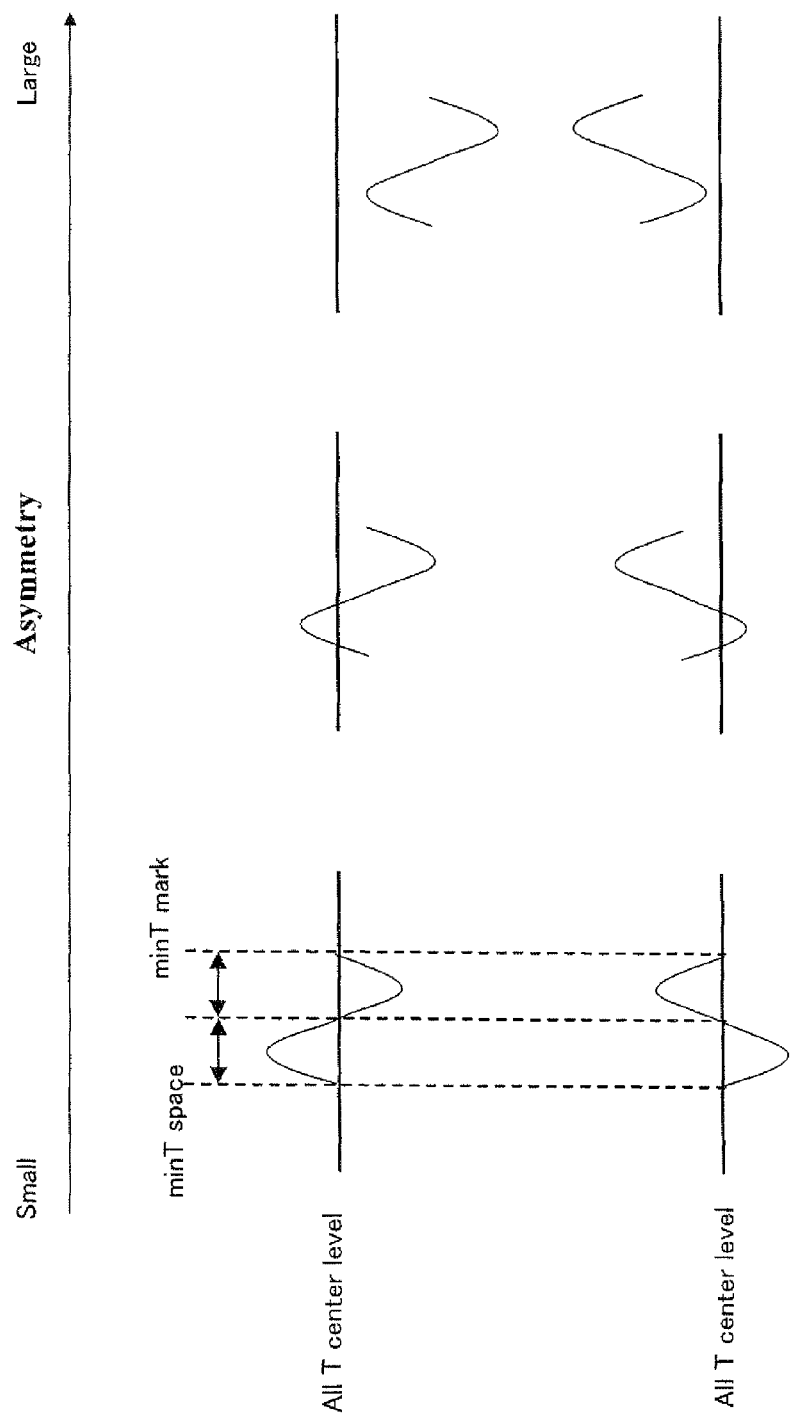

[FIG. 18]
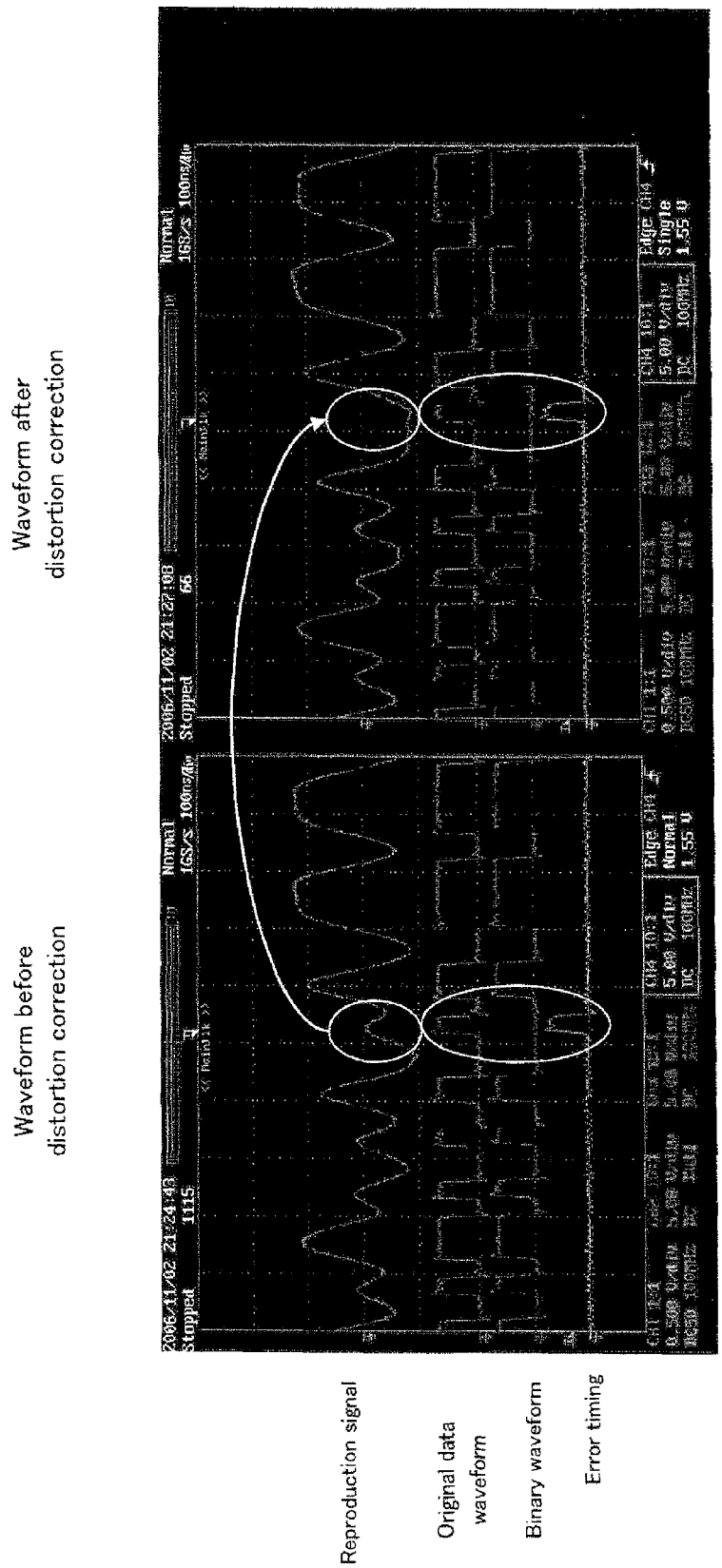

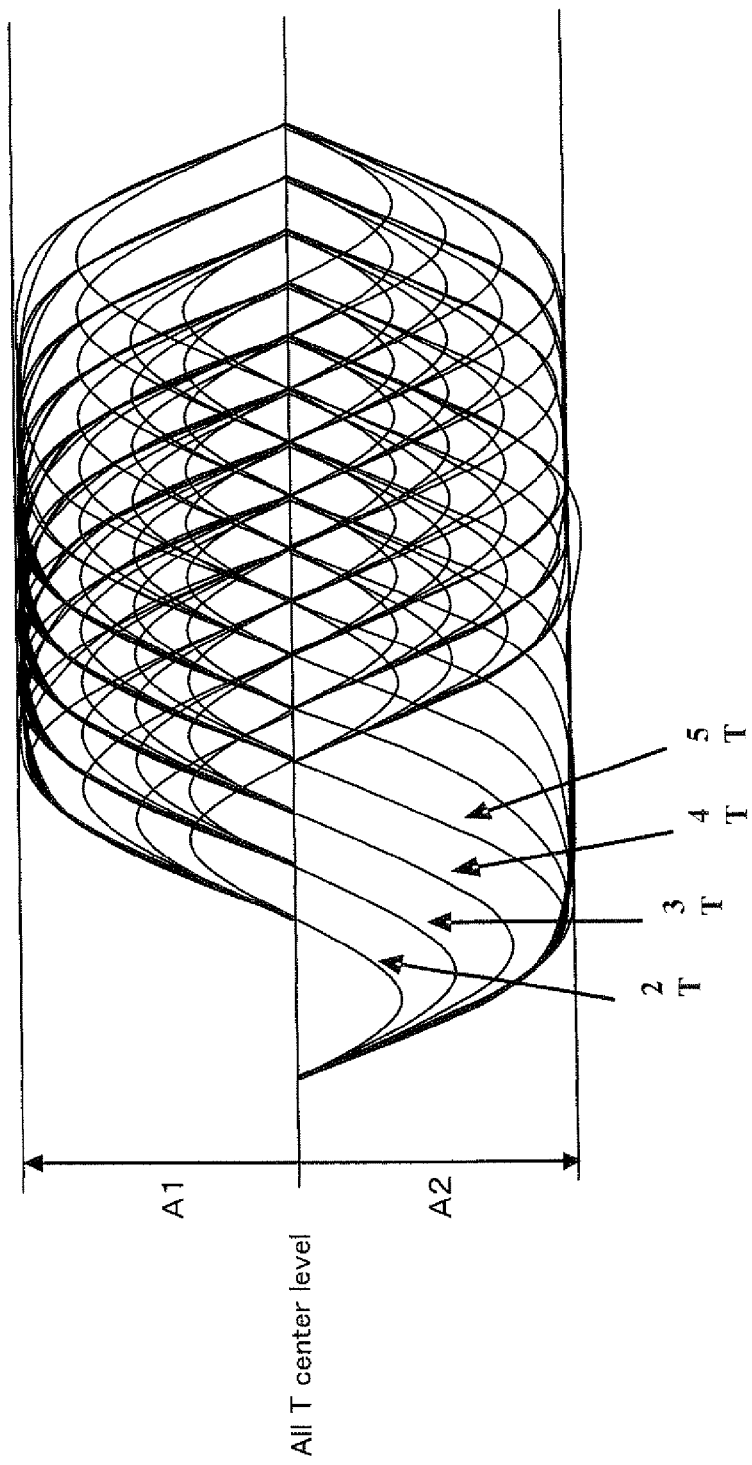
[FIG. 19]

[FIG. 20]
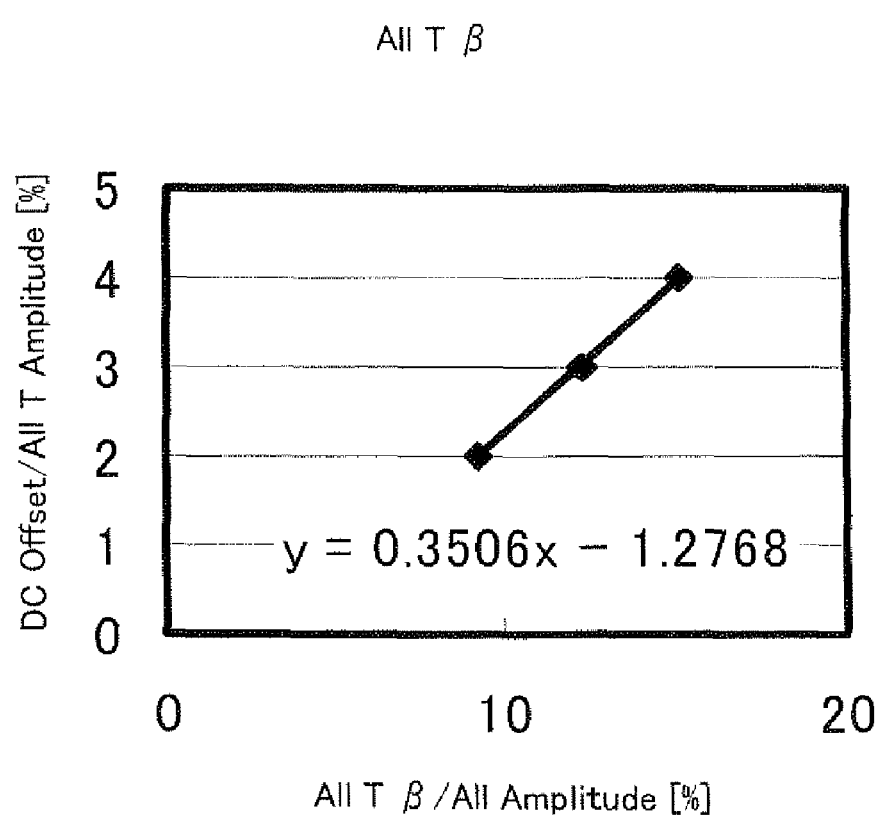

[FIG. 21]
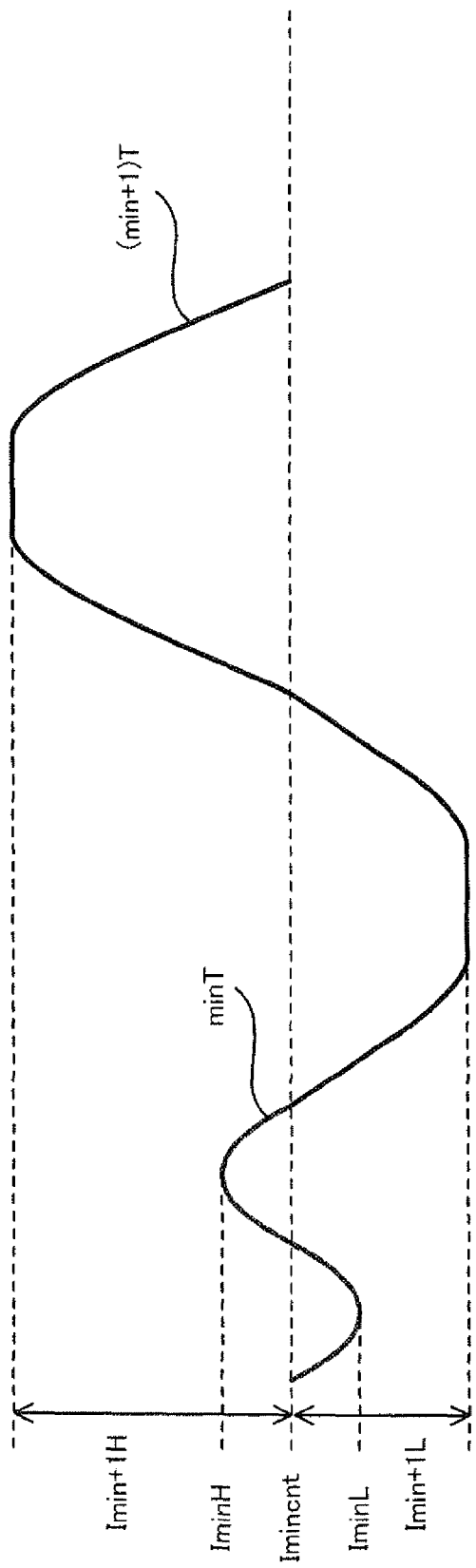

[FIG. 22]
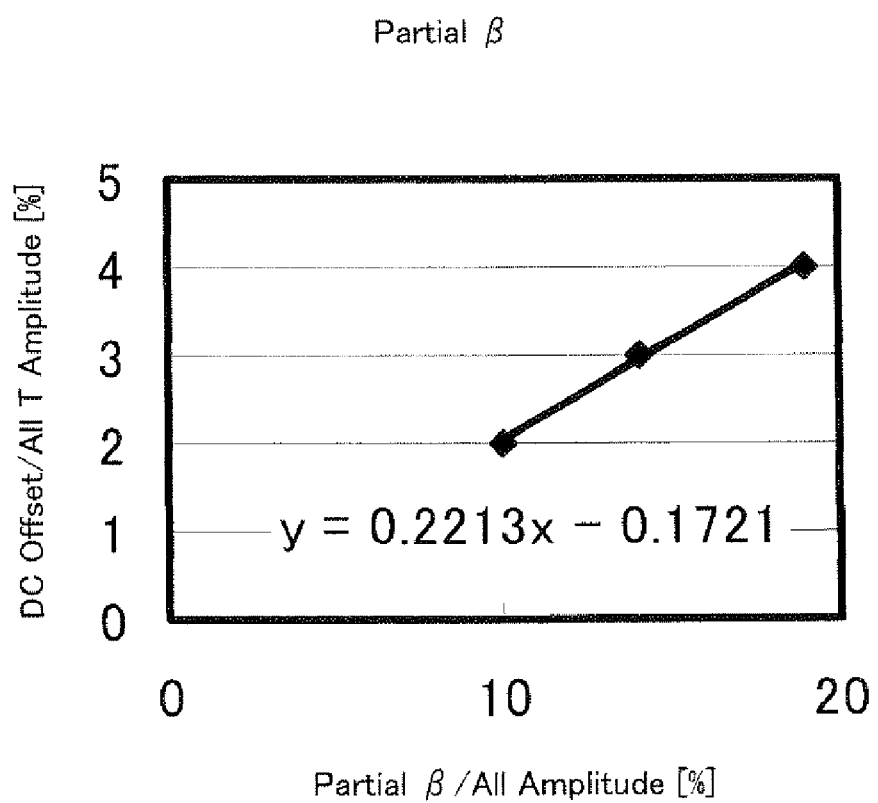

[FIG. 23]
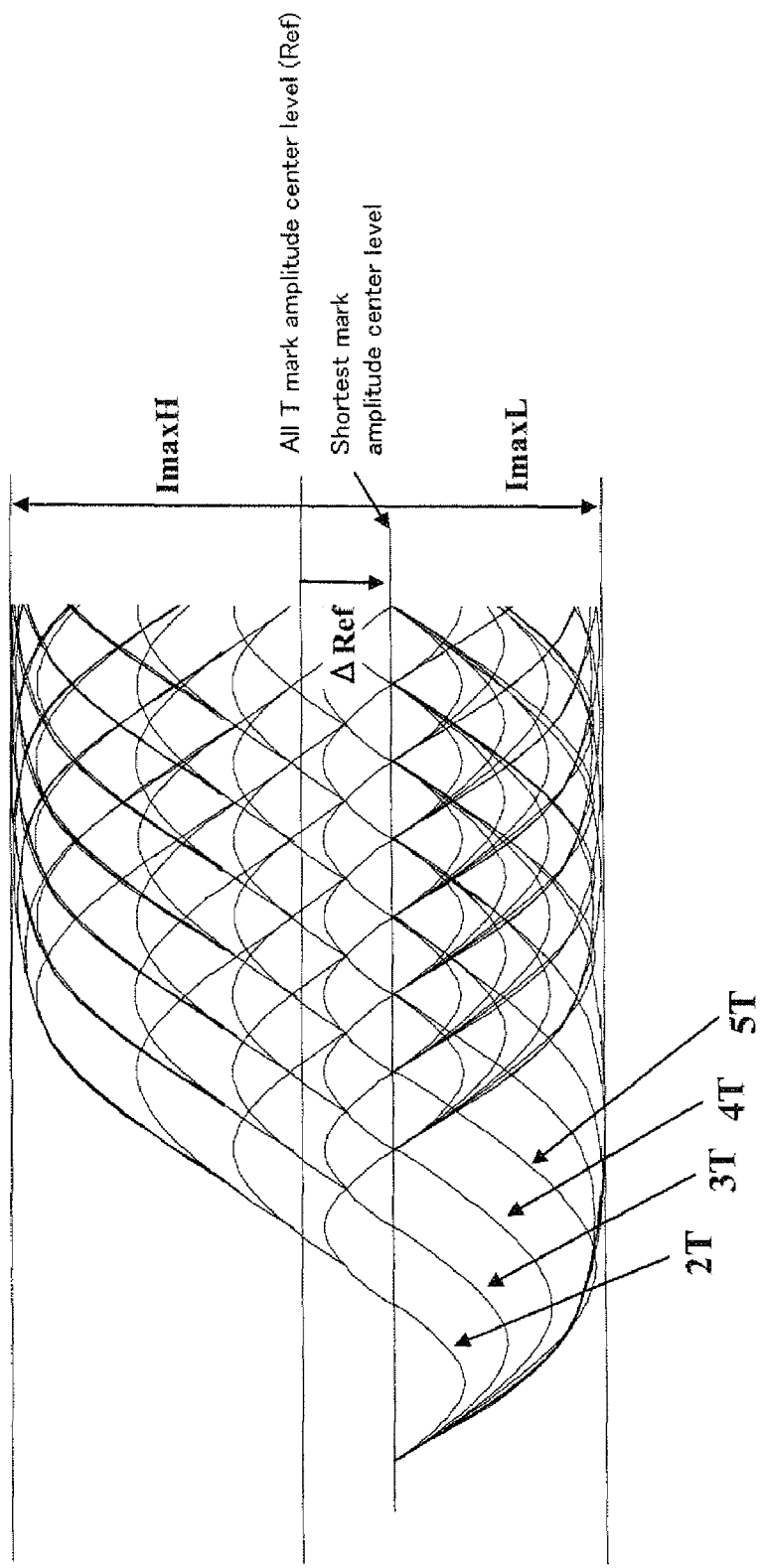

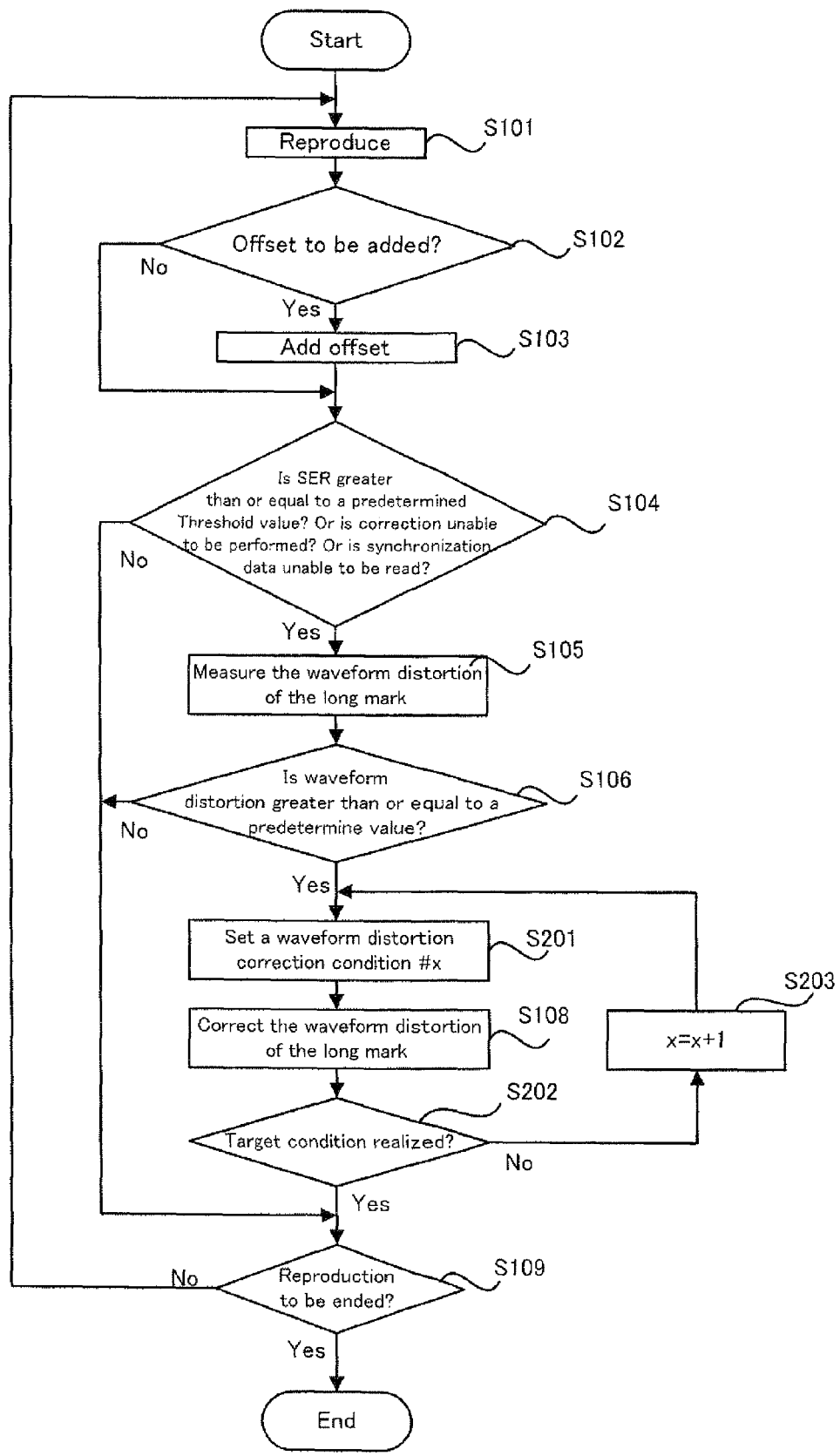
[FIG. 24]

[FIG. 25]
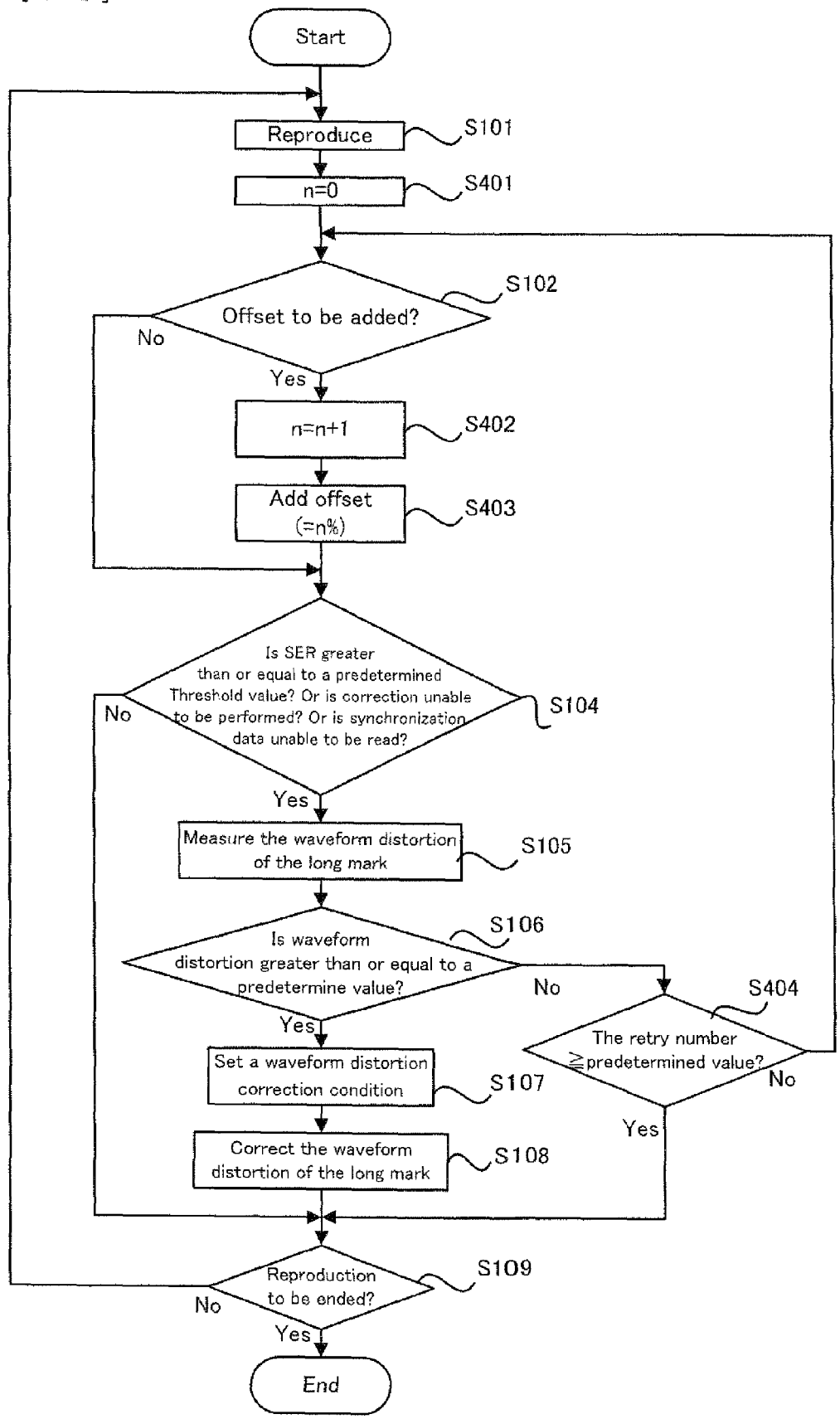

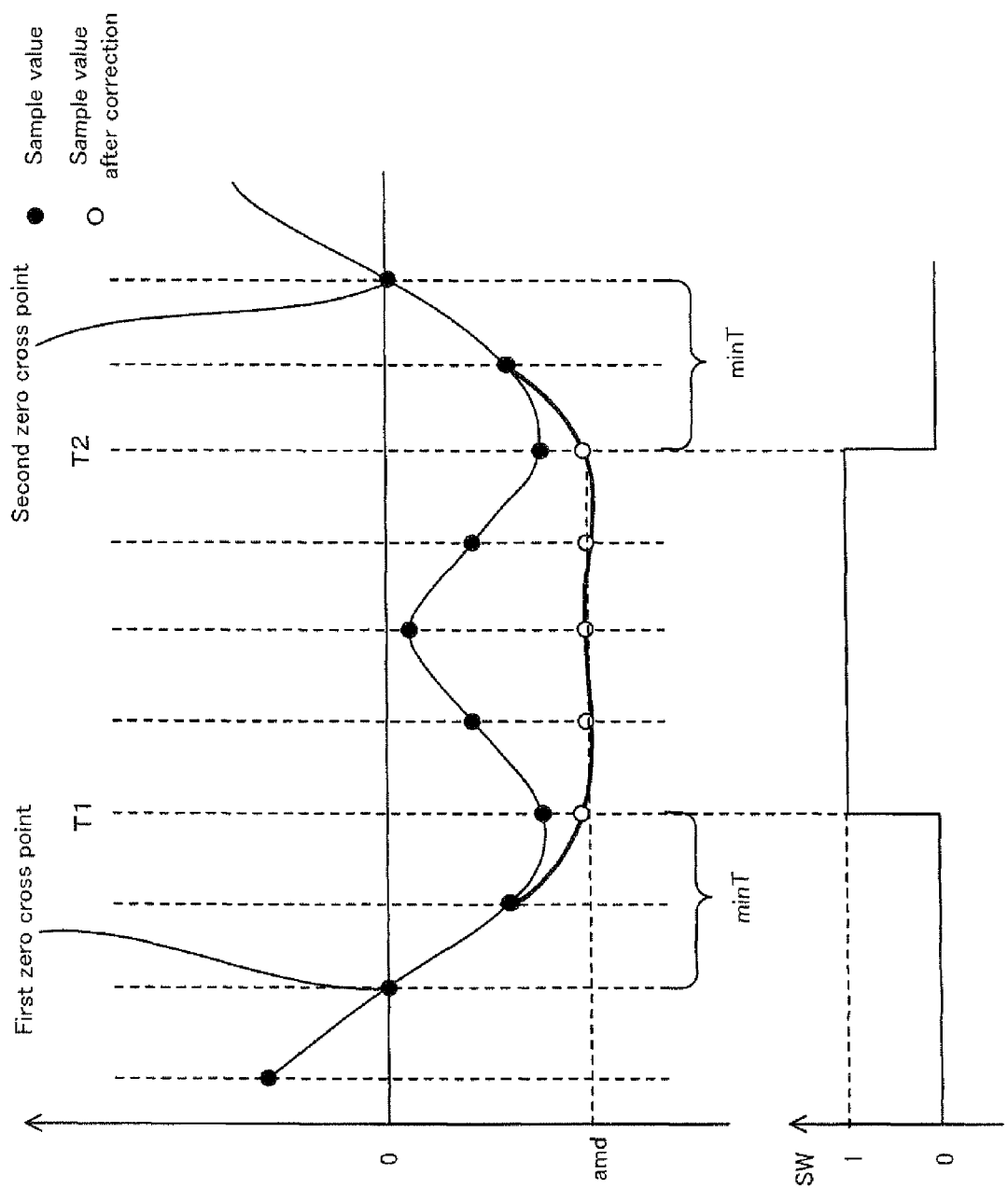
[FIG. 26]

[FIG. 27]
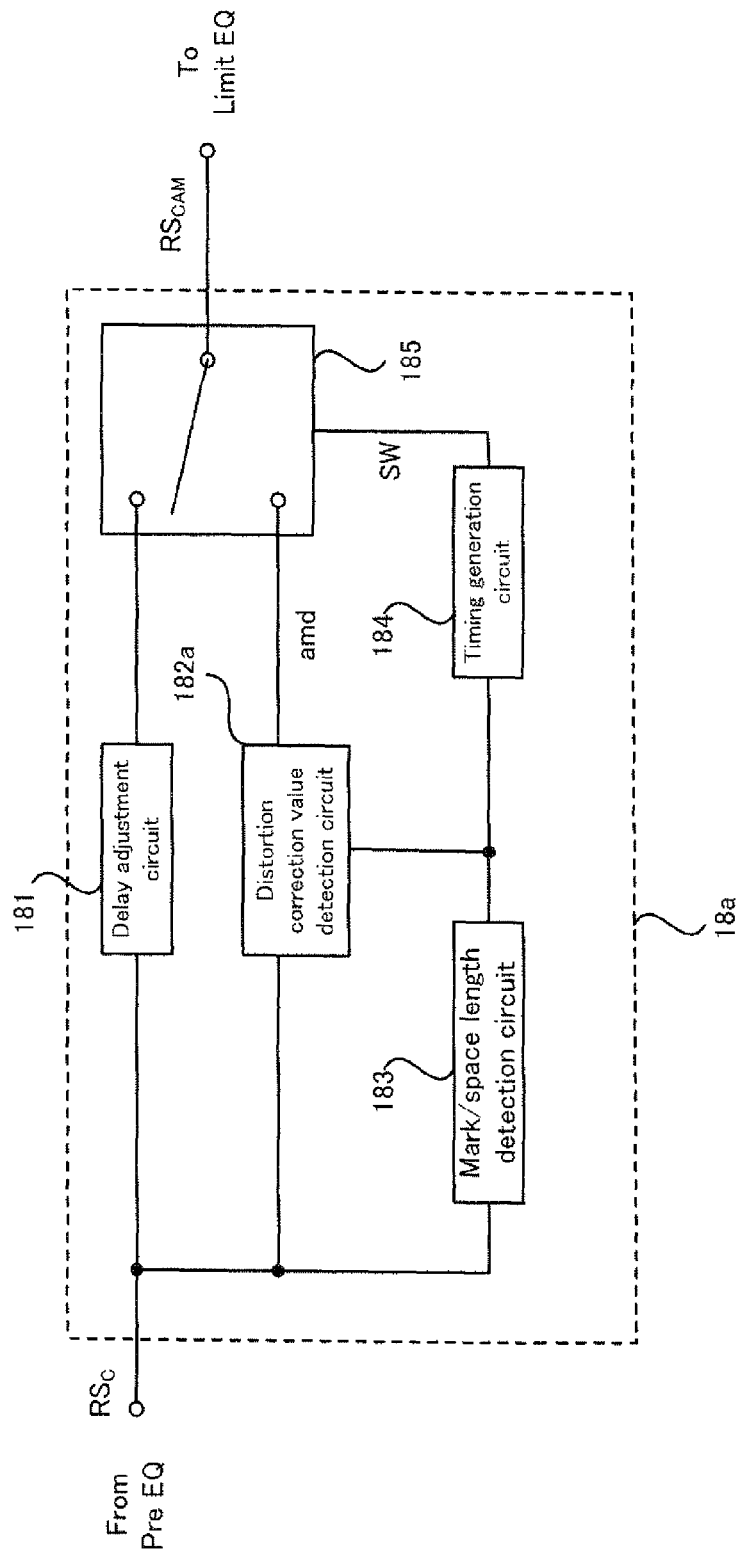

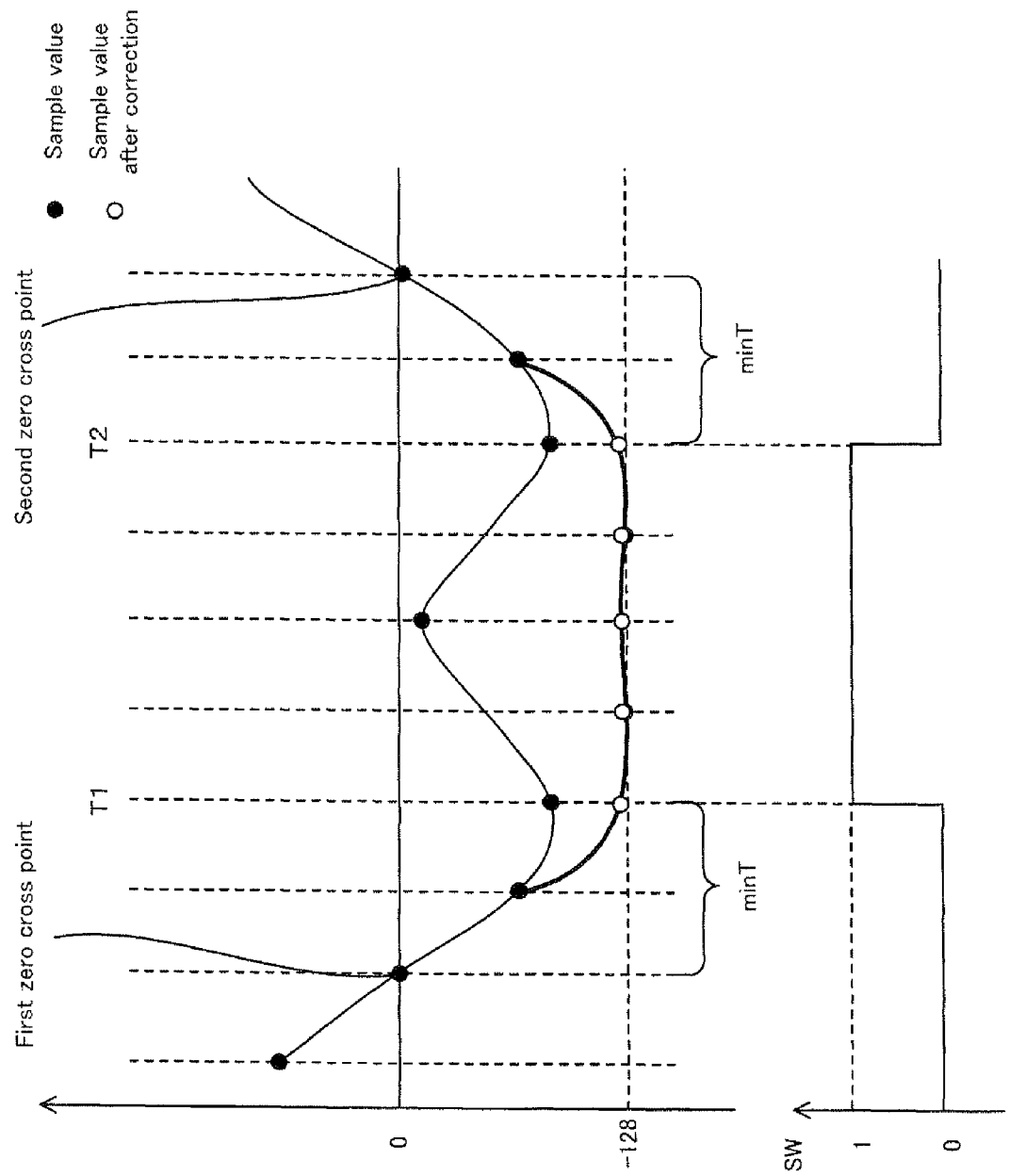
[FIG. 28]

[FIG. 29]
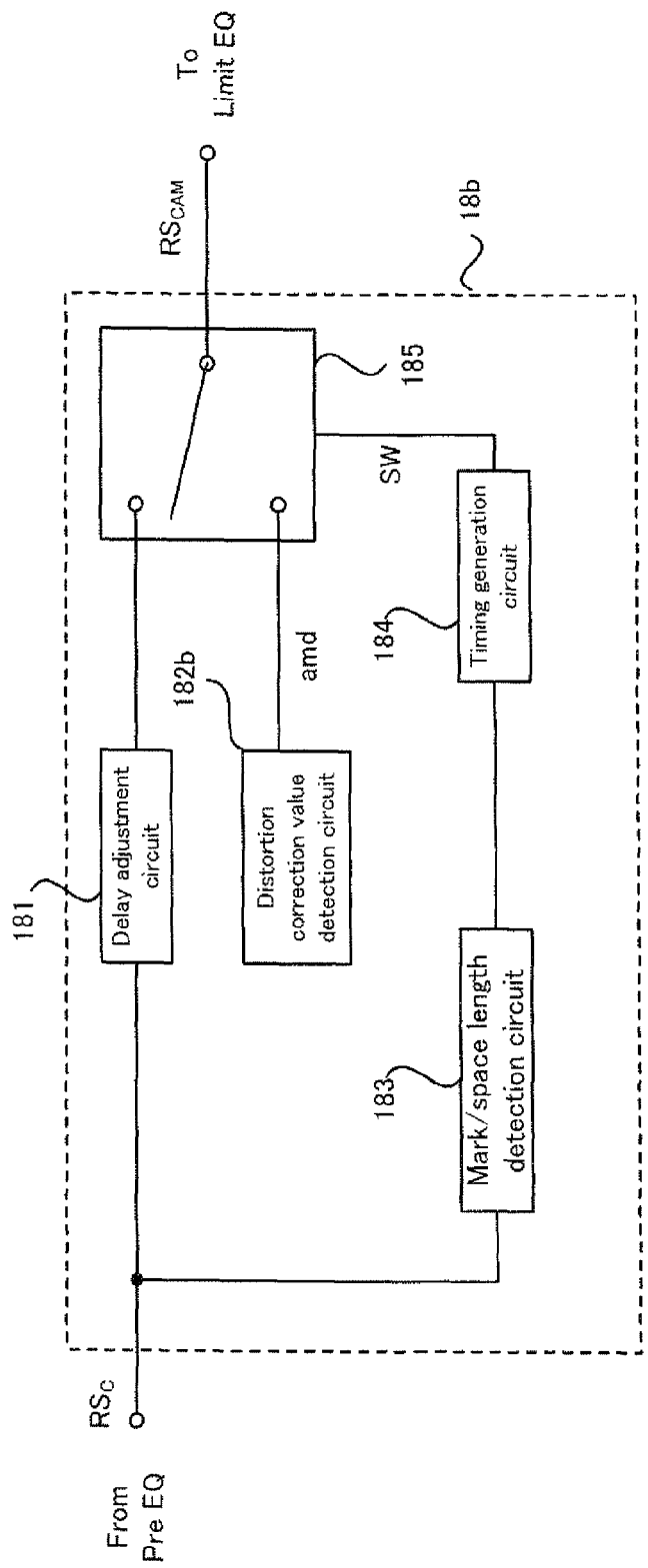

[FIG. 30]
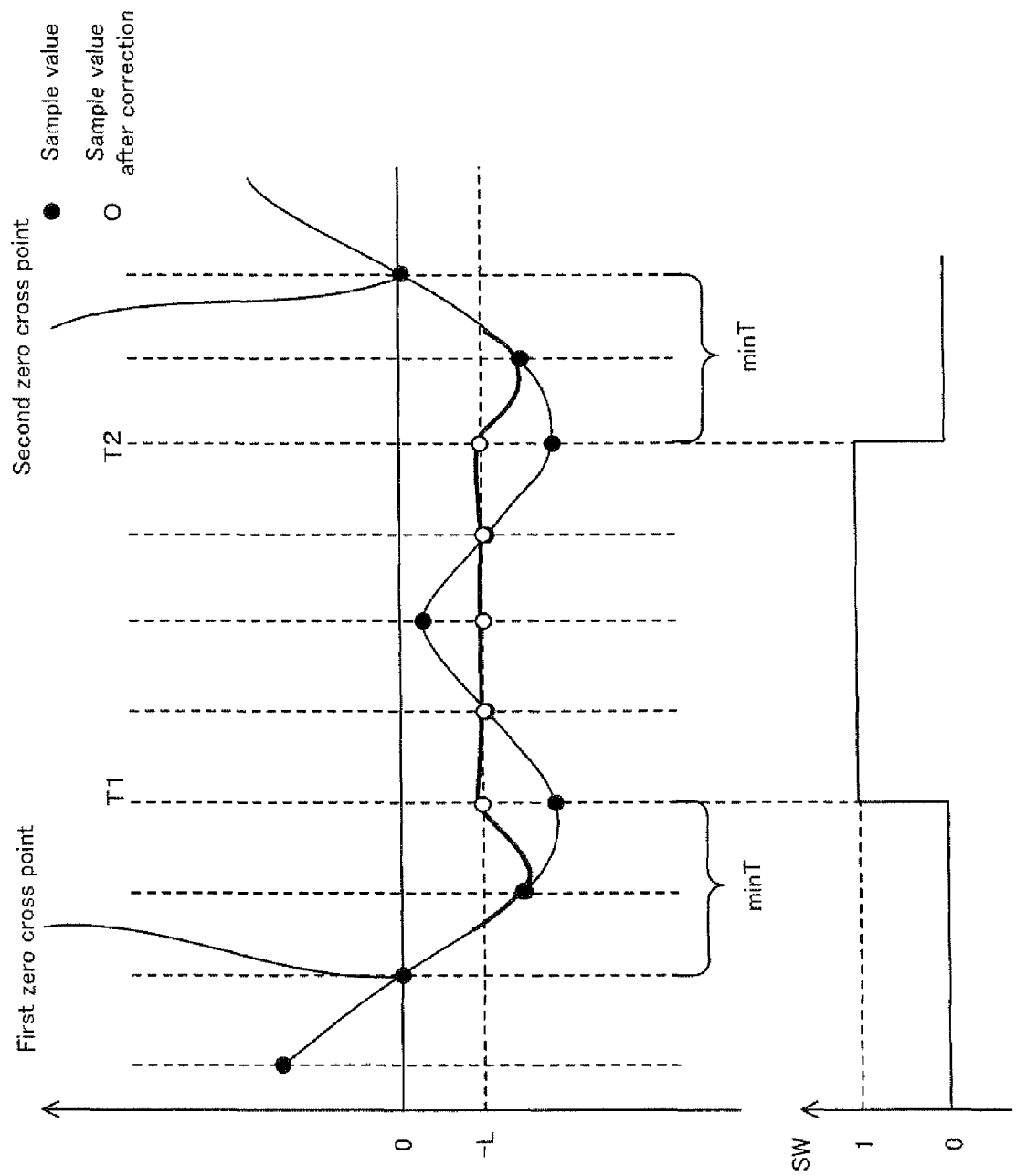

[FIG. 31]
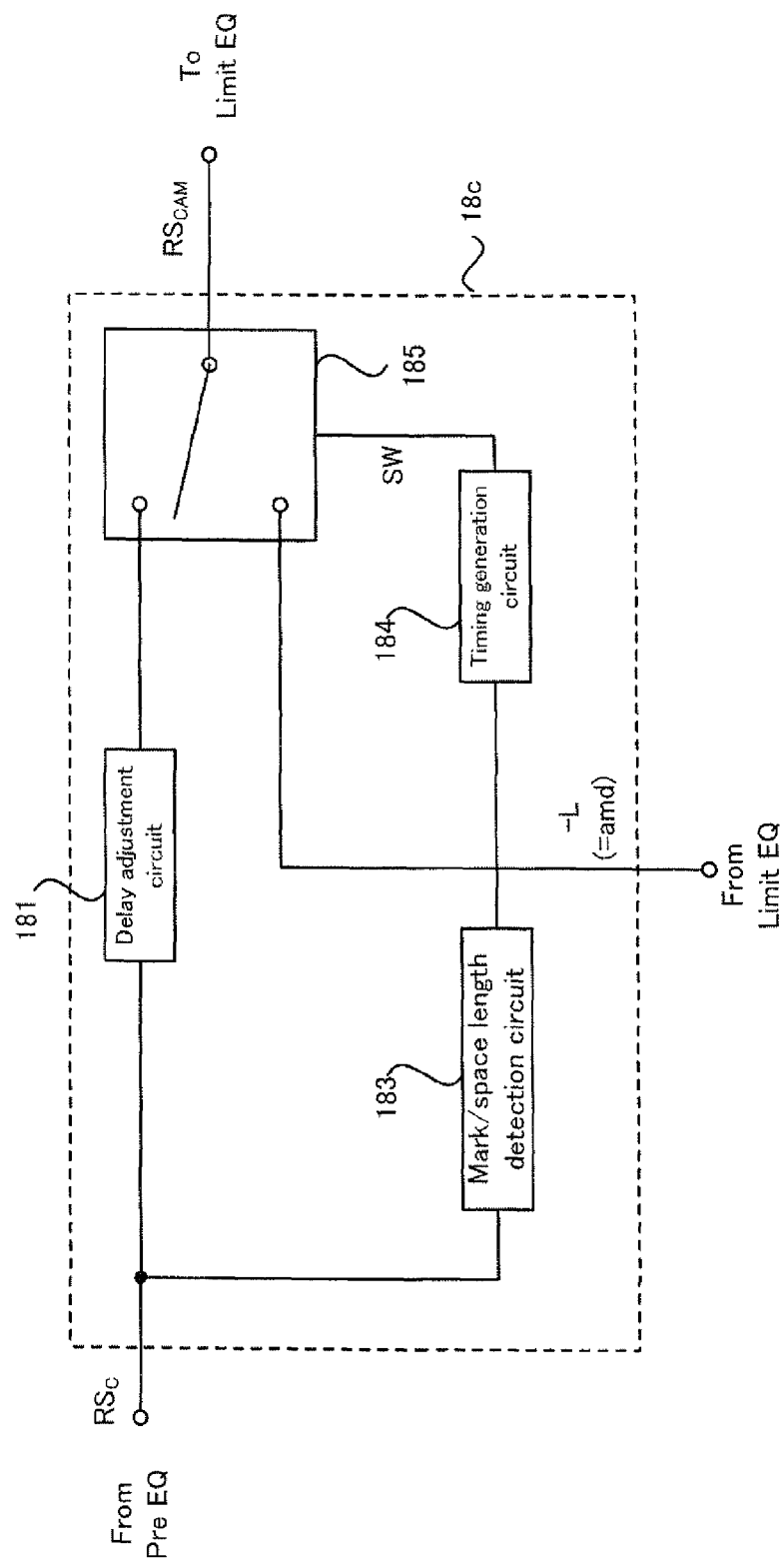

[FIG. 32]
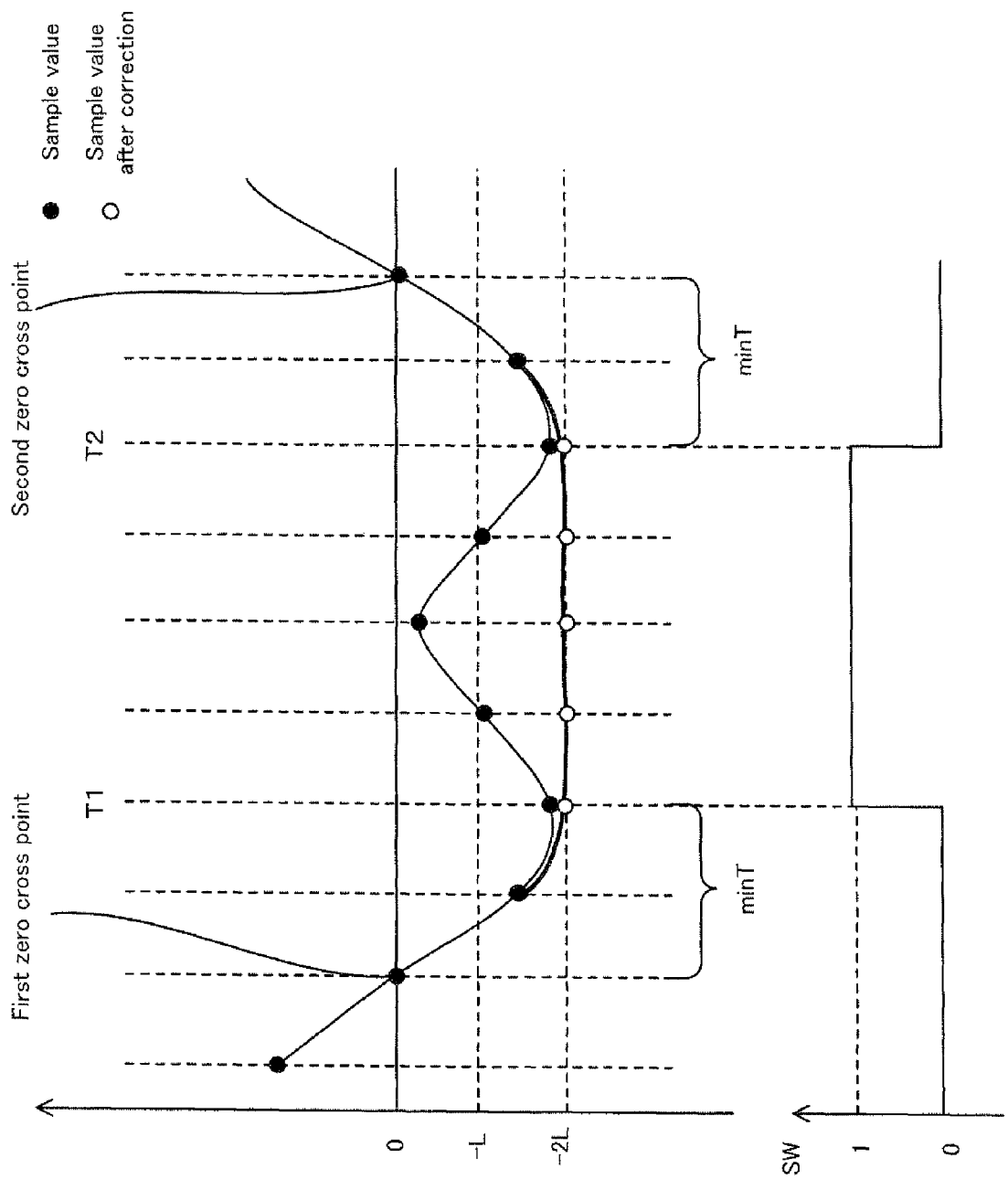

[FIG. 33]
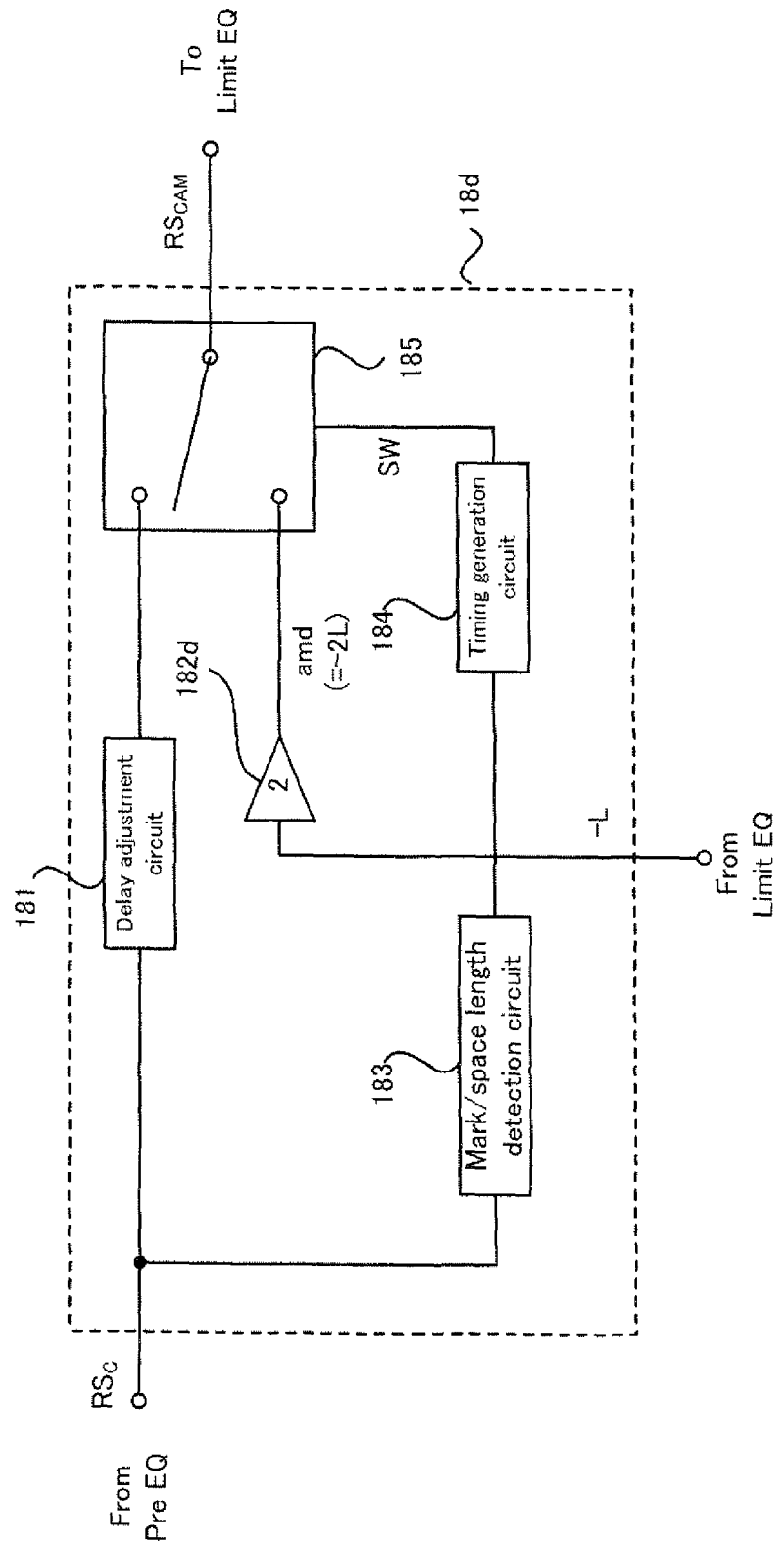

[FIG. 34]
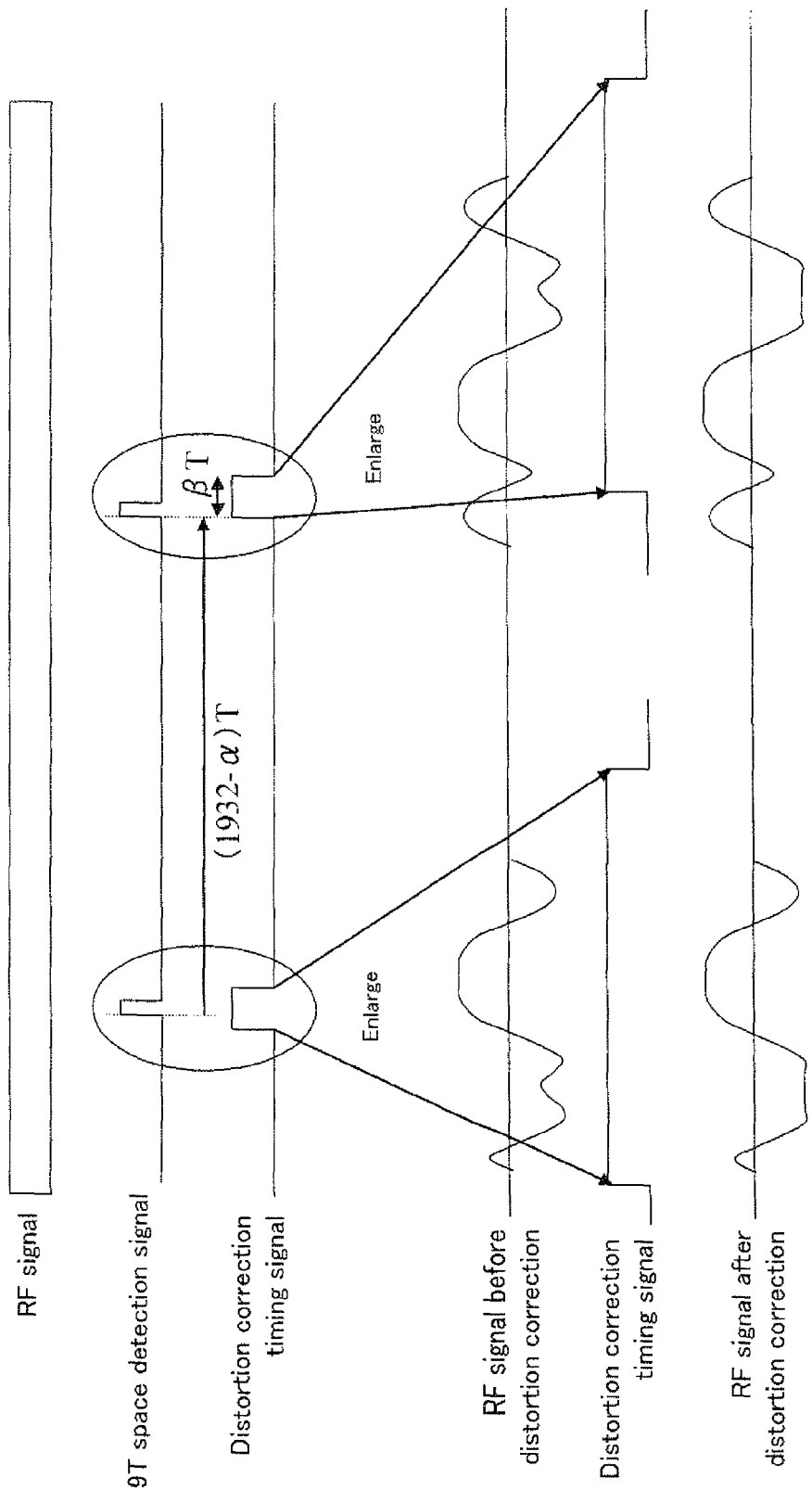

[FIG. 35]
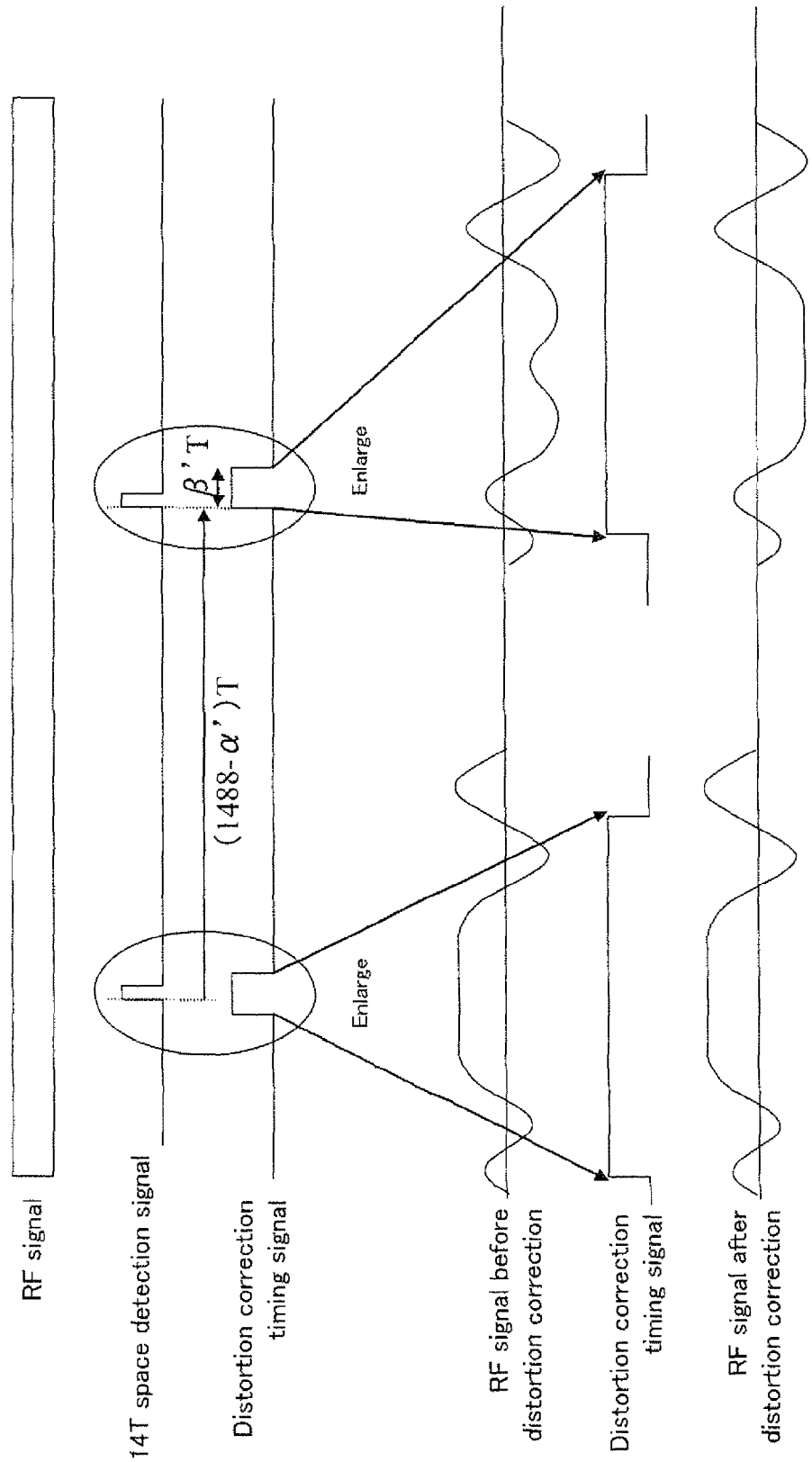

[FIG. 36]
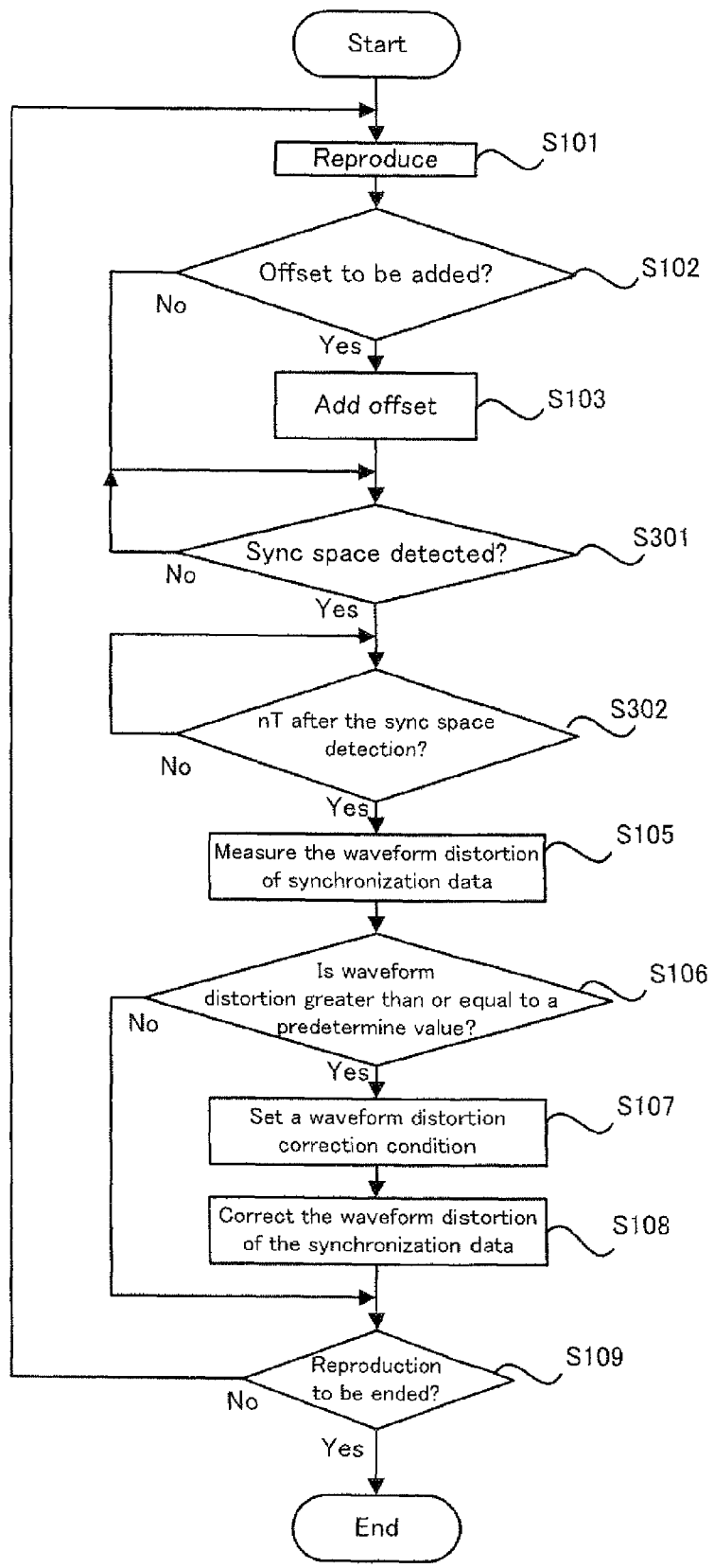

[FIG. 37]
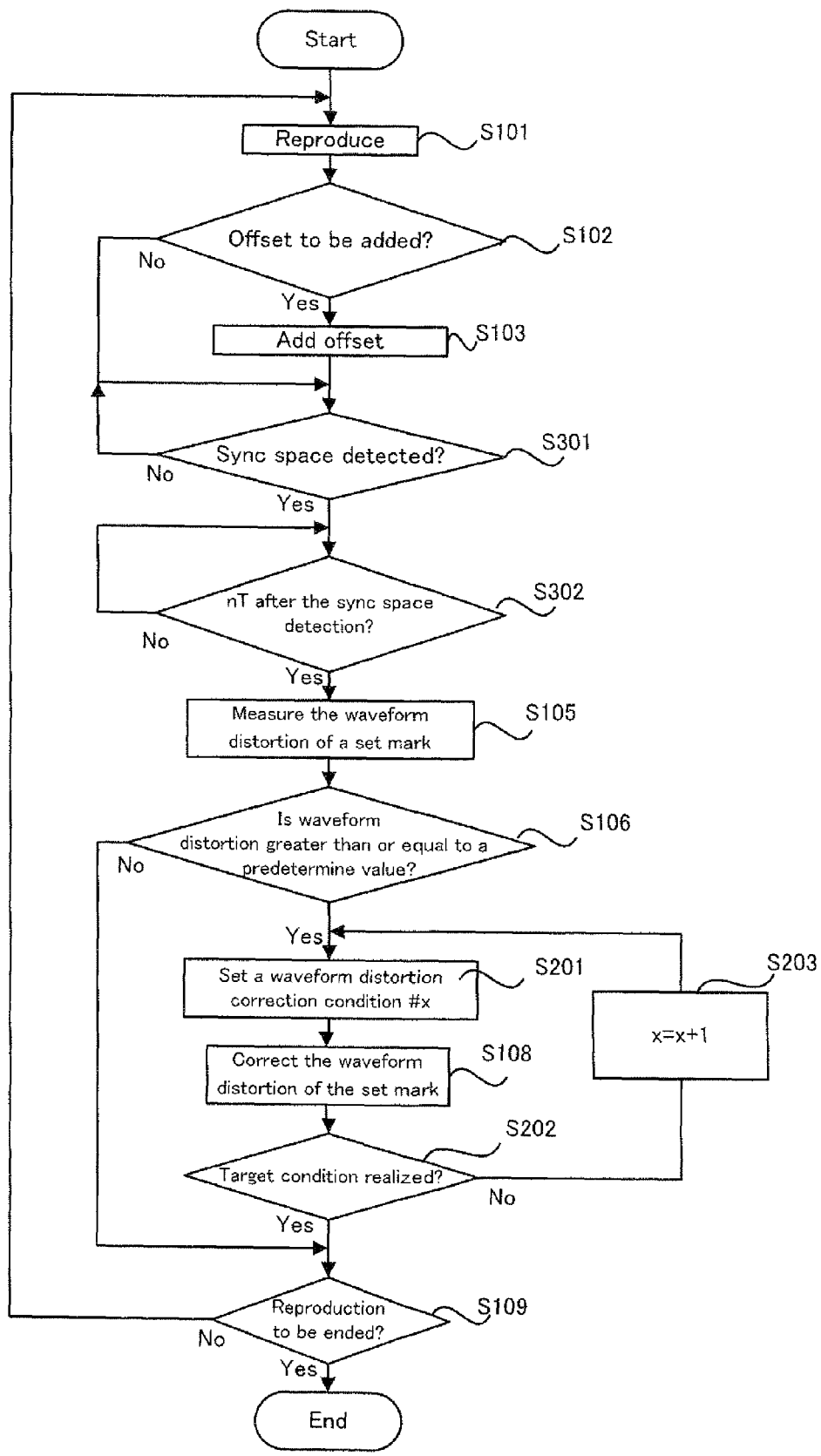

[FIG. 38]
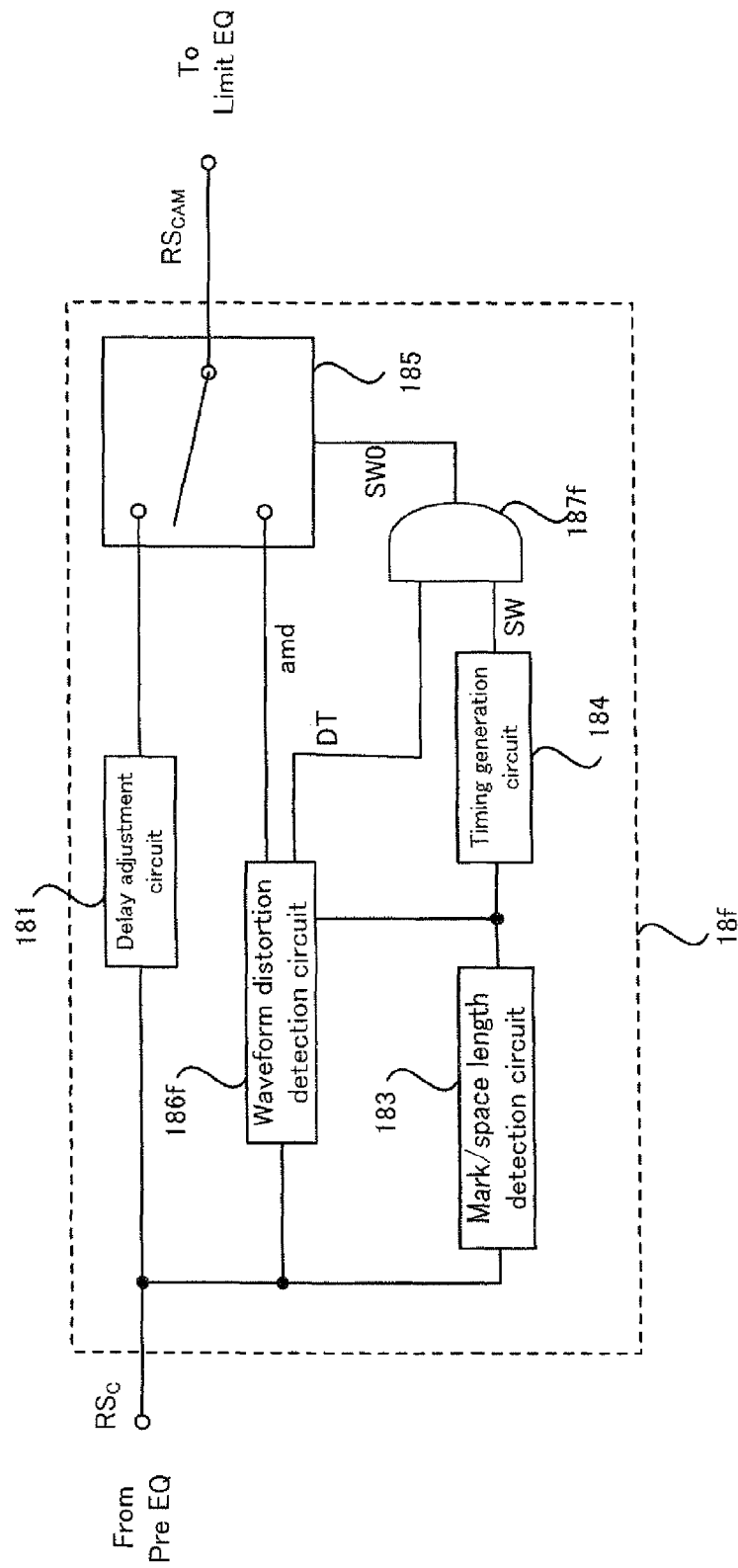

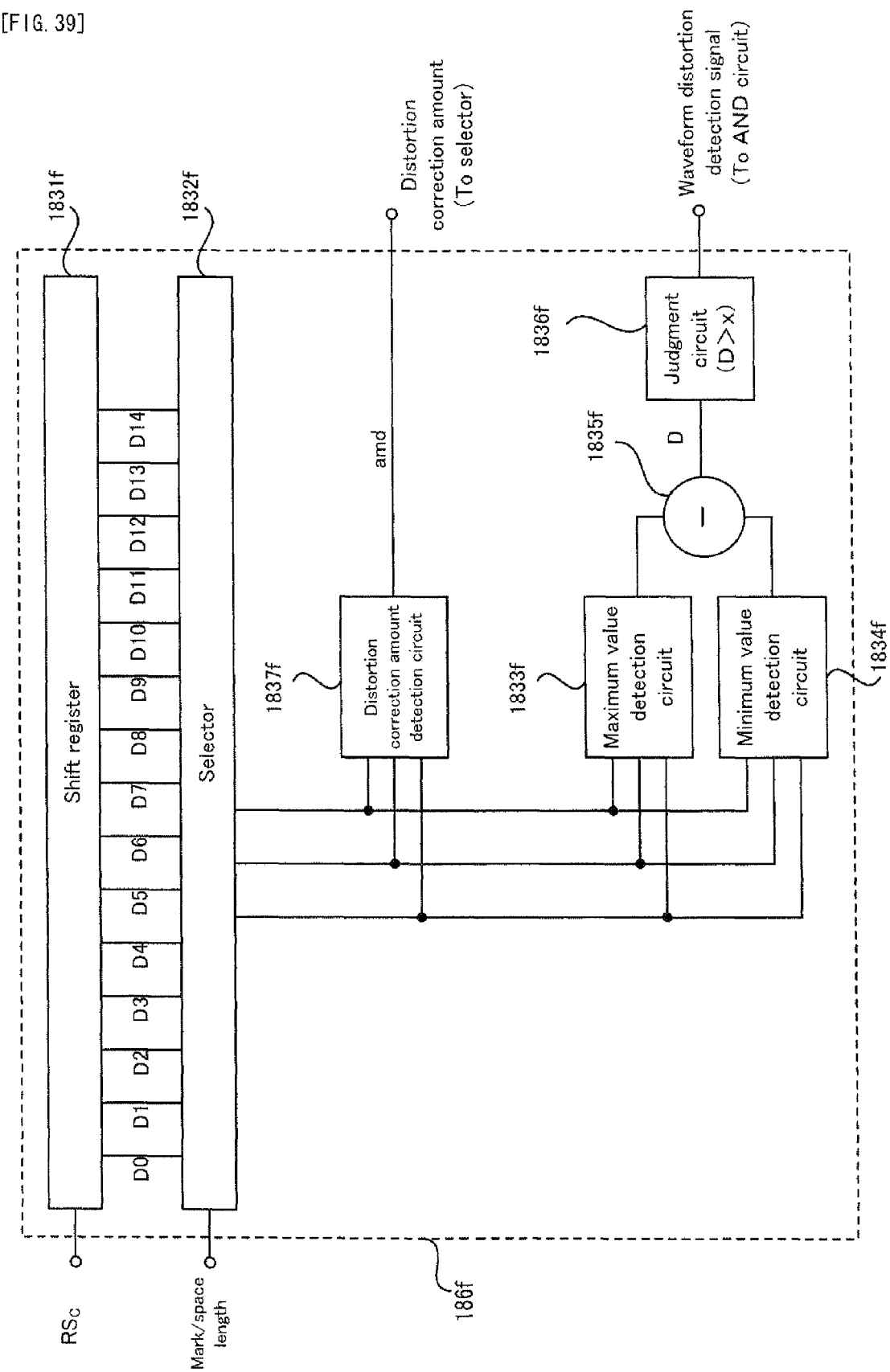
[FIG. 39]

[FIG. 40]
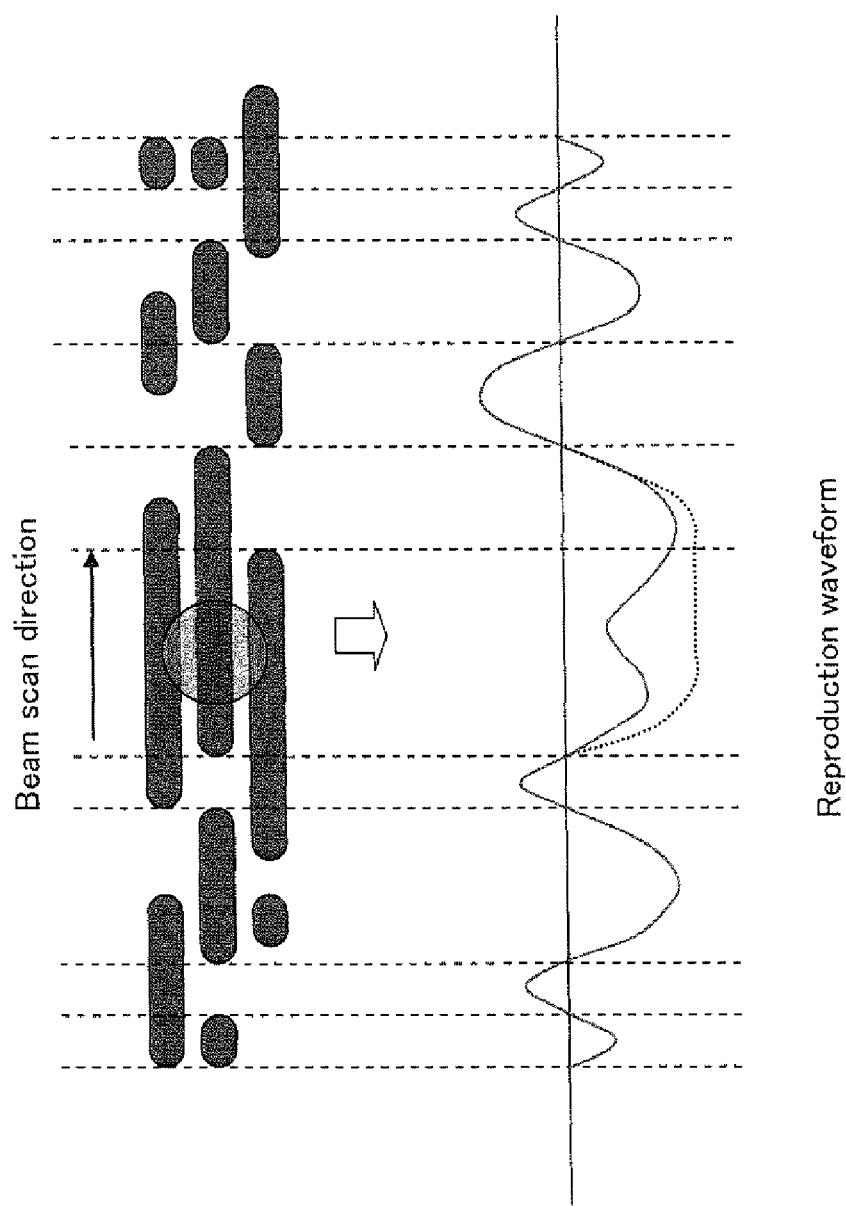

APPARATUS, METHOD AND PROGRAM FOR WAVEFORM EQUALIZATION ON A READ SIGNAL OBTAINED BY READING THE RECORD DATA RECORDED ON A RECORDING MEDIUM

This application is a 371 of PCT/JP2006/324288, filed Dec. 5, 2006.

TECHNICAL FIELD

The present invention relates to an information reproducing apparatus and method which reproduce record data recorded on a recording medium, and particularly relates to an information reproducing apparatus and method which perform waveform equalization, such as a filtering process, on a read signal obtained by reading the record data recorded on the recording medium, as well as a computer program which makes a computer function as the information reproducing apparatus.

BACKGROUND ART

In order to improve an SN ratio of a read signal read from the recording medium on which the data is recorded at high density, there is known a technology by which a filtering process for emphasizing high frequencies is performed on the read signal, for waveform equalization. In particular, according to a patent document 1, it discloses the technology by which the high frequencies can be emphasized without any intersymbol interference by performing the filtering process after amplitude limit is performed on the read signal (a technology about a so-called limit equalizer).
Patent document 1: Japanese Patent No. 3459563

DISCLOSURE OF INVENTION

Subject to be Solved by the Invention

Here, waveform distortion can occur in the read signal. The waveform distortion indicates such a status that there is a discrepancy between a proper signal level to be taken and a signal level that actually appears in the read signal. If the waveform distortion is included in a range in which the amplitude limit is performed on a limit equalizer (i.e. as coherency between the waveform distortion and an amplitude limit value on the limit equalizer increases), the waveform distortion is further emphasized by high-frequency emphasis performed after the amplitude limit. For example, this likely leads to a disadvantage that a mark with a relatively long run length is misjudged to be another mark. Specifically, for example, this likely leads to a disadvantage that a mark with a run length of 8T is misjudged to be a mark with a run length of 4T, a space with a run length of 2T, and a mark with a run length of 2T.

The disadvantage of misjudging the mark is not limited to be on the limit equalizer but may be on various waveform equalizers, such as a PRML (Partial Response Maximum Likelihood) system.

In view of the aforementioned conventional problems, it is therefore an object of the present invention to provide an information reproducing apparatus and method which can preferably reproduce the record data even if the waveform distortion occurs, as well as a computer program.

Means for Solving the Subject

The above object of the present invention can be achieved by an information reproducing apparatus provided with: an offset adding device for adding an offset value which can be set to be variable, to a read signal read from a recording medium; a correcting device for correcting waveform distortion occurring in a read signal corresponding to at least a long mark, of the read signal to which the offset value is added by the offset adding device; and a waveform equalizing device for performing a waveform equalization process on the read signal in which the waveform distortion is corrected.

The above object of the present invention can be also achieved by an information reproducing method provided with: an offset adding process of adding an offset value which can be set to be variable, to a read signal read from a recording medium; a correcting process of correcting waveform distortion occurring in a read signal corresponding to at least a long mark, of the read signal to which the offset value is added by the offset adding process; and a waveform equalizing process of performing a waveform equalization process on the read signal in which the waveform distortion is corrected.

The above object of the present invention can be also achieved by a computer program for reproduction control and for controlling a computer provided in an information reproducing apparatus provided with: an offset adding device for adding an offset value which can be set to be variable, to a read signal read from a recording medium; a correcting device for correcting waveform distortion occurring in a read signal corresponding to at least a long mark, of the read signal to which the offset value is added by the offset adding device; and a waveform equalizing device for performing a waveform equalization process on the read signal in which the waveform distortion is corrected, the computer program making the computer function as at least one portion of the offset adding device, the correcting device, and the waveform equalizing device.

The operation and other advantages of the present invention will become more apparent from the embodiments described below.

BRIEF DESCRIPTION OF DRAWINGS

FIG. 1 is a block diagram conceptually showing the basic structure of an information reproducing apparatus in an example.

FIG. 2 is a block diagram conceptually showing the structure of a limit equalizer in the example.

FIG. 3 is a waveform chart conceptually showing an operation of setting the upper limit and the lower limit of an amplitude limit value, on a sample value series.

FIG. 4 are waveform charts conceptually showing an operation of obtaining a high-frequency emphasized read sample value series, on the sample value series.

FIG. 5 are waveform charts conceptually showing a first example of waveform distortion.

FIG. 6 are waveform charts conceptually showing a second example of waveform distortion.

FIG. 7 is a flowchart conceptually showing a flow of operations of an adder, an offset addition circuit, and a waveform distortion correction circuit.

FIG. 8 is a block diagram conceptually showing the structure of the waveform distortion correction circuit.

FIG. 9 is a waveform chart conceptually showing an operation of correcting the waveform distortion by the waveform distortion correction circuit, on the sample value series.

FIG. 10 is a waveform chart conceptually showing a waveform or the like of a read signal before and after the correction of the waveform distortion.

FIG. 11 are waveform charts conceptually showing the operation of obtaining the high-frequency emphasized read sample value series, on the sample value series, in each of a case where the waveform distortion is not corrected and a case where the waveform distortion is corrected.

FIG. 12 is a graph showing a change in symbol error rate with respect to a waveform distortion ratio.

FIG. 13 is a waveform chart conceptually showing an asymmetry value.

FIG. 14 are graphs showing a change in symbol error rate with respect to an offset value normalized by the amplitude of the read signal.

FIG. 15 are graphs showing a change in the offset value normalized by the amplitude of the read signal, with respect to the asymmetry value.

FIG. 16 are tables showing the appearance probability of the record data with each run length.

FIG. 17 is a waveform chart conceptually showing a waveform of the read signal corresponding to minT according to a change in asymmetry.

FIG. 18 is a waveform chart conceptually showing another waveform or the like of the read signal before and after the correction of the waveform distortion.

FIG. 19 is a waveform chart conceptually showing an entire β value.

FIG. 20 is a graph showing a change in the offset value normalized by the amplitude of the read signal, with respect to the entire β value normalized by the amplitude of the read signal.

FIG. 21 is a waveform chart conceptually showing a partial β value.

FIG. 22 is a graph showing a change in the offset value normalized by the amplitude of the read signal, with respect to the partial β value normalized by the amplitude of the read signal.

FIG. 23 is a waveform chart conceptually showing an α value.

FIG. 24 is a flowchart conceptually showing another flow of operations of the adder, the offset addition circuit, and the waveform distortion correction circuit.

FIG. 25 is a flowchart conceptually showing another flow of operations of the adder, the offset addition circuit, and the waveform distortion correction circuit.

FIG. 26 is a waveform chart conceptually showing an operation of correcting the waveform distortion by a waveform distortion correction circuit provided for an information reproducing apparatus in a first modified example, on the sample value series.

FIG. 27 is a block diagram conceptually showing the structure of the waveform distortion correction circuit provided for the information reproducing apparatus in the first modified example.

FIG. 28 is a waveform chart conceptually showing an operation of correcting the waveform distortion by a waveform distortion correction circuit provided for an information reproducing apparatus in a second modified example, on the sample value series.

FIG. 29 is a block diagram conceptually showing the structure of the waveform distortion correction circuit provided for the information reproducing apparatus in the second modified example.

FIG. 30 is a waveform chart conceptually showing an operation of correcting the waveform distortion by a waveform distortion correction circuit provided for an information reproducing apparatus in a third modified example, on the sample value series.

FIG. 31 is a block diagram conceptually showing the structure of the waveform distortion correction circuit provided for the information reproducing apparatus in the third modified example.

FIG. 32 is a waveform chart conceptually showing an operation of correcting the waveform distortion by a waveform distortion correction circuit provided for an information reproducing apparatus in a fourth modified example, on the sample value series.

FIG. 33 is a block diagram conceptually showing the structure of the waveform distortion correction circuit provided for the information reproducing apparatus in the fourth modified example.

FIG. 34 is a timing chart conceptually showing an operation of correcting the waveform distortion by a waveform distortion correction circuit provided for an information reproducing apparatus in a fifth modified example, on a first read signal.

FIG. 35 is a timing chart conceptually showing the operation of correcting the waveform distortion by the waveform distortion correction circuit provided for the information reproducing apparatus in the fifth modified example, on a second read signal.

FIG. 36 is a flowchart conceptually showing a first flow of operations by the waveform distortion correction circuit provided for the information reproducing apparatus in the fifth modified example.

FIG. 37 is a flowchart conceptually showing a second flow of operations by the waveform distortion correction circuit provided for the information reproducing apparatus in the fifth modified example.

FIG. 38 is a block diagram conceptually showing the structure of a waveform distortion correction circuit provided for an information reproducing apparatus in a sixth modified example.

FIG. 39 is a block diagram conceptually showing the structure of a waveform distortion detection circuit provided for the waveform distortion correction circuit provided for the information reproducing apparatus in the sixth modified example.

FIG. 40 is a plan view schematically showing marks on a recording surface of a read-only type optical disc.

DESCRIPTION OF REFERENCE CODES 1, 2 information reproducing apparatus
10 spindle motor
11 pickup
12 HPF
13 A/D converter
14 pre-equalizer
15 limit equalizer
16 binary circuit
17 decoding circuit
18 waveform distortion correction circuit
181 delay adjustment circuit
182 distortion-correction-value detection circuit
183 mark/space length detection circuit
184 timing generation circuit
185 selector
186 waveform distortion detection circuit
19-1 adder
19-2 offset generation circuit
151 amplitude limit value setting block
1516 averaging circuit
152 amplitude limit block
1522 interpolation filter 1523 limiter
153 high-frequency emphasis block

BEST MODE FOR CARRYING OUT THE INVENTION

Hereinafter, as the best mode for carrying out the present invention, an explanation will be given on embodiments of the information reproducing apparatus and method, and the computer program of the present invention.

Embodiment of Information Reproducing Apparatus

An embodiment of the information reproducing apparatus of the present invention is an information reproducing apparatus provided with: an offset adding device for adding an offset value which can be set to be variable, to a read signal read from a recording medium; a correcting device for correcting waveform distortion occurring in a read signal corresponding to at least a long mark, of the read signal to which the offset value is added by the offset adding device; and a waveform equalizing device for performing a waveform equalization process on the read signal in which the waveform distortion is corrected.

According to the embodiment of the information reproducing apparatus of the present invention, for example, by the operation of the offset adding device, the offset value is added to the read signal. The offset value can be set to be variable, and the offset value can be changed as occasion demands. At this time, the addition of the offset value may be performed once per the read signal, or a plurality of times per the read signal in a stepwise manner.

Then, by the operation of the correcting device, the waveform distortion is corrected which occurs in the read signal corresponding to at least the long mark (e.g. marks with run lengths of 7T to 11T and 14T if the recording medium is a DVD, and marks with run lengths of 6T to 9T if the recording medium is a Blu-ray Disc). Here, the waveform distortion (and more specifically, for example, the signal level or the like of the waveform distortion) is preferably corrected such that the waveform distortion does not have an adverse effect on the waveform equalization by the waveform equalizing device (and specifically, for example, on amplitude limit and high-frequency emphasis filtering described later).

Then, by the operation of the waveform equalizing device, the waveform equalization process is performed on the read signal in which the waveform distortion is corrected. Then, various signal processes (e.g. a binary process, a decoding process, and the like) are performed on the waveform-equalized read signal, and thus, the record data is reproduced.

As described above, since the waveform distortion of the read signal is corrected after the offset value is added to the read signal, even if relatively large asymmetry occurs in the read signal, it is possible to preferably prevent such a disadvantage that the signal level of a space that constitutes the record data with a relatively short run length, which is assumed to be originally greater than or equal to a reference level, is less than or equal to the reference level (or zero level, and the same shall apply hereinafter). If the signal level of the space that constitutes the record data with a relatively short run length is less than or equal to the reference level, the record data is likely misjudged to be the waveform distortion. However, even if the occurrence of the asymmetry causes the signal level of the space that constitutes the record data with a relatively short run length, which is assumed to be originally greater than or equal to a reference level, to be less than or equal to the reference level, the addition of the offset value to the read signal allows the signal level of the space to be greater than or equal to the reference level. Namely, it is possible to preferably prevent such a disadvantage that the record data with a relatively short run length is not misjudged to be the waveform distortion. Incidentally, here, it is aimed at the recording medium in which reflectance is reduced by recording the record data (in other words, in which the reflectance of the mark is less than that of the space).

In the same manner, in the recording medium in which the reflectance is increased by recording the record data (in other words, in which the reflectance of the mark is greater than that of the space), even if the relatively large asymmetry occurs in the read signal, it is possible to preferably prevent such a disadvantage that the signal level of the space that constitutes the record data with a relatively short run length, which is assumed to be originally less than or equal to a reference level, is greater than or equal to the reference level (or zero level, and the same shall apply hereinafter). If the signal level of the space that constitutes the record data with a relatively short run length is greater than or equal to the reference level, the record data is likely misjudged to be the waveform distortion. However, even if the occurrence of the asymmetry causes the signal level of the space that constitutes the record data with a relatively short run length, which is assumed to be originally less than or equal to the reference level, to be greater than or equal to the reference level, the addition of the offset value to the read signal allows the signal level of the space to be less than or equal to the reference level. Namely, it is possible to preferably prevent such a disadvantage that the record data with a relatively short run length is misjudged to be the waveform distortion.

Moreover, since the waveform distortion occurring in the read signal is corrected before the waveform equalization process is performed by the waveform equalizing device, the waveform distortion hardly has or does not have an adverse effect on the waveform equalization process even if the waveform distortion occurs in the read signal read from the recording medium. More specifically, for example, it is possible to preferably prevent such a disadvantage that the waveform distortion is further emphasized or that the waveform distortion remains. In other words, correcting the waveform distortion can preferably prevent such a disadvantage that the long mark is misjudged to be another mark. By this, on the waveform equalizing device, the waveform equalization process can be preferably performed on the read signal. As a result, the record data can be preferably reproduced.

As described above, according to the information reproducing apparatus in the embodiment, even if the waveform distortion occurs, the waveform equalization can be excellently performed. As a result, even if the waveform distortion occurs, the record data can be preferably reproduced.

In one aspect of the embodiment of the information reproducing apparatus of the present invention, the offset adding device adds the offset value to the read signal, thereby adding offset to a reference level of the read signal.

According to this aspect, since the addition of the offset value to the read signal leads to the offset of the reference level, it is possible to preferably receive the aforementioned various effects.

In another aspect of the embodiment of the information reproducing apparatus of the present invention, the offset value is set on the basis of at least one of (i) an asymmetry value which indicates a shift amount between an amplitude center of a read signal obtained by reading record data with the shortest run length of the read signal and an amplitude center of a read signal which provides a maximum amplitude of a read signal; (ii) an entire β value which indicates an average value of the amplitude center of the read signal; and (iii) a partial β value which indicates deviation between the amplitude center of the read signal obtained by reading the record data with the shortest run length of the read signal and the amplitude center of the read signal obtained by reading the record data with the second shortest run length of the read signal.

According to this aspect, it is possible to set the offset value, in view of an influence due to an amplitude shift, an amplitude center shift, or the like of each read signal obtained by reading each record data with a different run length. In other words, it is possible to set the optimum offset value in accordance with the asymmetry value and the β value (specifically, the entire β value and the partial β value) which actually occur.

In an aspect of the information reproducing apparatus in which the offset value is set in accordance with at least one of the asymmetry value, the entire β value, and the partial β value, as described above, the offset value may be a value obtained by multiplying the asymmetry value by an appearance probability, which does not consider the run length, of the record data with the shortest run length with respect to the record data included in the read signal.

By virtue of such construction, it is possible to add the optimum offset value according to the asymmetry value which actually occurs and the appearance probability of the record data with the shortest run length which tends to be a target of misjudgment of the waveform distortion.

Incidentally, the "appearance probability which does not consider the run length" in the embodiment is an appearance probability calculated by assigning an appearance frequency of 1 every time the record data with each run length appears once, regardless of the length of the run length. For example, if there are A record data with a run length of aT, B record data with a run length of bT, and C record data with a run length of cT in the read signal in a certain range, the appearance probability of the record data with a run length of aT is A/(A+B+C), the appearance probability of the record data with a run length of bT is B/(A+B+C), and the appearance probability of the record data with a run length of cT is C (A+B+C).

In an aspect of the information reproducing apparatus in which the offset value is set in accordance with at least one of the asymmetry value, the entire β value, and the partial β value, as described above, the offset value may be a value obtained by multiplying the entire β value by an appearance probability, which does not consider the run length, of the record data with the shortest run length with respect to the record data included in the read signal.

By virtue of such construction, it is possible to add the optimum offset value according to the entire β value which actually occurs and the appearance probability of the record data with the shortest run length which tends to be a target of misjudgment of the waveform distortion.

In an aspect of the information reproducing apparatus in which the offset value is set in accordance with at least one of the asymmetry value, the entire β value, and the partial β value, as described above, the offset value may be a value obtained by multiplying the partial β value by an appearance probability, which considers the run length, of the record data with the shortest run length with respect to the record data included in the read signal.

By virtue of such construction, it is possible to add the optimum offset value according to the partial β value which actually occurs and the appearance probability of the record data with the shortest run length which tends to be a target of misjudgment of the waveform distortion.

Incidentally, the "appearance probability which considers the run length" in the embodiment is an appearance probability calculated by assigning an appearance frequency weighted in accordance with the run length, every time the record data with each run length appears once, in view of the length of the run length. For example, if there are A record data with a run length of aT, B record data with a run length of bT, and C record data with a run length of cT in the read signal in a certain range, the appearance probability of the record data with a run length of aT is a×A/(a×A+b×B+c×C), the appearance probability of the record data with a run length of bT is b×B/(a×A+b×B+e×C), and the appearance probability of the record data with a run length of cT is c×C/(a×A+b×B+c×C).

In another aspect of the embodiment of the information reproducing apparatus of the present invention, the offset value is set on the basis of a positional relation between a reference level of the read signal and an amplitude center of a read signal obtained by reading record data with the shortest run length of the read signal.

According to this aspect, it is possible to set the optimum offset value in accordance with the actual positional relation between the reference level and the amplitude center of the read signal obtained by reading the record data with the shortest run length.

In an aspect of the information reproducing apparatus in which the offset value is added on the basis of the positional relation between the reference level and the amplitude center of the read signal obtained by reading the record data with the shortest run length, the offset value may be a value indicating deviation between a reference level of the read signal and an amplitude center of a read signal obtained by reading record data with the shortest run length of the read signal.

By virtue of such construction, it is possible to set the optimum offset value in accordance with the actual deviation between the reference level and the amplitude center of a read signal obtained by reading record data with the shortest run length.

In another aspect of the embodiment of the information reproducing apparatus of the present invention, the waveform equalizing device is provided with: an amplitude limiting device for limiting an amplitude level of the read signal in which the waveform distortion is corrected, by a predetermined amplitude limit value, thereby obtaining an amplitude limit signal; and a filtering device for performing a high-frequency emphasis filtering process on the amplitude limit signal, thereby obtaining an equalization-corrected signal.

According to this aspect, by the operation of the amplitude limiting device, the amplitude level of the read signal in which the waveform distortion is corrected (hereinafter referred to as a "distortion-corrected signal", as occasion demands) is limited. Specifically, with respect to a signal component of the distortion-corrected signal whose amplitude level is greater than the upper limit of the amplitude limit value or is less than the lower limit of the amplitude limit value, the amplitude level is limited to the upper limit or the lower limit of the amplitude limit value. On the other hand, with respect to a signal component of the distortion-corrected signal whose amplitude level is less than or equal to the upper limit of the amplitude limit or is greater than or equal to the lower limit of the amplitude limit value, its amplitude level is not limited. The distortion-corrected signal in which the amplitude level is limited as described above is outputted to the filtering device as the amplitude limit signal. On the filtering device, the high-frequency emphasis process is performed on the amplitude limit signal. As a result, the equalization-corrected signal is obtained. Then, for example, a binary process, a decoding process, and the like are performed on the equalization-corrected signal. By this, a process of reproducing the record data (e.g. video data, audio data, and the like) recorded on the recording to medium can be performed.

By this, on the filtering device, it is possible to limit or control the occurrence of the dispersion (i.e. jitter) of the read signal (or its sample values), and as a result, it is possible to perform the high-frequency emphasis on the read signal without any intersymbol interference.

Moreover, since the waveform distortion occurring in the read signal is corrected before the waveform equalization process is performed by the waveform equalizing device, the waveform distortion hardly has or does not have an adverse effect on the amplitude limit and the high-frequency emphasis filtering even if the waveform distortion occurs in the read signal read from the recording medium. More specifically, for example, it is possible to preferably prevent such a disadvantage that the waveform distortion is further emphasized, which is caused by that the waveform distortion is less than or equal to the upper limit of the amplitude limit value or is greater than or equal to the lower limit of the amplitude limit value. As a result, for example, it is possible to preferably prevent such a disadvantage that the long mark is misjudged to be another mark. By this, on the limit equalizer (i.e. the amplitude limiting device and the filtering device), the high-frequency emphasis can be preferably performed on the read signal.

In another aspect of the embodiment of the information reproducing apparatus of the present invention, the offset adding device adds the offset value (i) if an error correction of the read signal (more specifically, an error correction of the record data obtained from the read signal) cannot be performed, (ii) if an error rate of the read signal is greater than or equal to a predetermined threshold value, or (iii) if a read signal corresponding to synchronization data cannot be read, the synchronization data being used to read user data included in record data, the synchronization data being included in the record data.

According to this aspect, by selectively adding the offset value in the aforementioned cases, it is possible to receive the aforementioned various effects while reducing a load of the information reproducing apparatus.

Moreover, it is possible to relatively easily realize the optimum offset value by adding the offset value (and particularly changing the offset value as occasion demands) while monitoring whether or not the error correction is unable to be performed, whether or not the error rate of the read signal is greater than or equal to the predetermined threshold value, or whether or not the synchronization data can be read, as occasion demands.

In another aspect of the embodiment of the information reproducing apparatus of the present invention, the correcting device corrects the waveform distortion (i) if an error correction of the read signal cannot be performed, (ii) if an error rate of the read signal is greater than or equal to a predetermined threshold value, or (iii) if a read signal corresponding to synchronization data cannot be read, the synchronization data being used to read user data included in record data, the synchronization data being included in the record data.

According to this aspect, by selectively correcting the waveform distortion in the aforementioned cases, it is possible to receive the aforementioned various effects while reducing the load of the information reproducing apparatus.

In particular, as opposed to the recording medium which allows only sequential recording, various recording statuses are mixed in the recording medium which allows random recording. In this case, it is necessary to read the read signal in which the waveform distortion is discontinuously or discretely distributed or not distributed, or to read the read signal which has various signal levels. Therefore, by reproducing the record data without correcting the waveform distortion in a normal case and by reproducing the record data while selectively correcting the waveform distortion in the aforementioned cases, it is possible to receive the aforementioned various effects while reducing the load of the information reproducing apparatus.

In another aspect of the embodiment of the information reproducing apparatus of the present invention, the long mark is a mark whose signal level is maximum amplitude.

According to this aspect, it is possible to preferably correct the waveform distortion occurring in the read signal corresponding to the long mark.

Embodiment of Information Reproducing Method

An embodiment of the information reproducing method of the present invention is an information reproducing method provided with: an offset adding process of adding an offset value which can be set to be variable, to a read signal read from a recording medium; a correcting process of correcting waveform distortion occurring in a read signal corresponding to at least a long mark, of the read signal to which the offset value is added by the offset adding process; and a waveform equalizing process of performing a waveform equalization process on the read signal in which the waveform distortion is corrected.

According to the embodiment of the information reproducing method of the present invention, it is possible to receive the same various effects as those that can be received by the aforementioned embodiment of the information reproducing apparatus of the present invention.

Incidentally, in response to the various aspects in the aforementioned embodiment of the information reproducing apparatus of the present invention, the embodiment of the information reproducing method of the present invention can also adopt various aspects.

Embodiment of Computer Program

An embodiment of the computer program of the present invention is a computer program for reproduction control and for controlling a computer provided in an information reproducing apparatus provided with: an offset adding device for adding an offset value which can be set to be variable, to a read signal read from a recording medium; a correcting device for correcting waveform distortion occurring in a read signal corresponding to at least a long mark, of the read signal to which the offset value is added by the offset adding device; and a waveform equalizing device for performing a waveform equalization process on the read signal in which the waveform distortion is corrected (i.e. the aforementioned embodiment of the information reproducing apparatus of the present invention (including its various aspects)), the computer program making the computer function as at least one portion of the offset adding device, the correcting device, and the waveform equalizing device.

According to the embodiment of the computer program of the present invention, the aforementioned embodiment of the information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned embodiment of the information reproducing apparatus of the present invention, the embodiment of the computer program of the present invention can also employ various aspects.

An embodiment of the computer program product of the present invention is a computer program product in a computer-readable medium for tangibly embodying a program of instructions executable by a computer provided in an information reproducing apparatus provided with: an offset adding device for adding an offset value which can be set to be variable, to a read signal read from a recording medium; a correcting device for correcting waveform distortion occurring in a read signal corresponding to at least a long mark, of the read signal to which the offset value is added by the offset adding device; and a waveform equalizing device for performing a waveform equalization process on the read signal in which the waveform distortion is corrected (i.e. the aforementioned embodiment of the information reproducing apparatus of the present invention (including its various aspects)), the computer program making the computer function as at least one portion of the offset adding device, the correcting device, and the waveform equalizing device.

According to the embodiment of the computer program product of the present invention, the aforementioned embodiment of the information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the information reproducing apparatus of the present invention.

Incidentally, in response to the various aspects in the aforementioned embodiment of the information reproducing apparatus of the present invention, the embodiment of the computer program product of the present invention can also employ various aspects.

The operation and other advantages of the present invention will become more apparent from the examples explained below.

As explained above, according to the embodiment of the information reproducing apparatus of the present invention, it is provided with the offset adding device, the correcting device, and the waveform equalizing device. According to the embodiment of the information reproducing method of the present invention, it is provided with the offset adding process, the correcting process, and the waveform equalizing process. According to the embodiment of the computer program of the present invention, it makes a computer function as the embodiment of the information reproducing apparatus of the present invention. Therefore, it is possible to preferably reproduce the data even if the waveform distortion occurs.

EXAMPLES

Hereinafter, an example of the present invention will be described on the basis of the drawings.

(1) Basic Structure

Firstly, with reference to FIG. 1, an example of the information reproducing apparatus of the present invention will be described. FIG. 1 is a block diagram conceptually showing the basic structure of the information reproducing apparatus in the example.

As shown in FIG. 1, an information reproducing apparatus 1 in the example is provided with a spindle motor 10, a pickup (PU) 11, a HPF (High Pass Filter) 12, an A/D converter 13, a pre-equalizer 14, a limit equalizer 15, a binary circuit 16, a decoding circuit 17, a waveform distortion correction circuit 18, an adder 19-1, and an offset generation circuit 19-2.

The pickup 11 photoelectrically converts reflected light when a laser beam LB is irradiated to a recording surface of an optical disc 100 rotated by the spindle motor 10, thereby generating a read signal $R_{RF}$.

The HPF 12 removes a low-frequency component of the read signal $R_{RF}$ outputted from the pickup, and it outputs a resulting read signal $R_{HC}$ to the A/D converter 13.

The A/D converter 13 samples the read signal in accordance with a sampling clock outputted from a PLL (Phased Lock Loop) not illustrated or the like, and it outputs a resulting read sample value series RS to the pre-equalizer 14.

The pre-equalizer 14 removes intersymbol interference based on transmission characteristics in an information reading system, which is formed of the pickup 11 and the optical disc 100, and it outputs a resulting read sample value series $RS_C$ to the adder 19-1.

The adder 19-1 constitutes one specific example of the "offset adding device" of the present invention. The adder 19-1 adds an offset value OFS generated on the offset generation circuit, to the read sample value series $RS_C$ outputted from the pre-equalizer 14. The read sample value series $RS_C$ with the offset value OFS added is outputted to the waveform distortion correction circuit 18.

The offset generation circuit 19-2 constitutes one specific example of the "offset adding device" of the present invention and generates the offset value OFS. Incidentally, the offset value OFS will be detailed later (refer to FIG. 13 and subsequent drawings).

The waveform distortion correction circuit 18 constitutes one specific example of the "correcting device" of the present invention. The waveform distortion correction circuit 18 corrects waveform distortion occurring in the read sample value series $RS_C$ (i.e. waveform distortion occurring in the read signal $R_{RF}$). A resulting distortion-corrected read sample value series $RS_{CAM}$ is outputted to the limit equalizer 15.

Incidentally, a specific structure and operations of the waveform distortion correction circuit 18 will be detailed later (refer to FIG. 6 and subsequent drawings).

The limit equalizer 15 performs a high-frequency emphasis process on the distortion-corrected read sample value series $RS_{CAM}$ without increasing the intersymbol interference, and it outputs a resulting high-frequency emphasized read sample value series $RS_H$ to the binary circuit 16.

The binary circuit 16 performs a binary process on the high-frequency emphasized read sample value series $RS_H$, and it outputs a resulting binary signal to the decoding circuit 17.

The decoding circuit 17 performs a decoding process or the like on the binary signal, and it outputs a resulting reproduction signal to external reproduction equipment, such as a display and a speaker. As a result, data recorded on the optical disc 100 (e.g. video data, audio data, and the like) is reproduced.

Next, with reference to FIG. 2, the more detailed structure of the limit equalizer 15 will be described. FIG. 2 is a block diagram conceptually showing the structure of the limit equalizer 15. As shown in FIG. 2, the limit equalizer 15 is provided with an amplitude limit value setting block 151, an amplitude limit block 152, and a high-frequency emphasis block 153.

The amplitude limit value setting block 151 sets the upper limit and the lower limit of an amplitude limit value which are used on the amplitude limit block 152, on the basis of the distortion-corrected read sample value series $RS_{CAM}$. The amplitude limit block 152 performs an amplitude limit process on the distortion-corrected read sample value series $RS_{CAM}$, on the basis of the upper limit and the lower limit of the amplitude limit value which are set on the amplitude limit value setting block 151. A sample value series $RS_{LIM}$ on which the amplitude limit process is performed is outputted to the high-frequency emphasis block 153. The high-frequency emphasis block 153 performs a filtering process for emphasizing high frequencies, on the sample value series $RS_{LIM}$ on which the amplitude limit process is performed. As a result, the high-frequency emphasized read sample value series $RS_H$ is obtained.

More specifically, a reference sample timing detection circuit 1511 detects reference sample timing, on the basis of the distortion-corrected read sample value series $RS_{CAM}$. The detected reference sample timing is outputted to a sample hold circuit 1514 through a delayer 1512 for providing a one-clock delay and an OR circuit 1513. On the sample hold circuit 1514, a sample value series $RS_P$ outputted from an interpolation filter 1522 is sampled and held in accordance with the reference sample timing outputted through the delayer 1512 and the OR circuit 1513.

Incidentally, the interpolation filter 1522 performs an interpolation process on the distortion-corrected read sample value series $RS_{CAM}$, thereby generating an interpolated sample value series which is obtained when the read signal $R_{RF}$ read from the optical disc 100 is sampled in the middle timing of the clock timing based on the sampling clock used on the A/D converter 14. The generated interpolated sample value series is included in the distortion-corrected read sample value series $RS_{CAM}$, and it is outputted to a limiter 1523 and the sample hold circuit 1514, as the sample value series $RS_P$.

In the read sample value series $RS_P$ sampled and held, a reference level Rf is subtracted on a subtracter 1515. Incidentally, if a zero level is used as the reference level Rf, Rf=0. The subtraction result is outputted to an averaging circuit 1516. The averaging circuit 1516 calculates an average value of an absolute value of each of sample values. The calculated average value of sample values is set as the upper limit and the lower limit of the amplitude limit value. Specifically, a value obtained by adding the average value to the reference level is set as the upper limit of the amplitude limit value, and a value obtained by subtracting the average value from the reference level is set as the lower limit of the amplitude limit value. If the zero level is used as the reference level, a value obtained by providing a positive sign for the calculated average value of sample values is set as the upper limit of the amplitude limit value, and a value obtained by providing a negative sign for the calculated average value of sample values is set as the lower limit of the amplitude limit value. In the following explanation, for convenience of explanation, the zero level is used as the reference level Rf.

Specifically, with reference to FIG. 3, an explanation will be given on the upper limit and the lower limit of the amplitude limit value set on the amplitude limit value setting block 151. FIG. 3 is a waveform chart conceptually showing an operation of setting the upper limit and the lower limit of the amplitude limit value, on the distortion-corrected read sample value series $RS_{CAM}$.

FIG. 3 shows the read signal $R_{RF}$ obtained by reading data with a relatively short run length (specifically, data with run lengths of 2T, 3T, and 4T if the optical disc 100 is a Blu-ray Disc) of the read signal; and its distortion-corrected read sample value series $RS_{CAM}$. As shown in FIG. 3, an average value L of absolute values of interpolated sample values (sample values generated on the interpolation filter 1522) located before (i.e. before in terms of time) a zero cross point and interpolated sample values located after (i.e. after in terms of time) the zero cross point is set as the absolute value of the upper value and the lower value of the amplitude limit value. In other words, the upper limit of the amplitude limit value is set as L, and the lower limit of the amplitude limit value is set as –L.

Back in FIG. 2 again, the limiter 1523 performs amplitude limit on the sample value series $RS_P$ on the basis of the upper limit and the lower limit which are set on the amplitude limit value setting block 151. Specifically, if a sample value included in the sample value series $RS_P$ is less than the upper limit L and greater than the lower limit –L, the sample value is outputted as the sample value series $RS_{LIM}$ as it is. On the one hand, if a sample value included in the sample value series $RS_P$ is greater than or equal to the upper limit L, the upper limit L is outputted as the sample value series $RS_{LIM}$. On the other hand, if a sample value included in the sample value series $RS_P$ is less than or equal to the upper limit –L, the lower limit –L is outputted as the sample value series $RS_{LIM}$.

The high-frequency emphasis block 153 increases the signal level of only the sample value series $RS_{LIM}$ corresponding to data with the shortest run length (e.g. the data with a run length of 3T if the optical disc 100 is a DVD, and the data with a run length of 2T if the optical disc 100 is a Blu-ray Disc) in the sample value series $RS_{LIM}$.

Specifically, the sample value series $RS_{LIM}$ inputted to the high-frequency emphasis block 153 is inputted to coefficient multipliers 1535 and 1538 having a multiplier coefficient of –k and coefficient multipliers 1536 and 1537 having a multiplier coefficient of k, as it is or through delayers 1532, 1533, and 1534 for providing a one-clock delay. The outputs of the coefficient multipliers 1535, 1536, 1537, and 1538 are added on an adder 1539. The addition result, a high-frequency read sample value $RS_{HIG}$, is added to the distortion-corrected read sample value series $RS_{CAM}$ which is inputted to the adder 1531 through the delayer 1530 for providing a three-clock delay, on the adder 1531. As a result, the high-frequency emphasized read sample value series $RS_H$ is obtained.

Now, with reference to FIG. 4, an operation of obtaining the high-frequency emphasized read sample value series $RS_H$ will be described in more detail. FIG. 4 are waveform charts conceptually showing the operation of obtaining the high-frequency emphasized read sample value series $RS_H$, on the distortion-corrected read sample value series $RS_{CAM}$.

As shown in FIG. 4(a), the high-frequency read sample value $RS_{HIG}$ outputted from the adder 1531 is calculated on the basis of the sample values at respective time points D (–1.5), D(–0.5), D(0.5), and D(1.5) in the sample value series $RS_{LIM}$. Specifically, if the sample values at the respective time points D (–1.5), D(–0.5), D(0.5), and D(1.5) in the sample value series $RS_{LIM}$ are Sip(–1), Sip(0), Sip(1), and Sip(2), then, $RS_{HIG}=(-k)\times Sip(-1)+k\times Sip(0)+k\times Sip(1)+(-k)\times Sip(2)$.

At this time, as shown in FIG. 4(b), the sample values Sip(–1) and Sip(0) at the respective time points D(–1.5) and D(–0.5) corresponding to the data with a run length of 2T are substantially equal to each other. Moreover, the sample values Sip(1) and Sip(2) at the respective time points D(0.5) and D(1.5) corresponding to the data with a run length of 2T are substantially equal to each other.

Moreover, as shown in FIG. 4(c), the sample values Sip(−1) and Sip(0) at the respective time points D(−1.5) and D(−0.5) corresponding to the data with each of run lengths of 3T and 4T are both the upper limit L of the amplitude limit value, due to the amplitude limit by the amplitude limit block 152. In the same manner, the sample values Sip(1) and Sip(2) at the respective time points D(0.5) and D(1.5) corresponding to the data with each of run lengths of 3T and 4T are both the lower limit −L of the amplitude limit value, due to the amplitude limit by the amplitude limit block 152. In other words, the dispersion of the sample values before and after the reference sample point is forcibly controlled.

Thus, even if the value of the coefficient k is increased on the coefficient multipliers 1535, 1536, 1537, and 1538 in order to increase the high-frequency emphasis, the high-frequency read sample value $RS_{HIG}$ obtained at the zero cross point D(0) is kept constant. Therefore, the intersymbol interference does not occur. As described above, according to the information reproducing apparatus 1 provided with the limit equalizer 15, the dispersion of the sample values before and after the zero cross point in the read signal, which causes the intersymbol interference, is forcibly controlled in performing the high-frequency emphasis. Thus, even if the sufficient high-frequency emphasis is performed on the high-frequency emphasis block 153, the intersymbol interference does not occur.

In particular, in the information reproducing apparatus 1 in the example, the waveform distortion is corrected after the offset value OFS is added to the read signal $R_{RF}$ (and more specifically, the read sample value series $RS_C$), and then, the amplitude limit and the high-frequency emphasis are performed on the limit equalizer 15. Hereinafter, a detailed explanation will be given on specific examples of the offset value OFS and the waveform distortion correction.

(2) Waveform Distortion

Firstly, with reference to FIG. 5 and FIG. 6, the waveform distortion will be described. FIG. 5 are waveform charts conceptually showing a first example of waveform distortion. FIG. 6 are waveform charts conceptually showing a second example of waveform distortion.

As shown in FIG. 5(a), the waveform distortion indicates a difference between a proper signal level to be taken and a signal level that actually appears in the read signal $R_{RF}$. The waveform distortion is quantitatively defined by a waveform distortion amount D for the maximum amplitude A of the read signal $R_{RF}$, and a waveform distortion amount D' which is a signal level from the zero level to the peak of the waveform distortion. In FIG. 5(a), a thick dashed line denotes the proper signal level to be taken when there is no waveform distortion. If there is no waveform distortion, the waveform distortion amount D is obviously zero.

Incidentally, the waveform distortion shown in FIG. 5(a) shows such waveform distortion that the signal level in a middle portion is changed, compared to the signal level in a front edge portion and a rear edge portion of the read signal $R_{RF}$. Apart from such waveform distortion, there can be such waveform distortion that the signal level in the front edge portion and the middle portion is changed, compared to the signal level in the rear edge portion of the read signal $R_{RF}$ as shown in FIG. 5(b); and such waveform distortion that the signal level in the middle edge portion and the rear portion is changed, compared to the signal level in the front edge portion of the read signal $R_{RF}$ as shown in FIG. 5(c). For any waveform distortion, the structure and operation described later can be obviously adopted.

Moreover, in FIG. 5(a) to FIG. 5(c), an explanation was given on the waveform distortion occurring on the optical disc 100 in which the reflectance of the laser beam LB is reduced by forming the marks. In other words, an explanation was given on the example in which the waveform distortion occurs such that the signal level unintentionally increases in the signal level which is the zero level or less. However, as shown in FIG. 6(a), there can be also the waveform distortion occurring on the optical disc 100 (or so-called low-to-high disc) in which the reflectance of the laser beam LB is increased by recording the data, as in an optical disc such as a Blu-ray disc in which a pigmented film is used as a recording layer. In other words, such waveform distortion can occur that the signal level unintentionally reduces in the signal level which is the zero level or more. Incidentally, in the case where such waveform distortion can occur that the signal level unintentionally reduces in the signal level which is the zero level or more, there can be such waveform distortion that the signal level in the front edge portion and the middle portion is changed, compared to the signal level in the rear edge portion of the read signal $R_{RF}$, as shown in FIG. 6(b), as in the case where such waveform distortion occurs that the signal level unintentionally reduces as shown in FIG. 5(b), in the signal level which is the zero level or more. Moreover, there can be also such waveform distortion that the signal level in the middle portion and the rear edge portion is changed, compared to the signal level in the front edge portion of the read signal $R_{RF}$, as shown in FIG. 6(c), as in the case where such waveform distortion occurs that the signal level unintentionally reduces shown in FIG. 5(c).

Moreover, in the example, it is preferable to focus on the waveform distortion which occurs in the read signal corresponding to the record mark with a relatively long run length (hereinafter referred to as a "long mark": e.g. data with run lengths of 7T to 11T or 14T if the optical disc 100 is a DVD, and data with run lengths of 6T to 9T if the optical disc 100 is a Blu-ray Disc). Alternatively, with emphasis on the importance of synchronization data (i.e. sync data), it is preferable to focus on the waveform distortion which occurs in the read signal corresponding to the mark corresponding to the synchronization data (e.g. data with a run length of 14T if the optical disc 100 is a DVD, and data with a run length of 9T if the optical disc 100 is a Blu-ray Disc).

(3) Operation Example

Next, with reference to FIG. 7 to FIG. 9, an explanation will be given on a specific operation example of the adder 19-1, the offset addition circuit 19-2, and the waveform distortion correction circuit 18. FIG. 7 is a flowchart conceptually showing a flow of operations of the adder 19-1, the offset addition circuit 19-2, and the waveform distortion correction circuit 18. FIG. 8 is a block diagram conceptually showing the structure of the waveform distortion correction circuit 18. FIG. 9 is a waveform chart conceptually showing an operation of correcting the waveform distortion by the waveform distortion correction circuit 18, on the sample value series $RS_C$.

As shown in FIG. 7, firstly, an operation of reproducing data recorded on the optical disc 100 is performed (step S101).

In the reproduction operation, by the operation of the offset generation circuit 19-2, it is judged or determined whether or not the offset value OFS is to be added to the read signal $R_{RF}$ (and more specifically the read sample value series $RS_C$) (step S102). The judgment may be performed, for example, on the basis of an α value described later. For example, it may be judged that the offset value OFS is not added if the α value is substantially 0, and it may be judged that the offset value OFS is added if the α value is not substantially 0. Alternatively, the judgment may be performed on the same judgment criterion as that of the judgment in a step S104 described later. For example, it may be judged that the offset value OFS is not added if a symbol error rate is not greater than or equal to a predetermined threshold value, and error correction is not unable to be performed, and synchronization data is not unable to be read, and it may be judged that the offset value OFS is added if the symbol error rate is greater than or equal to the predetermined threshold value, or the error correction is unable to be performed, or the synchronization data is unable to be read.

As a result of the judgment in the step S102, if it is judged that the offset value OFS is not to be added (the step S102: No), the operational flow goes to a step S104.

On the other hand, as a result of the judgment in the step S102, if it is judged that the offset value OFS is to be added (the step S102: Yes), the offset value OFS is generated by the operation of the offset generation circuit 19-2, and the generated offset value OFS is added to the read signal $R_{RF}$ (and more specifically the read sample value series $RS_C$) by the operation of the adder 19-1 (step S103). After that, the operational flow goes to the step S104.

Then, it is sequentially judged whether or not a symbol error rate (SER) is greater than or equal to a predetermined threshold value, or whether or not error correction using an ECC (Error Correction Code) or the like is unable to be performed, or whether or not the synchronization data is unable to be read (step S104). Here, the predetermined threshold value is preferably set on the basis of whether or not the preferable reproduction is performed. Specifically, it is preferable to set the value of the symbol error rate which does not allow the preferable reproduction operation (e.g. approximately 0.001 or more), as the predetermined threshold value.

As a result of the judgment in the step S104, if it is judged that the symbol error rate is not greater than or equal to the threshold value, and that the error correction is not unable to be performed, and that the synchronization data is not unable to be read (the step S104: No), the operational flow goes to a step S109.

On the other hand, as a result of the judgment in the step S104, if it is judged that the symbol error rate is greater than or equal to the threshold value, or that the error correction is unable to be performed, or that the synchronization data is unable to be read (the step S104: Yes), then, the waveform distortion of the long mark is measured (step S105). Here, a waveform distortion ratio (i.e. D/A×100) which indicates a ratio of the waveform distortion amount D (or D') to the maximum amplitude A of the read signal $R_{RF}$.

Then, it is judged whether or not the waveform distortion is greater than or equal to a predetermined value (step S106). For example, it is judged whether or not the waveform distortion ratio is greater than or equal to approximately 30%.

As a result of the judgment in the step S106, if it is judged that the waveform distortion is not greater than or equal to the predetermined value (e.g. that the waveform distortion ratio is less than or equal to approximately 30%) (the step S106: No), the operational flow goes to the step S109.

On the other hand, as a result of the judgment in the step S106, if it is judged that the waveform distortion is greater than or equal to the predetermined value (e.g. that the waveform distortion ratio is greater than or equal to approximately 30%) (the step S106: Yes), then, a waveform distortion correction condition, such as a correction level and a correction range for the waveform distortion, is set (step S107). The waveform distortion correction condition will be detailed later (refer to FIG. 9 and the like).

Then, the waveform distortion of the long mark is corrected on the basis of the waveform distortion correction condition set in the step S107 (step S108).

Then, it is judged whether or not the reproduction operation is to be ended (step S109), and if the reproduction operation is not to be ended (the step S109: No), the operational flow returns to the step S101, and the operations after the step S101 are repeated again.

Of the operations shown in FIG. 7, the operation about the correction of the waveform distortion is performed mainly by the waveform distortion correction circuit 18. Now, the specific circuit structure of the waveform distortion correction circuit will be described.

As shown in FIG. 8, the waveform distortion correction circuit 18 is provided with a delay adjustment circuit 181, a distortion correction value detection circuit 182, a mark/space length detection circuit 183, a timing generation circuit 184, and a selector 185.

The read sample value series $RS_C$ outputted from the pre-equalizer 14 is outputted to each of the delay adjustment circuit 181, the distortion correction value detection circuit 182, and the mark/space length detection circuit 183.

The distortion correction value detection circuit 182 holds a sample value S(k) at a time point which is a time corresponding to minT after the zero cross point and outputs it as a distortion correction value amd to the selector 185.

Incidentally, minT indicates the read signal $R_{RF}$ corresponding to the record data with the shortest run length (and more specifically the read sample value series $RS_C$ corresponding to the read signal $R_{RF}$). For example, if the optical disc 100 is a DVD, the minT indicates the read signal $R_{RF}$ corresponding to the record data with a run length of 3T. For example, if the optical disc 100 is a Blu-ray Disc, the minT indicates the read signal $R_{RF}$ corresponding to the record data with a run length of 2T.

Moreover, the delay adjustment circuit 181 sets a delay amount corresponding to the longest run length of the record data and outputs the read sample value series $RS_C$ to the selector 185 in desired timing. Specifically, if the optical disc 100 is a Blu-ray Disc, the delay adjustment circuit 181 sets a delay amount corresponding to the longest run length of 9T, and if the optical disc 100 is a DVD, the delay adjustment circuit 181 sets a delay amount corresponding to the longest run length of 14T.

The mark/space length detection circuit 183 detects a mark/space length by detecting an interval between the zero cross points, the number of continuous coded bits, and the like. The detection result is outputted to the timing generation circuit 184.

The timing generation circuit 184 generates a timing signal SW on the basis of the mark/space length detected on the mark/space length detection circuit 183 and outputs the generated timing signal SW to the selector 185.

Specifically, the timing generation circuit 184 generates a high-level timing signal SW (SW=1) (i) if the mark/space length detected on the mark/space length detection circuit 183 is the long mark which is a target of the waveform distortion correction and (ii) in a period between a time point T1 which is at least a time corresponding to the minT after a first zero cross point and a time point T2 which is the time corresponding to the minT before a second zero cross point located next to the first zero cross point, and the timing generation circuit 184 outputs the generated timing signal SW to the selector 185. On the other hand, the timing generation circuit 184 generates a low-level timing signal SW (SW=0) (i) if the mark/space length detected on the mark/space length detection circuit 183 is a mark other than the long mark which is a target of the waveform distortion correction or (ii) in a period other than the period between the time point T1 which is at least a time corresponding to the minT after the first zero cross point and the time point T2 which is the time corresponding to the minT before the second zero cross point located next to the first zero cross point, and the timing generation circuit 184 outputs the generated timing signal SW to the selector 185.

If the high-level timing signal SW is outputted from the timing generation circuit 184, the selector 185 outputs the distortion correction value amd outputted from the distortion correction value detection circuit 182, to the limit equalizer 15 as the distortion-corrected read sample value series $RS_{CAM}$. On the other hand, if the low-level timing signal SW is outputted from the timing generation circuit 184, the selector 185 outputs the read sample value series $RS_C$ outputted from the delay adjustment circuit 181, to the limit equalizer 15 as the distortion-corrected read sample value series $RS_{CAM}$.

Incidentally, the waveform distortion correction condition set in the step S107 in FIG. 7 substantially corresponds to the distortion correction value amd detected on the distortion correction value detection circuit 182 and the timing signal SW generated on the timing generation circuit 184.

The operations by the waveform distortion correction circuit 18 will be described more clearly on a waveform chart showing the sample value series $RS_C$.

As shown in FIG. 9, in the period between the time point T1 which is at least the time corresponding to the minT after the first zero cross point and the time point T2 which is the time corresponding to the minT before the second zero cross point located next to the first zero cross point (i.e. in the period in which the timing signal SW is at high level), sample values included in the sample value series $RS_C$ are corrected to the distortion correction value amd detected on the distortion correction value detection circuit 182. As a result, the waveform distortion is corrected.

An effect obtained by correcting the waveform distortion will be described with reference to FIG. 10 to FIG. 12. FIG. 10 is a waveform chart conceptually showing a waveform or the like of the read signal $R_{RF}$ before and after the correction of the waveform distortion. FIG. 11 are waveform charts conceptually showing the operation of obtaining the high-frequency emphasized read sample value series $RS_H$, on the sample value series $RS_C$, in each of a case where the waveform distortion is not corrected and a case where the waveform distortion is corrected. FIG. 12 is a graph showing a change in symbol error rate with respect to the waveform distortion ratio.

As shown on the left side of FIG. 10, if the waveform distortion occurs in the read signal $R_{RF}$, the waveform distortion is likely misjudged to be the normal mark (e.g. the mark with a relatively short run length). Therefore, the binary waveform after binarizing the read signal $R_{RF}$ includes an error signal caused by the waveform distortion. This results in inconsistency with the original record data and causes a binary error.

On the other hand, as shown on the right side of FIG. 10, if the waveform distortion occurring in the read signal $R_{RF}$ is corrected, the binary waveform after binarizing the read signal $R_{RF}$ no longer includes the error signal caused by the waveform distortion. This results in consistency with the original record data and does not cause the binary error.

More specifically explaining this, depending on a condition such as the magnitude of the waveform distortion, as shown in FIG. 11(a), the waveform distortion likely has a signal level which is greater than the lower limit −L of the amplitude limit value on the limit equalizer 15. In this case, the high-frequency emphasized read sample value series $RS_H$ outputted from the high-frequency emphasis block 153 is the sum of a high-frequency emphasized read sample value series $RS_{HIG}$ and S(0), and as described above, $RS_{HIG}$=(−k)×Sip(−1)+k×Sip(0)+k×Sip(1)+(−k)×Sip(2). Here, since Sip(−1) and Sip(2) are limited by the lower limit −L, $RS_H$=S(0)+k×(−2×−L+Sip(0)+Sip(1)). This increases the value of the high-frequency emphasized read sample value series $RS_H$, by the value obtained by multiplying the sum of the lower limit −L, Sip (0), and Sip(1) by K. This is not preferable because it emphasizes the waveform distortion which is originally not to occur. Moreover, for example, the emphasized waveform distortion likely leads to such a disadvantage that the mark with a relatively long run length in which the waveform distortion occurs is misjudged to be another mark in an information reproducing apparatus which adopts the PRML. This results in the binary error.

Moreover, this is not illustrated, but in the same manner, in the optical disc 100 in which the reflectance of the laser beam LB is reduced by forming the marks shown in FIG. 6(a) to FIG. 6(c), Sip(−1) and Sip(2) are limited by the upper limit L, so that $RS_H$=S(0)+k×(−2×L+Sip(0)+Sip(1)). This increases the value of the high-frequency emphasized read sample value series $RS_H$, by the value obtained by multiplying the sum of the upper limit L, Sip (0), and Sip(1) by K. This is not preferable because it emphasizes the waveform distortion which is originally not to occur.

On the other hand, as shown in FIG. 11(b), if the waveform distortion is corrected, the signal level of the waveform distortion can be corrected to be a signal level which is less than or equal to the lower limit −L of the amplitude limit value on the limit equalizer 15. In this case, Sip(−1) and Sip(0), and Sip(1) and Sip(2) are limited by the lower limit −L, so that $RS_H$=S(0). Thus, it is possible to prevent such a disadvantage that the waveform distortion is emphasized, and as a result, it is possible to prevent such a disadvantage that the binary error occurs.

Moreover, this is not illustrated, but in the same manner, in the optical disc 100 in which the reflectance of the laser beam LB is reduced by forming the marks shown in FIG. 6(a) to FIG. 6(c), if the waveform distortion is corrected, Sip(−1) and Sip(0), and Sip(1) and Sip(2) are limited by the upper limit L, so that $RS_H$=S(0). Thus, it is possible to prevent such a disadvantage that the waveform distortion is emphasized, and as a result, it is possible to prevent such a disadvantage that the binary error occurs.

As described above, the effect by correcting the waveform distortion can be also seen from a change in symbol error rate with respect to the waveform distortion ratio. As shown in FIG. 12, the value of SER in the case where the waveform distortion is corrected is improved, compared to the value of SER in the case where the waveform distortion is not corrected.

As explained above, according to the information reproducing apparatus 1 in the example, the dispersion of the sample values before and after the reference sample point is forcibly controlled in the read signal which causes the intersymbol interference in the high-frequency emphasis. Thus, even if the sufficient high-frequency emphasis is performed on the high-frequency emphasis block 153, the intersymbol interference does not occur.

In particular, according to the information reproducing apparatus 1 in the example, the amplitude limit and the high-frequency emphasis are performed on the limit equalizer 15 after the waveform distortion is corrected. Thus, it is possible to preferably prevent such a disadvantage that the waveform distortion which is originally not to occur is emphasized on the limit equalizer 15. Moreover, it is possible to preferably prevent such a disadvantage that the mark with a relatively long run length is misjudged to be another mark, in the information reproducing apparatus which adopts the PRML for example due to the emphasized waveform distortion. As a result, the waveform distortion rarely causes the binary error, and this allows the preferable reproduction operation.

In addition, since the offset value OFS is added to the read signal $R_{RF}$ (and more specifically the read sample value series $RS_C$) before the waveform distortion is corrected, the following effect can be also received. Hereinafter, with reference to FIG. 13 to FIG. 19, an explanation will be given on the effect obtained by adding the offset value OFS, as well as the explanation of generating operation of the offset value OFS.

(3-1) Addition of Offset Value OFS Based on Asymmetry Value

Firstly, an explanation will be given on the addition of the offset value OFS based on an asymmetry value, with reference to FIG. 13 to FIG. 18. FIG. 13 is a waveform chart conceptually showing an asymmetry value. FIG. 14 are graphs showing a change in symbol error rate with respect to the offset value OFS normalized by the amplitude of the read signal $R_{RF}$. FIG. 15 are graphs showing a change in the offset value normalized by the amplitude of the read signal $R_{RF}$, with respect to the asymmetry value. FIG. 16 are tables showing the appearance probability of the record data with each run length. FIG. 17 is a waveform chart conceptually showing a waveform of the read signal $R_{RF}$ corresponding to minT according to a change in asymmetry. FIG. 18 is a waveform chart conceptually showing another waveform or the like of the read signal $R_{RF}$ before and after the correction of the waveform distortion.

As shown in FIG. 13, the asymmetry value indicates the deviation of the amplitude center of the read signal corresponding to the record data with the shortest run length, with respect to the amplitude center of the read signal $R_{RF}$ corresponding to the record data with the longest run length. Specifically, the asymmetry value $Asy=((ImaxH+ImaxL)-(IminH+IminL))/(2\times(ImaxH-ImaxL))$, wherein the amplitude center of the read signal $R_{RF}$ corresponding to the data with the longest run length is ImaxCnt, ImaxH is the magnitude of the top amplitude of the read signal $R_{RF}$ corresponding to the data with the longest run length based on ImaxCnt, ImaxL is the magnitude of the bottom amplitude of the read signal $R_{RF}$ corresponding to the data with the longest run length based on ImaxCnt, IminH is the magnitude of the top amplitude of the read signal $R_{RF}$ corresponding to the data with the shortest run length based on ImaxCnt, and IminL is the magnitude of the bottom amplitude of the read signal $R_{RF}$ corresponding to the data with the shortest run length based on ImaxCnt. Incidentally, ImaxCnt is an average value of the top amplitude value and the bottom amplitude value of the read signal $R_{RF}$ corresponding to the data with the longest run length.

As shown in FIG. 14(a), if the asymmetry value is 6% in a Blu-ray Disc, which is one specific example of the optical disc 100, the symbol error rate in the case where the offset value OFS is added is improved when the offset value OFS normalized by the amplitude of the read signal $R_{RF}$ is about 0% to 5%, compared to the symbol error rate in the case where the offset value OFS is not added. In particular, when the offset value OFS normalized by the amplitude of the read signal $R_{RF}$ is about 2%, the symbol error rate is minimal.

Incidentally, note that an entire β value described later is 9.3%, a partial β value is 10.0%, and an α value is −3.0%, when the symbol error rate is minimal.

As shown in FIG. 14(b), if the asymmetry value is 8% in a Bin-ray Disc, which is one specific example of the optical disc 100, the symbol error rate in the case where the offset value OFS is added is improved when the offset value OFS normalized by the amplitude of the read signal $R_{RF}$ is about 0% to 7%, compared to the symbol error rate in the case where the offset value OFS is not added. In particular, when the offset value OFS normalized by the amplitude of the read signal $R_{RF}$ is about 3%, the symbol error rate is minimal.

Incidentally, note that the entire β value described later is 12.3%, the partial β value is 14.0%, and the α value is −4.4%, when the symbol error rate is minimal.

As shown in FIG. 14(c), if the asymmetry value is 11% in a Blu-ray Disc, which is one specific example of the optical disc 100, the symbol error rate in the case where the offset value OFS is added is improved when the offset value OFS normalized by the amplitude of the read signal $R_{RF}$ is about 0% to 9%, compared to the symbol error rate in the case where the offset value OFS is not added. In particular, when the offset value OFS normalized by the amplitude of the read signal $R_{RF}$ is about 4%, the symbol error rate is minimal.

Incidentally, note that the entire β value described later is 15.0%, the partial β value is 19.0%, and the α value is −5.4%, when the symbol error rate is minimal.

As described above, it can be seen that the symbol error rate in the case where the offset value OFS is added is improved, compared to the symbol error rate in the case where the offset value OFS is not added. In particular, it can be seen that the symbol error rate is improved by adding the offset value OFS with the same polarity as that of the asymmetry.

FIG. 15 shows a graph obtained by plotting the asymmetry values and the offset values OFS when the symbol error rate is minimal, shown in FIG. 14(a) to FIG. 14(c). As shown in FIG. 15, the offset value OFS normalized by the amplitude of the read signal $R_{RF}$ is expressed by OFS=0.3947× asymmetry −0.2895.

Now, the appearance probability, which does not consider the run length, of the record data with each run length, which is shown in FIG. 16(a) and FIG. 16(b), will be focused on.

FIG. 16(a) shows the appearance probability, which considers the run length, of the record data with each run length in 1ECC block if random data is recorded onto a Blu-ray Disc, which is one specific example of the optical disc 100. As shown in FIG. 16(a), in 1ECC block, the appearance probability of the record data with a run length of 2T is about 38%, the appearance probability of the record data with a run length of 3T is about 25%, the appearance probability of the record data with a run length of 4T is about 16%, the appearance probability of the record data with a run length of 5T is about 10%, the appearance probability of the record data with a run length of 6T is about 6%, the appearance probability of the record data with a run length of 7T is about 3%, the appearance probability of the record data with a run length of 8T is about 1.6%, and the appearance probability of the record data with a run length of 9T is about 0.35%.

Incidentally, the appearance probability shown here (the T appearance probability in FIG. 16) is the appearance probability which does not consider the run length. In other words, weighting is the same, which is used to calculate the appearance probability in each of the record data with a run length of 2T, the record data with a run length of 3T, the record data with a run length of 4T, the record data with a run length of 5T, the record data with a run length of 6T, the record data with a run length of 7T, the record data with a run length of 8T, and the record data with a run length of 9T. In other words, it indicates the appearance probability in the case where the number of appearances is counted as one if one record data with a certain run length appears.

In considering the appearance probability and the graph (or equation) shown in FIG. 15, the coefficient, 0.3947, which is multiplied with the asymmetry in the equation for obtaining the offset value shown in FIG. 15 can be considered to be substantially same as the appearance probability, 38% (0.3809) of the record data with a run length of 2T. Thus, the offset value OFS normalized by the amplitude of the read signal $R_{RF}$ can be approximated by a value which is obtained by multiplying the appearance probability, which does not consider the run length, of the record data with the shortest run length with the asymmetry value. In other words, in a Blu-ray Disc, which is one specific example of the optical disc 100, the offset value OFS normalized by the amplitude of the read signal $R_{RF}$ can be approximated by 0.3809× the asymmetry value.

Moreover, FIG. 16(b) shows the appearance probability, which does not consider the run length, of the record data with each run length in 1ECC block if the random data is recorded onto a DVD, which is one specific example of the optical disc 100. As shown in FIG. 16(b), in 1ECC block, the appearance probability of the record data with a run length of 3T is about 32%, the appearance probability of the record data with a run length of 4T is about 24%, the appearance probability of the record data with a run length of 5T is about 17%, the appearance probability of the record data with a run length of 6T is about 11.5%, the appearance probability of the record data with a run length of 7T is about 7%, the appearance probability of the record data with a run length of 8T is about 4%, the appearance probability of the record data with a run length of 9T is about 2%, the appearance probability of the record data with a run length of 10T is about 1.3%, the appearance probability of the record data with a run length of 11T is about 0.24%, and the appearance probability of the record data with a run length of 14T is about 0.3%. Even in this case, the offset value OFS normalized by the amplitude of the read signal $R_{RF}$ can be approximated by the value which is obtained by multiplying the appearance probability, which does not consider the run length, of the record data with the shortest run length by the asymmetry value. In other words, in a DVD, which is one specific example of the optical disc 100, the offset value OFS normalized by the amplitude of the read signal $R_{RF}$ can be approximated by 0.3184× the asymmetry value.

Of course, in optical discs other than a Blu-ray Disc and a DVD, in the same manner, the offset value OFS normalized by the amplitude of the read signal $R_{RF}$ can be approximated by the appearance probability, which does not consider the run length, of the record data with the shortest run length× the asymmetry value.

As explained above, the offset generation circuit 19-2 generates the offset value OFS on the basis of the asymmetry value.

As described above, the improvement of the reproduction properties (e.g. the symbol error rate) by adding the offset value OFS can be explained from the following reasons.

As shown on the upper side of FIG. 17, if it is aimed at the optical disc 100 in which the reflectance of the laser beam LB is reduced by forming the marks, the signal level of the minT space is greater than the signal level of the minT mark. In this case, as the asymmetry increases, the signal waveform of minT is gradually shifted to the lower side (i.e. negative side), with respect to an all T center level (i.e. the reference level or the zero level). If the asymmetry increases to some degree, the signal level of the peak of the minT space likely falls below the all T center level. In this case, the minT is likely misjudged to be the waveform distortion. As a result, as shown in FIG. 18, since the minT is corrected as the waveform distortion, a signal corresponding to the minT does not appear in the binary signal, which leads to the deterioration of the symbol error rate.

In the same manner, as shown on the lower side of FIG. 17, if it is aimed at the optical disc 100 in which the reflectance of the laser beam LB is increased by forming the marks, the signal level of the minT space is less than the signal level of the minT mark. In this case, as the asymmetry increases, the signal waveform of minT is gradually shifted to the upper side (i.e. positive side), with respect to the all T center level (i.e. the reference level or the zero level). If the asymmetry increases to some degree, the signal level of the peak of the minT space likely exceeds the all T center level. In this case, the minT is likely misjudged to be the waveform distortion. As a result, since the minT is corrected as the waveform distortion, the signal corresponding to the minT does not appear in the binary signal, which leads to the deterioration of the symbol error rate.

However, according to the example, the signal waveform of the minT can be shifted by adding the offset value OFS. As a result, it is possible to preferably prevent such a disadvantage that the signal level of the peak of the minT space described above falls below or exceeds the all T center level. As a result, it is possible to preferably prevent the deterioration of the symbol error rate.

(3-2) Addition of Offset Value OFS Based on Entire β Value

Next, an explanation will be given on the addition of the offset value OFS based on an entire β value, with reference to FIG. 19 and FIG. 20. FIG. 19 is a waveform chart conceptually showing the entire β value. FIG. 20 is a graph showing a change in the offset value normalized by the amplitude of the read signal $R_{RF}$, with respect to the entire β value normalized by the amplitude of the read signal $R_{RF}$.

As shown in FIG. 19, the entire β value indicates the average position of the amplitude center of the read signals $R_{RF}$ corresponding to the respective record data with all types of run lengths (e.g. the record data with each of run lengths of 3T to 11T and 14T if the optical disc 100 is a DVD, and the record data with each of run lengths of 2T to 9T if the optical disc 100 is a Blu-ray Disc). Specifically, entire β value=(A1+A2)/(A1−A2), wherein A1 is the magnitude of the maximum amplitude (top amplitude) on the upper side (positive side) which is based on the amplitude center (i.e. all T center level) of the read signals $R_{RF}$ corresponding to the record data with all types of run lengths (i.e. the amplitude center is set at the origin or base point) and A2 is the magnitude of the maximum amplitude (bottom amplitude) on the lower side (negative side) which is based on the amplitude center of the read signals $R_{RF}$ corresponding to the record data with all types of run lengths.

FIG. 20 shows a graph obtained by plotting the entire β values and the offset values OFS when the symbol error rate is minimal, shown in FIG. 14(a) to FIG. 14(c). As shown in FIG. 20, the offset value OFS normalized by the amplitude of the read signal $R_{RF}$ is expressed by OFS=0.3506× entire β value −1.2768.

In considering the appearance probability and the graph (or equation) shown in FIG. 15, the offset value OFS normalized by the amplitude of the read signal $R_{RF}$ can be approximated by a value which is obtained by multiplying the appearance probability of the record data with the shortest run length by the entire β value. In other words, in a Blu-ray Disc, which is one specific example of the optical disc 100, the offset value OFS normalized by the amplitude of the read signal $R_{RF}$ can be approximated by 0.3809× the entire β value.

In the same manner, in a DVD, which is one specific example of the optical disc 100, the offset value OFS normalized by the amplitude of the read signal $R_{RF}$ can be approximated by 0.3184× the entire β value.

Of course, in optical discs other than a Blu-ray Disc and a DVD, in the same manner, the offset value OFS normalized by the amplitude of the read signal $R_{RF}$ can be approximated by the appearance probability, which does not consider the run length, of the record data with the shortest run length× the entire β value.

As explained above, the offset generation circuit 19-2 generates the offset value OFS on the basis of the entire β value. Even if the offset value OFS is generated on the basis of the entire β value, it is possible to preferably receive the same effect as that in the case where the offset value OFS is generated on the basis of the asymmetry value.

(3-3) Addition of Offset Value OFS Based on Partial Value

Next, an explanation will be given on the addition of the offset value OFS based on a partial β value, with reference to FIG. 21 and FIG. 22. FIG. 21 is a waveform chart conceptually showing the partial β value. FIG. 22 is a graph showing a change in the offset value normalized by the amplitude of the read signal $R_{RF}$, with respect to the partial β value normalized by the amplitude of the read signal $R_{RF}$.

As shown in FIG. 21, the partial β value indicates the deviation between the amplitude center of the read signal $R_{RF}$ corresponding to the record data with the shortest run length and the amplitude center of the read signal $R_{RF}$ corresponding to the record data with the second shortest run length. Specifically, the partial β value=(Imin+1H+Imin+1 L)/(Imin+1H−Imin+1 L), wherein the amplitude center of the read signal corresponding to the record data with the shortest run length is IminCnt, Imin+1H indicates the magnitude of the top amplitude of the read signal $R_{RF}$ corresponding to the record data with the second shortest run length based on IminCnt, and Imin+1 L indicates the magnitude of the bottom amplitude of the read signal $R_{RF}$ corresponding to the record data with the second shortest run length based on IminCnt. Incidentally, IminCnt is an average value of the top amplitude value IminH and the bottom amplitude value IminL of the read signal $R_{RF}$ corresponding to the record data with the shortest run length.

FIG. 22 shows a graph obtained by plotting the partial β values and the offset values OFS when the symbol error rate is minimal, shown in FIG. 14(a) to FIG. 14(c). As shown in FIG. 22, the offset value OFS normalized by the amplitude of the read signal $R_{RF}$ is expressed by OFS=0.2213× partial β value −0.1721.

Now, the appearance probability, which considers the run length, of the record data with each run length, which is shown in FIG. 16(a) and FIG. 16(b), will be focused on.

FIG. 16(a) shows the appearance probability, which considers the run length, of the record data with each run length in 1ECC block if random data is recorded onto a Blu-ray Disc, which is one specific example of the optical disc 100. As shown in FIG. 16(a), in 1ECC block, the appearance probability of the record data with a run length of 2T is about 22%, the appearance probability of the record data with a run length of 3T is about 22%, the appearance probability of the record data with a run length of 4T is about 19%, the appearance probability of the record data with a run length of 5T is about 14%, the appearance probability of the record data with a run length of 6T is about 10%, the appearance probability of the record data with a run length of 7T is about 6%, the appearance probability of the record data with a run length of 8T is about 4%, and the appearance probability of the record data with a run length of 9T is about 0.9%.

Incidentally, the appearance probability shown here (the sample appearance probability in FIG. 16) is the appearance probability which considers the run length. In other words, weighting is in proportion to the run length, which is used to calculate the appearance probability in each of the record data with a run length of 2T, the record data with a run length of 3T, the record data with a run length of 4T, the record data with a run length of 5T, the record data with a run length of 6T, the record data with a run length of 7T, the record data with a run length of 8T, and the record data with a run length of 9T. In other words, it indicates the appearance probability in the case where the number of appearances is counted as n if one record data with a run length of nT appears (i.e. if one record data including n sample values by sampling appears).

In considering the appearance probability and the graph (or equation) shown in FIG. 22, the coefficient, 0.2213, which is multiplied with the partial β value in the equation for obtaining the offset value shown in FIG. 22 can be considered to be substantially same as the appearance probability, 22% (0.2255), of the record data with a run length of 2T. Thus, the offset value OFS normalized by the amplitude of the read signal $R_{RF}$ can be approximated by a value which is obtained by multiplying the appearance probability, which considers the run length, of the record data with the shortest run length by the partial β value. In other words, in a Blu-ray Disc, which is one specific example of the optical disc 100, the offset value OFS normalized by the amplitude of the read signal $R_{RF}$ can be approximated by 0.2255× the partial β value.

Moreover, FIG. 16(b) shows the appearance probability, which considers the run length, of the record data with each run length in 1ECC block if the random data is recorded onto a DVD, which is one specific example of the optical disc 100. As shown in FIG. 16(b), in 1ECC block, the appearance probability of the record data with a run length of 3T is about 20%, the appearance probability of the record data with a run length of 4T is about 20%, the appearance probability of the record data with a run length of 5T is about 18%, the appearance probability of the record data with a run length of 6T is about 14%, the appearance probability of the record data with a run length of 7T is about 10%, the appearance probability of the record data with a run length of 8T is about 7%, the appearance probability of the record data with a run length of 9T is about 4.5%, the appearance probability of the record data with a run length of 10T is about 3%, the appearance probability of the record data with a run length of 11T is about 0.5%, and the appearance probability of the record data with a run length of 14T is about 0.9%. Even in this case, the offset value OFS normalized by the amplitude of the read signal $R_{RF}$ can be approximated by the value which is obtained by multiplying the appearance probability, which considers the run length, of the record data with the shortest run length by the partial β value. In other words, in a DVD, which is one specific example of the optical disc 100, the offset value OFS normalized by the amplitude of the read signal $R_{RF}$ can be approximated by 0.2026× the partial β value.

Of course, in optical discs other than a Blu-ray Disc and a DVD, in the same manner, the offset value OFS normalized by the amplitude of the read signal $R_{RF}$ can be approximated by the appearance probability, which considers the run length, of the record data with the shortest run length× the partial β value.

As explained above, the offset generation circuit 19-2 generates the offset value on the basis of the partial β value. Even if the offset value OFS is generated on the basis of the partial β value, it is possible to preferably receive the same effect as that in the case where the offset value OFS is generated on the basis of the asymmetry value.

(3-4) Addition of Offset Value OFS Based on a Value

Next, an explanation will be given on the addition of the offset value OFS based on an α value, with reference to FIG. 23. FIG. 23 is a waveform chart conceptually showing the α value.

As shown in FIG. 23, the α value indicates a deviation ratio (or rate) of the amplitude center of the read signal $R_{RF}$, corresponding to the record data with the shortest run length, with respect to the amplitude center (i.e. the reference level, and the zero level in the example) of the read signals $R_{RF}$ corresponding to the respective record data with all types of run lengths (e.g. the record data with each of run lengths of 3T to 11T and 14T if the optical disc 100 is a DVD, and the record data with each of run lengths of 2T to 9T if the optical disc 100 is a Blu-ray Disc). Specifically, α value=ΔRef/(ImaxH−ImaxL), wherein ImaxH is the magnitude of the top amplitude of the read signal $R_{RF}$ corresponding to the data with the longest run length based on the amplitude center of the read signal $R_{RF}$ corresponding to the record data with all types of run lengths (i.e. all T center level), ImaxL is the magnitude of the bottom amplitude of the read signal $R_{RF}$ corresponding to the data with the longest run length based on the amplitude center of the read signals $R_{RF}$ corresponding to the record data with all types of run lengths (i.e. all T center level), and ΔRef is a shift amount of the amplitude center of the read signal $R_{RF}$ corresponding to the record data with the shortest run length, with respect to the amplitude center of the read signals $R_{RF}$ corresponding to the record data with all types of run lengths.

In this case, the offset generation circuit 19-2 outputs the α value to the adder 19-1 as the offset value OFS; namely, the offset generation circuit 19-2 generates the α value itself. As described above, even if the offset value OFS is generated on the basis of the α value, it is possible to preferably receive the same effect as that in the case where the offset value OFS is generated on the basis of the asymmetry value.

Incidentally, in the operation example shown in FIG. 7, only one waveform distortion correction condition is set; however, a plurality of waveform distortion correction conditions may be set, and the waveform distortion correction may be performed by applying the waveform distortion correction conditions in order. The operation example in this case will be described with reference to FIG. 24. FIG. 24 is a flowchart conceptually showing another flow of operations of the adder 19-1, the offset addition circuit 19-2, and the waveform distortion correction circuit 18.

As shown in FIG. 24, firstly, the operation of reproducing data recorded on the optical disc 100 is performed (step S101). In the reproduction operation, by the operation of the offset generation circuit 19-2, it is judged whether or not the offset value OFS is to be added to the read signal $R_{RF}$ (and more specifically the read sample value series $RS_C$) (step S102).

As a result of the judgment in the step S102, if it is judged that the offset value OFS is not to be added (the step S102: No), the operational flow goes to a step S104.

On the other hand, as a result of the judgment in the step S102, if it is judged that the offset value OFS is to be added (the step S102: Yes), the offset value OFS is generated by the operation of the offset generation circuit 19-2, and the generated offset value OFS is added to the read signal RR F (and more specifically the read sample value series $RS_C$) by the operation of the adder 19-1 (step S103). After that, the operational flow goes to the step S104.

Then, it is sequentially judged whether or not a symbol error rate (SER) is greater than or equal to a predetermined threshold value, or whether or not error correction is unable to be performed, or whether or not the synchronization data is unable to be read (step S104).

As a result of the judgment in the step S104, if it is judged that the symbol error rate is not greater than or equal to the threshold value, and that the error correction is not unable to be performed, and that the synchronization data is not unable to be read (the step S104: No), the operational flow goes to a step S109.

On the other hand, as a result of the judgment in the step S104, if it is judged that the symbol error rate is greater than or equal to the threshold value, or that the error correction is unable to be performed, or that the synchronization data is unable to be read (the step S104: Yes), then, the waveform distortion of the long mark is measured (step S105). Then, it is judged whether or not the waveform distortion is greater than or equal to a predetermined value (step S106).

As a result of the judgment in the step S106, if it is judged that the waveform distortion is not greater than or equal to the predetermined value (e.g. that the waveform distortion ratio is less than or equal to approximately 30%) (the step S106: No), the operational flow goes to the step S109.

On the other hand, as a result of the judgment in the step S106, if it is judged that the waveform distortion is greater than or equal to the predetermined value (e.g. that the waveform distortion ratio is greater than or equal to approximately 30%) (the step S106: Yes), then, a waveform distortion correction condition #x (wherein x is an integer of 1 or more, with an initial value of 1), such as a correction level and a correction range for the waveform distortion, is set (step S201). Then, on the basis of the waveform distortion correction condition #x set in the step S201, the waveform distortion of the long mark is corrected (step S108).

Then, as a result of the correction based on the waveform distortion correction condition #x, it is judged whether or not a target condition is realized (step S202). As the target condition, for example, the judgment condition in the step S102 (i.e. that the symbol error rate is greater than or equal to the predetermined threshold value, or that the error correction is unable to be performed) may be used.

As a result of the judgment in the step S202, if it is judged that the target condition is realized (the step S202: Yes), the operational flow goes to the step S109.

On the other hand, as a result of the judgment in the step S202, if it is judged that the target condition is not realized (the step S202: No), x is incremented by 1 (step S203), and then, the operations after the step S201 are repeated. In other words, until the target condition is realized, the waveform distortion is corrected while the waveform distortion correction condition is changed as occasion demands.

Incidentally, as the plurality of waveform distortion correction conditions, it is preferable to use the waveform distortion correction conditions used in the operations in modified examples detailed later with reference to FIG. 26 to FIG. 39.

Moreover, in the aforementioned example, such construction is adopted that the addition of the offset value OFS is performed once per reproduction; however, the offset value may be added a plurality of times per reproduction in a stepwise manner. The operation example in this case will be described with reference to FIG. 25. FIG. 25 is a flowchart conceptually showing another flow of operations of the adder 19-1, the offset addition circuit 19-2, and the waveform distortion correction circuit 18.

As shown in FIG. 25, firstly, the operation of reproducing data recorded on the optical disc 100 is performed (step S101). Here, a variable n used in the addition of the offset value OFS is set to an initial value 0 (step S401). In the reproduction operation, by the operation of the offset generation circuit 19-2, it is judged whether or not the offset value OFS is to be added to the read signal $R_{RF}$ (and more specifically the read sample value series $RS_C$) (step S102).

As a result of the judgment in the step S102, if it is judged that the offset value OFS is not to be added (the step S102: No), the operational flow goes to a step S104.

On the other hand, as a result of the judgment in the step S102, if it is judged that the offset value OFS is to be added (the step S102: Yes), the variable n is incremented by 1 (step S402), and then, the offset value OFS is generated by the operation of the offset generation circuit 19-2 such that the offset value OFS normalized by the amplitude of the read signal $R_{RF}$ is n %, and the generated offset value OFS is added to the read signal $R_{RF}$ (and more specifically the read sample value series $RS_C$), by the operation of the adder 19-1 (step S403). Then, the operational flow goes to the step S104.

Then, it is sequentially judged whether or not a symbol error rate (SER) is greater than or equal to a predetermined threshold value, or whether or not error correction is unable to be performed, or whether or not the synchronization data is unable to be read (step S104).

As a result of the judgment in the step S104, if it is judged that the symbol error rate is not greater than or equal to the threshold value, and that the error correction is not unable to be performed, and that the synchronization data is not unable to be read (the step S104: No), the operational flow goes to a step S109.

On the other hand, as a result of the judgment in the step S104, if it is judged that the symbol error rate is greater than or equal to the threshold value, or that the error correction is unable to be performed, or that the synchronization data is unable to be read (the step S104: Yes), then, the waveform distortion of the long mark is measured (step S105). Then, it is judged whether or not the waveform distortion is greater than or equal to a predetermined value (step S106).

As a result of the judgment in the step S106, if it is judged that the waveform distortion is not greater than or equal to the predetermined value (e.g. that the waveform distortion ratio is less than or equal to approximately 30%) (the step S106: No), then, it is judged whether or not the retry number is greater than or equal to a predetermined value, wherein the retry number is the number of times to add the offset value OFS (step S404).

As a result of the judgment in the step S404, if it is judged that the retry number is not greater than or equal to the predetermined value (the step S404: No), the operational flow returns to the step S102, and the operations after the step S102 are repeated.

On the other hand, as a result of the judgment in the step S404, if it is judged that the retry number is greater than or equal to the predetermined value (the step S404: Yes), the operational flow goes to the step S109.

On the other hand, as a result of the judgment in the step S106, if it is judged that the waveform distortion is greater than or equal to the predetermined value (e.g. that the waveform distortion ratio is greater than or equal to approximately 30%) (the step S106: Yes), then, a waveform distortion correction condition, such as a correction level and a correction range for the waveform distortion, is set (step S107). Then, the waveform distortion of the long mark is corrected on the basis of the waveform distortion correction condition set in the step S107 (step S108).

Then, it is judged whether or not the reproduction operation is to be ended (step S109), and if the reproduction operation is not to be ended (the step S109: No), the operational flow returns to the step S101, and the operations after the step S101 are repeated again.

(4) Modified Examples

Next, with reference to FIG. 26 to FIG. 39, an explanation will be given on modified examples of the information reproducing apparatus 1 in the example.

(4-1) First Modified Example

Firstly, with reference to FIG. 26 and FIG. 27, an information reproducing apparatus 1a in a first modified example will be described. FIG. 26 is a waveform chart conceptually showing an operation of correcting the waveform distortion by a waveform distortion correction circuit 18a provided for the information reproducing apparatus 1a in the first modified example, on the sample value series $RS_C$. FIG. 27 is a block diagram conceptually showing the structure of the waveform distortion correction circuit 18a provided for the information reproducing apparatus 1a in the first modified example.

Incidentally, the same structures and operations as those in the aforementioned example carry the same reference numerals, and the explanation thereof is omitted.

As shown in FIG. 26, in the first modified example, as the distortion correction value amd, the average value of center samples of a mark with a run length of (min+3)T (i.e. the minimum amplitude value of the mark with (min+3)T for the waveform distortion shown in FIG. 5(a) to FIG. 5(c), and the maximum amplitude value of the mark with (min+3)T for the waveform distortion shown in FIG. 6(a) to FIG. 6(c)) is used.

Incidentally, (min+k)T indicates the read signal $R_{RF}$ (and more specifically, the read sample value series $RS_C$ corresponding to the read signal $R_{RF}$) corresponding to the record data with the (k+1)th shortest run length (wherein k is an integer or 1 or more). Therefore, (min+3)T indicates the read signal $R_{RF}$ (and more specifically, the read sample value series $RS_C$ corresponding to the read signal $R_{RF}$) corresponding to the record data with the fourth shortest run length. For example, if the optical disc 100 is a DVD, (min+3)T indicates the read signal $R_{RF}$ corresponding to the record data with a run length of 6T. For example, if the optical disc 100 is a Blu-ray Disc, (min+3)T indicates the read signal $R_{RF}$ corresponding to the record data with a run length of 5T.

In this case, as shown in FIG. 27, the waveform distortion correction circuit 18a is provided with the delay adjustment circuit 181, a distortion correction value detection circuit 182a, the mark/space length detection circuit 183, the timing generation circuit 184, and the selector 185.

The distortion correction value detection circuit 182a holds and averages the center sample values of the record data if the record data with a run length of (min+3)T is inputted, while monitoring the mark/space length outputted from the mark/space length detection circuit 183, and outputs it to the selector 185 as the distortion correction value.

As described above, even if the average value of the center samples of the record data with a run length of (min+3)T is used as the distortion correction value amd, it is possible to preferably receive the aforementioned various effects.

Moreover, depending on circumstances, by correcting the waveform distortion, the signal level after the correction is increased from the original signal level (i.e. the signal level before the correction). Thus, by correcting the waveform distortion, it is possible to bring the signal level closer to the maximum amplitude of the read signal $R_{RF}$. As a result, particularly in the information reproducing apparatus which adopts the PRML (Partial Response Maximum Likelihood), the record data can be reproduced more preferably.

Incidentally, as the distortion correction value amd, instead of the average value of the center samples of the record data with a run length of (min+3)T, the average value of the center samples of the record data with another run length may be used. In this case, as the record data with another run length, the record data which can realize the maximum amplitude is preferably used.

(4-2) Second Modified Example

Next, with reference to FIG. 28 and FIG. 29, an information reproducing apparatus 1b in a second modified example will be described. FIG. 28 is a waveform chart conceptually showing an operation of correcting the waveform distortion by a waveform distortion correction circuit 18b provided for the information reproducing apparatus 1b in the second modified example, on the sample value series $RS_C$. FIG. 29 is a block diagram conceptually showing the structure of the waveform distortion correction circuit 18b provided for the information reproducing apparatus 1b in the second modified example.

Incidentally, the same structures and operations as those in the aforementioned example carry the same reference numerals, and the explanation thereof is omitted.

As shown in FIG. 28, in the second modified example, as the distortion correction value amd, the maximum value or minimum value of a digital code for indicating the read sample value series $RS_C$ (i.e. the minimum value of the digital code for the waveform distortion shown in FIG. 5(a) to FIG. 5(c), and the minimum value of the digital code for the waveform distortion shown in FIG. 6(a) to FIG. 6(c)) is used. For example, if the digital code is 8-bit, the maximum value of the digital code is $2^{(8-1)}-1=127$, and the minimum value of the digital code is $-2^{(8-1)}-1=-128$.

In this case, as shown in FIG. 29, the waveform distortion correction circuit 18b is provided with the delay adjustment circuit 181, a distortion correction value detection circuit 182b, the mark/space length detection circuit 183, the timing generation circuit 184, and the selector 185.

The distortion correction value detection circuit 182b outputs the maximum value or minimum value of the digital code, to the selector 185 as the distortion correction value.

As described above, even if the maximum value or minimum value of the digital code is used as the distortion correction value amd, it is possible to preferably receive the aforementioned various effects.

In addition, it is no longer necessary, to sequentially detect the distortion correction value amd, so that it is possible to relatively reduce a load of the waveform distortion correction circuit 18b (i.e. a load of the information reproducing apparatus 1b).

Incidentally, if not only the maximum value or minimum value of the digital code but also a predetermined fixed value is used as the distortion correction value amd, it is possible to preferably receive the aforementioned various effects while relatively reducing the load of the waveform distortion correction circuit 18b (i.e. the load of the information reproducing apparatus 1b).

(4-3) Third Modified Example

Next, with reference to FIG. 30 and FIG. 31, an information reproducing apparatus 1c in a third modified example will be described. FIG. 30 is a waveform chart conceptually showing an operation of correcting the waveform distortion by a waveform distortion correction circuit 18c provided for the information reproducing apparatus 1c in the third modified example, on the sample value series $RS_C$. FIG. 31 is a block diagram conceptually showing the structure of the waveform distortion correction circuit 18c provided for the information reproducing apparatus 1c in the third modified example.

Incidentally, the same structures and operations as those in the aforementioned example carry the same reference numerals, and the explanation thereof is omitted.

As shown in FIG. 30, in the third modified example, as the distortion correction value amd, the upper limit L or lower limit −L of the amplitude limit value on the limit equalizer 15 (i.e. the lower limit −L of the amplitude limit value for the waveform distortion shown in FIG. 5(a) to FIG. 5(c), and the upper limit L of the amplitude limit value for the waveform distortion shown in FIG. 6(a) to FIG. 6(c)) is used.

In this case, as shown in FIG. 31, the waveform distortion correction circuit 18c is provided with the delay adjustment circuit 181, the mark/space length detection circuit 183, the timing generation circuit 184, and the selector 185.

The selector 185 outputs the upper limit L or lower limit −L of the amplitude limit value on the limit equalizer 15 as the distortion correction sample value series $RS_{CAM}$ if the high-level timing signal SW is outputted from the timing generation circuit 184.

As described above, even if the upper limit L or lower limit −L of the amplitude limit value on the limit equalizer 15 is used as the distortion correction value and, it is possible to preferably receive the aforementioned various effects.

In addition, since the signal level of the waveform distortion is corrected to the upper limit L or lower limit −L of the amplitude limit value on the limit equalizer 15, it is certainly possible to prevent such a disadvantage that the waveform distortion which is originally not to occur is emphasized. Moreover, it is also possible to preferably prevent such a disadvantage that the mark with a relatively long run length is misjudged to be another mark, caused by the emphasized waveform distortion, in the information reproducing apparatus which adopts the PRML. As a result, the binary error caused by the waveform distortion hardly occurs, which allows the preferable reproduction operation.

Incidentally, a value which is greater than or equal to the upper limit L or a value which is less than or equal to the lower limit −L of the amplitude limit value on the limit equalizer 15 may be used. Even in such construction, it is possible to preferably receive the aforementioned various effects.

(4-4) Fourth Modified Example

Next, with reference to FIG. 32 and FIG. 33, an information reproducing apparatus 1d in a fourth modified example will be described. FIG. 32 is a waveform chart conceptually showing an operation of correcting the waveform distortion by a waveform distortion correction circuit 18d provided for the information reproducing apparatus 1d in the fourth modified example, on the sample value series $RS_C$. FIG. 33 is a block diagram conceptually showing the structure of the waveform distortion correction circuit 18d provided for the information reproducing apparatus 1d in the fourth modified example.

Incidentally, the same structures and operations as those in the aforementioned example carry the same reference numerals, and the explanation thereof is omitted.

As shown in FIG. 32, in the fourth modified example, as the distortion correction value amd, a value (i.e. 2L or −2L) which is twice the upper limit L or lower limit −L of the amplitude limit value on the limit equalizer 15 (i.e. the lower limit −L of the amplitude limit value for the waveform distortion shown in FIG. 5(a) to FIG. 5(c), and the upper limit L of the amplitude limit value for the waveform distortion shown in FIG. 6(a) to FIG. 6(c)) is used.

In this case, as shown in FIG. 33, the waveform distortion correction circuit 18d is provided with the delay adjustment circuit 181, an amplifier 182d, the mark/space length detection circuit 183, the timing generation circuit 184, and the selector 185.

The amplifier 182d amplifies the upper limit L or lower limit −L of the amplitude limit value on the limit equalizer 15 by two times, and then outputs it to the selector 185 as the distortion correction value amd.

As described above, even if the value which is twice the upper limit L or lower limit −L of the amplitude limit value on the limit equalizer 15 is used as the distortion correction value amd, it is possible to preferably receive the aforementioned various effects.

In addition, since the signal level of the waveform distortion is corrected to the upper limit L or lower limit −L of the amplitude limit value on the limit equalizer 15, it is certainly possible to prevent such a disadvantage that the waveform distortion which is originally not to occur is emphasized. Moreover, it is also possible to preferably prevent such a disadvantage that the mark with a relatively long run length is misjudged to be another mark, caused by the emphasized waveform distortion, in the information reproducing apparatus which adopts the PRML. As a result, the binary error caused by the waveform distortion hardly occurs, which allows the preferable reproduction operation.

Moreover, even if a noise component is superimposed on the read signal $R_{RF}$, since the signal level of the waveform distortion is corrected to the signal level which is less than or equal to the value which is twice the upper limit L or the lower limit −L of the amplitude limit value, it is certainly possible to prevent such a disadvantage that the waveform distortion is less than or equal to the upper limit L of the amplitude limit value or is greater than or equal to the lower limit −L. As a result, it is possible to preferably prevent such a disadvantage that the long mark is misjudged to be another mark. As a result, the binary error caused by the waveform distortion hardly occurs, which allows the preferable reproduction operation.

(4.5) Fifth Modified Example

Next, with reference to FIG. 34 to FIG. 37, an information reproducing apparatus 1e in a fifth modified example will be described. FIG. 34 is a timing chart conceptually showing an operation of correcting the waveform distortion by a waveform distortion correction circuit 18e provided for the information reproducing apparatus 1e in the fifth modified example, on a first read signal $R_{RF}$. FIG. 35 is a timing chart conceptually showing the operation of correcting the waveform distortion by the waveform distortion correction circuit 18e provided for the information reproducing apparatus 1e in the fifth modified example, on a second read signal $R_{RF}$. FIG. 36 is a flowchart conceptually showing a first flow of operations by the waveform distortion correction circuit 18e provided for the information reproducing apparatus 1e in the fifth modified example. FIG. 37 is a flowchart conceptually showing a second flow of operations by the waveform distortion correction circuit 18e provided for the information reproducing apparatus 1e in the fifth modified example.

The record data recorded on the optical disc 100 includes not only normal user data but also the synchronization data (e.g. the record data with a run length of 14T if the optical disc 100 is a DVD, and the record data with a run length of 9T if the optical disc 100 is a Blu-ray Disc) used for synchronization in reproducing the user data. Considering that the synchronization data is included in the record data, the correction of the waveform distortion may be limited to the synchronization data.

More specifically, as shown in FIG. 34, if the optical disc 100 is a Blu-ray Disc, since the synchronization data is formed of a 9T mark and a 9T space, firstly, the 9T space is detected, and the waveform distortion before or after the detected 9T space may be corrected. Moreover, focusing on the periodicity that the synchronization data appears, the waveform distortion may be corrected near a position being shifted by a time corresponding to 1932T (or 1932T± 1: α1 is a predetermined constant) from the detected 9T space toward the advancing direction (or a position being shifted by β 1T from the relevant position toward the advancing direction: β 1 is a predetermined constant).

Moreover, as shown in FIG. 35, if the optical disc 100 is a DVD, since the synchronization data is a 14T mark or a 14T space, firstly, the 14T space is detected, and the waveform distortion may be corrected near a position being shifted by a time corresponding to 1488T (or 1488T± 2: α2 is a predetermined constant) from the detected 14T space toward the advancing direction (or a position being shifted by β 2T from the relevant position toward the advancing direction: β2 is a predetermined constant).

A flow of the operations in this case will be described. As shown in FIG. 36, firstly, the operation of reproducing data recorded on the optical disc 100 is performed (step S101). In the reproduction operation, by the operation of the offset generation circuit 19-2, it is judged whether or not the offset value OFS is to be added to the read signal $R_{RF}$ (and more specifically the read sample value series $RS_C$) (step S102).

As a result of the judgment in the step S102, if it is judged that the offset value OFS is not to be added (the step S102: No), the operational flow goes to a step S301.

On the other hand, as a result of the judgment in the step S102, if it is judged that the offset value OFS is to be added (the step S102: Yes), the offset value OFS is generated by the operation of the offset generation circuit 19-2, and the generated offset value OFS is added to the read signal $R_{RF}$ (and more specifically the read sample value series $RS_C$) by the operation of the adder 19-1 (step S103). After that, the operational flow goes to a step S301.

Then, it is judged whether or not a sync space (i.e. a space which constitutes the synchronization data: the aforementioned 9T space, 14T space, and the like) is detected (step S301).

As a result of the judgment in the step S301, if it is judged that the sync space is not detected (the step S301: No), the operational flow returns to the step S301, and the operation of judging whether or not the sync space is detected is repeated.

On the other hand, as a result of the judgment in the step S301, if it is judged that the sync space is detected (the step S301: Yes), then, it is judged whether or not the mark is reproduced at a position being shifted by a time corresponding to nT from the sync space toward the advancing direction (step S302). In other words, focusing on the periodicity that the synchronization data appears, it is judged whether or not the mark is reproduced at a position being shifted by the aforementioned time corresponding to 1932T±α1 or 1488T±α2 from the detected sync space toward the advancing direction.

As a result of the judgment in the step S302, if it is judged that the mark is not reproduced at the position being shifted by the time corresponding to nT from the sync space toward the advancing direction (the step S302: No), the operation in the step S302 is repeated.

On the other hand, as a result of the judgment in the step S302, if it is judged that the mark is reproduced at the position being shifted by the time corresponding to nT from the sync space toward the advancing direction (the step S302: Yes), then, the waveform distortion of the mark corresponding to the synchronization data is measured near the position being shifted by the time corresponding to nT from the sync space toward the advancing direction (step S105). Subsequently, the same operations shown in FIG. 7 are performed.

Moreover, in this case, as shown in FIG. 37, as in the operation example shown in FIG. 24, a plurality of waveform distortion correction conditions may be set, and the waveform distortion correction may be performed by applying the waveform distortion correction conditions in order.

Specifically, as shown in FIG. 37, firstly, the operation of reproducing data recorded on the optical disc 100 is performed (step S101). In the reproduction operation, by the operation of the offset generation circuit 19-2, it is judged whether or not the offset value OFS is to be added to the read signal $R_{RF}$ (and more specifically the read sample value series $RS_C$) (step S102).

As a result of the judgment in the step S102, if it is judged that the offset value OFS is not to be added (the step S102: No), the operational flow goes to a step S301.

On the other hand, as a result of the judgment in the step S102, if it is judged that the offset value OFS is to be added (the step S102: Yes), the offset value OFS is generated by the operation of the offset generation circuit 19-2, and the generated offset value OFS is added to the read signal $R_{RF}$ (and more specifically the read sample value series $RS_C$) by the operation of the adder 19-1 (step S103). After that, the operational flow goes to the step S301.

Then, it is judged whether or not the sync space (i.e. the space which constitutes the synchronization data: the aforementioned 9T space, 14T space, and the like) is detected (step S301).

As a result of the judgment in the step S301, if it is judged that the sync space is not detected (the step S301: No), the operational flow returns to the step S301, and the operation of judging whether or not the sync space is detected is repeated.

On the other hand, as a result of the judgment in the step S301, if it is judged that the sync space is detected (the step S301: Yes), then, it is judged whether or not the mark is reproduced at a position being shifted by a time corresponding to nT from the sync space toward the advancing direction (step S302). In other words, focusing on the periodicity that the synchronization data appears, it is judged whether or not the mark is reproduced at a position being shifted by the aforementioned time corresponding to 1932T±α1 or 1488T±α2 from the detected sync space toward the advancing direction.

As a result of the judgment in the step S302, if it is judged that the mark is not reproduced at the position being shifted by the time corresponding to nT from the sync space toward the advancing direction (the step S302: No), the operation in the step S302 is repeated.

On the other hand, as a result of the judgment in the step S302, if it is judged that the mark is reproduced at the position being shifted by the time corresponding to nT from the sync space toward the advancing direction (the step S302: Yes), then, the waveform distortion of the mark corresponding to the synchronization data is measured near the position being shifted by the time corresponding to nT from the sync space toward the advancing direction (step S105). Subsequently, the same operations shown in FIG. 24 are performed.

As described above, by correcting the waveform distortion in view of that the synchronization data is included in the record data, it is possible to preferably perform the high-frequency emphasis on the synchronization data which is more important than the user data, resulting in the preferable reproduction of the synchronization data. This can further increase the stability of the reproduction operation.

(4-6) Sixth Modified Example

Next, with reference to FIG. 38 and FIG. 39, an information reproducing apparatus 1*f* in a sixth modified example will be described. FIG. 38 is a block diagram conceptually showing the structure of a waveform distortion correction circuit 18*f* provided for the information reproducing apparatus 1*f* in a sixth modified example. FIG. 39 is a block diagram conceptually showing the structure of a waveform distortion detection circuit 186*f* provided for the waveform distortion correction circuit 18*f* provided for the information reproducing apparatus 1*f* in the sixth modified example.

As shown in FIG. 38, the waveform distortion correction circuit 18*f* is provided with the delay adjustment circuit 181, a waveform distortion detection circuit 186*f*, the mark/space length detection circuit 183, the timing generation circuit 184, the selector 185, and an AND circuit 187*f*.

In this aspect, a result of the detection of the mark/space length by the mark/space length detection circuit 183 is outputted to the waveform distortion detection circuit 186*f*, in addition to the timing generation circuit 184.

The waveform distortion detection circuit 186*f* detects the waveform distortion and outputs a waveform distortion detection signal DT which indicates that the waveform distortion is detected, to the AND circuit 187*f*. More specifically, the waveform distortion detection circuit 186*f* outputs a high-level waveform distortion detection signal DT (DT=1) to the AND circuit 187*f* if the waveform distortion is detected, and outputs a low-level waveform distortion detection signal DT (DT=0) to the AND circuit 187*f* if the waveform distortion is not detected.

The AND circuit 187*f* generates a high-level timing signal SW0 if the waveform distortion is detected (if each of the timing signal SW outputted from the timing generation circuit 184 and the waveform distortion detection signal DT outputted from the waveform distortion detection circuit 186*f* is high-level), on the basis of the output of each of the timing generation circuit 184 and the waveform distortion detection circuit 186*f*. On the other hand, the AND circuit 187*f* generates a low-level timing signal SW0 if the waveform distortion is not detected (if either the timing signal SW outputted from the timing generation circuit 184 or the waveform distortion detection signal DT outputted from the waveform distortion detection circuit 186*f* is low-level), on the basis of the output of each of the timing generation circuit 184 and the waveform distortion detection circuit 186*f*. In other words, in the sixth modified example, the waveform distortion is corrected selectively when the waveform distortion is detected.

As shown in FIG. 39, the waveform distortion detection circuit 186*f* is provided with a shift register 1831*f*, a selector 1832*f*, a maximum value detection circuit 1833*f*, a minimum value detection circuit 1834*f*, a subtracter 1835*f*, and a judgment circuit 1836*f*.

The read sample value series $RS_C$ inputted to the waveform distortion detection circuit 186*f* is outputted to the shift register 1831*f*. The shift register 1831*f* outputs the inputted read sample value series $RS_C$ to the selector 1832*f* as outputs D0 to D14 while shifting the inputted read sample value series $RS_C$ by one clock.

The selector 1832*f* selectively samples and holds three outputs from among the outputs D0 to D14, on the basis of the mark/space length, in timing outputted from the mark/space length detection circuit 183, and outputs the three outputs to a distortion correction amount detection circuit 1837*f*, the maximum value detection circuit 1833*f*, and the minimum value detection circuit 1834*f*, respectively.

More specifically, the selector 1832*f* selectively samples and holds three outputs D2, D3, and D4 from among the outputs D0 to D14 if the mark/space length outputted from the mark/space length detection circuit 183 is 6T, and outputs the three outputs to the distortion correction amount detection circuit 1837*f*, the maximum value detection circuit 1833*f*, and the minimum value detection circuit 1834*f*, respectively. The selector 1832*f* selectively samples and holds three outputs D2, D3, and D5 from among the outputs D0 to D14 if the mark/space length outputted from the mark/space length detection circuit 183 is 7T, and outputs the three outputs to the distortion correction detection circuit 1837*f*, the maximum value detection circuit 1833*f*, and the minimum value detection circuit 1834*f*, respectively. The selector 1832*f* selectively samples and holds three outputs D2, D4, and D6 from among the outputs D0 to D14 if the mark/space length outputted from the mark/space length detection circuit 183 is 8T, and outputs the three outputs to the distortion correction amount detection circuit 1837*f*, the maximum value detection circuit 1833*f*, and the minimum value detection circuit 1834*f*, respectively. The selector 1832*f* selectively samples and holds three outputs D2, D4, and D7 from among the outputs D0 to D14 if the mark/space length outputted from the mark/space length detection circuit 183 is 9T, and outputs the three outputs to the distortion correction amount detection circuit 1837*f*, the maximum value detection circuit 1833*f*, and the minimum value detection circuit 1834*f*, respectively. The selector 1832*f* selectively samples and holds three outputs D2, D5, and D8 from among the outputs D0 to D14 if the mark/space length outputted from the mark/space length detection circuit 183 is 10T, and outputs the three outputs to the distortion correction amount detection circuit 1837*f*, the maximum value detection circuit 1833*f*, and the minimum value detection circuit 1834*f*, respectively. The selector 1832*f* selectively samples and holds three outputs D2, D5, and D9 from among the outputs D0 to D14 if the mark/space length outputted from the mark/space length detection circuit 183 is 11T, and outputs the three outputs to the distortion correction amount detection circuit 1837*f*, the maximum value detection circuit 1833*f*, and the minimum value detection circuit 1834*f*, respectively. The selector 1832*f* selectively samples and holds three outputs D2, D7, and D12 from among the outputs D0 to D14 if the mark/space length outputted from the mark/space length detection circuit 183 is 14T, and outputs the three outputs to the distortion correction amount detection circuit 1837*f*, the maximum value detection circuit 1833*f*, and the minimum value detection circuit 1834*f*, respectively. The operation of the selector 1832*f* described above substantially corresponds to the operation of selectively outputting the signal level in the front edge portion, the signal level in the middle portion, and the signal level in the rear edge portion of the waveform distortion, shown in FIG. 5(*a*) to FIG. 5(*c*) and FIG. 6(*a*) to FIG. 6(*c*).

Then, on the distortion correction amount detection circuit 1837*f*, desired one signal level of the three outputs outputted from the selector 1832*f* (i.e. the signal level in the front edge portion, the signal level in the middle portion, and the signal level in the rear edge portion) is outputted as the distortion correction value amd. Specifically, as shown in FIG. 5(*a*) and FIG. 6(*a*), for the waveform distortion in which the signal level in the middle portion is changed, for example, the signal level in the front edge portion or the signal level in the rear edge portion is outputted as the distortion correction value amd. As shown in FIG. 5(*b*) and FIG. 6(*b*), for the waveform distortion in which the signal level in the front edge portion is changed, for example, the signal level in the rear edge portion is outputted as the distortion correction value amd. As shown in FIG. 5(*c*) and FIG. 6(*c*), for the waveform distortion in which the signal level in the rear edge portion is changed, for example, the signal level in the front edge portion is outputted as the distortion correction value amd.

Moreover, on the maximum value detection circuit 1833*f*, the maximum value (i.e. the maximum signal level) of the three outputs outputted from the selector 1832*f* is detected, and the detected maximum value is outputted to the subtracter 1835*f*.

Moreover, on the minimum value detection circuit 1834*f*, the minimum value (i.e. the minimum signal level) of the three outputs outputted from the selector 1832*f* is detected, and the detected minimum value is outputted to the subtracter 1835*f*.

Then, on the subtracter 1835*f*, the minimum value detected on the minimum value detection circuit 1834*f* is subtracted from the maximum value detected on the maximum value detection circuit 1833*f*, by which the waveform distortion amount D is calculated.

Then, on the judgment circuit 1836*f*, it is judged whether or not the waveform distortion amount outputted from the subtracter 1835*f* is greater than or equal to a predetermined value x. If the waveform distortion amount D is relatively small, the waveform distortion is not regarded as being detected, and the low-level waveform distortion detection signal DT is outputted. On the other hand, if the waveform distortion amount D is relatively large (e.g. if the waveform distortion ratio is greater than or equal to approximately 30%), the waveform distortion is regarded as being detected, and the high-level waveform distortion detection signal DT is outputted.

As described above, by selectively correcting the waveform distortion when the waveform distortion is detected, it is possible to receive the aforementioned various effects while reducing the load of the information reproducing apparatus 1*f*.

In addition, the signal level of the waveform distortion can be corrected to desired one of the signal level in the front edge portion, the signal level in the middle portion, and the signal level in the rear edge portion. Thus, it is possible to preferably correct the waveform distortion in various shapes. Specifically, in the construction explained with reference to FIG. 7 to FIG. 9, the signal level of the waveform distortion is corrected to the signal level in the front edge portion. Thus, particularly, the waveform distortion in which the signal level in the front edge portion is changed, as shown in FIG. 5(b) and FIG. 6(b), cannot be preferably corrected. According to the information reproducing apparatus 1f in the sixth modified example, however, this type of waveform distortion can be preferably corrected.

Incidentally, the waveform distortion occurs generally due to the dispersion of the shape, length, and the like of the marks formed on the recording surface of the optical disc 100. Therefore, the waveform distortion tends to occur in the recording type optical disc 100, such as a DVD-R/RW, a DVD+R/RW, a DVD-RAM, and a BD-R/RE. However, even in the read-only type optical disc 100, such as a DVD-ROM and a BD-ROM, the waveform distortion occurs if the synchronization data formed of the relatively long mark is adjacent to each other in a tracking direction, as shown in FIG. 40. For the waveform distortion occurring in the read-only type optical disc 100, according to the information reproducing apparatus 1 described above, the correction can be preferably made, obviously.

The present invention is not limited to the aforementioned example, but various changes may be made, if desired, without departing from the essence or spirit of the invention which can be read from the claims and the entire specification. An information reproducing apparatus and method, and a computer program, all of which involve such changes, are also intended to be within the technical scope of the present invention.

The invention claimed is:

1. An information reproducing apparatus comprising:
an offset adding device for adding an offset value which can be set to be variable, to a read signal read from a recording medium;
a correcting device for correcting waveform distortion occurring in a read signal corresponding to at least a long mark, of the read signal to which the offset value is added by said offset adding device; and
a waveform equalizing device for performing a waveform equalization process on the read signal in which the waveform distortion is corrected,
wherein the offset value is set on the basis of at least one of (i) an asymmetry value which indicates a shift amount between an amplitude center of a read signal obtained by reading record data with the shortest run length of the read signal and an amplitude center of a read signal which provides a maximum amplitude of a read signal; (ii) an entire β value which indicates an average value of the amplitude center of the read signal; and (iii) a partial β value which indicates deviation between the amplitude center of the read signal obtained by reading the record data with the shortest run length of the read signal and the amplitude center of the read signal obtained by reading the record data with the second shortest run length of the read signal.

2. The information reproducing apparatus according to claim 1, wherein said offset adding device adds the offset value to the read signal, thereby adding offset to a reference level of the read signal.

3. The information reproducing apparatus according to claim 1, wherein the offset value is a value obtained by multiplying the asymmetry value by an appearance probability, which does not consider the run length, of the record data with the shortest run length with respect to the record data included in the read signal.

4. The information reproducing apparatus according to claim 1, wherein the offset value is a value obtained by multiplying the entire β value by an appearance probability, which does not consider the run length, of the record data with the shortest run length with respect to the record data included in the read signal.

5. The information reproducing apparatus according to claim 1, wherein the offset value is a value obtained by multiplying the partial β value by an appearance probability, which considers the run length, of the record data with the shortest run length with respect to the record data included in the read signal.

6. The information reproducing apparatus according to claim 1, wherein the offset value is set on the basis of a positional relation between a reference level of the read signal and an amplitude center of a read signal obtained by reading record data with the shortest run length of the read signal.

7. The information reproducing apparatus according to claim 1, wherein the offset value is a value indicating deviation between a reference level of the read signal and an amplitude center of a read signal obtained by reading record data with the shortest run length of the read signal.

8. The information reproducing apparatus according to claim 1, wherein said waveform equalizing device comprises:
an amplitude limiting device for limiting an amplitude level of the read signal in which the waveform distortion is corrected, by a predetermined amplitude limit value, thereby obtaining an amplitude limit signal; and
a filtering device for performing a high-frequency emphasis filtering process on the amplitude limit signal, thereby obtaining an equalization-corrected signal.

9. The information reproducing apparatus according to claim 1, wherein said offset adding device adds the offset value (i) if an error correction of the read signal cannot be performed, (ii) if an error rate of the read signal is greater than or equal to a predetermined threshold value, or (iii) if a read signal corresponding to synchronization data cannot be read, the synchronization data being used to read user data included in record data, the synchronization data being included in the record data.

10. The information reproducing apparatus according to claim 1, wherein said correcting device corrects the waveform distortion (i) if an error correction of the read signal cannot be performed, (ii) if an error rate of the read signal is greater than or equal to a predetermined threshold value, or (iii) if a read signal corresponding to synchronization data cannot be read, the synchronization data being used to read user data included in record data, the synchronization data being included in the record data.

11. The information reproducing apparatus according to claim 1, wherein the long mark is a mark whose signal level is maximum amplitude.

12. An information reproducing method comprising:
an offset adding process of adding an offset value which can be set to be variable, to a read signal read from a recording medium;
a correcting process of correcting waveform distortion occurring in a read signal corresponding to at least a long mark, of the read signal to which the offset value is added by said offset adding process; and
a waveform equalizing process of performing a waveform equalization process on the read signal in which the waveform distortion is corrected,
wherein the offset value is set on the basis of at least one of (i) an asymmetry value which indicates a shift amount between an amplitude center of a read signal obtained by reading record data with the shortest run length of the read signal and an amplitude center of a read signal which provides a maximum amplitude of a read signal; (ii) an entire β value which indicates an average value of the amplitude center of the read signal; and (iii) a partial β value which indicates deviation between the amplitude center of the read signal obtained by reading the record data with the shortest run length of the read signal and the amplitude center of the read signal obtained by reading the record data with the second shortest run length of the read signal.

13. A non-transitory computer readable recording medium recording thereon a computer program for reproduction control and for controlling a computer provided in an information reproducing apparatus comprising: an offset adding device for adding an offset value which can be set to be variable, to a read signal read from a recording medium; a correcting device for correcting waveform distortion occurring in a read signal corresponding to at least a long mark, of the read signal to which the offset value is added by said offset adding device; and a waveform equalizing device for performing a waveform equalization process on the read signal in which the waveform distortion is corrected, said computer program making the computer function as at least one portion of said offset adding device, said correcting device, and said waveform equalizing device, wherein the offset value is set on the basis of at least one of (i) an asymmetry value which indicates a shift amount between an amplitude center of a read signal obtained by reading record data with the shortest run length of the read signal and an amplitude center of a read signal which provides a maximum amplitude of a read signal; (ii) an entire β value which indicates an average value of the amplitude center of the read signal; and (iii) a partial β value which indicates deviation between the amplitude center of the read signal obtained by reading the record data with the shortest run length of the read signal and the amplitude center of the read signal obtained by reading the record data with the second shortest run length of the read signal.

* * * * *